(12) United States Patent
Ahammer et al.

(10) Patent No.: US 10,173,839 B2
(45) Date of Patent: Jan. 8, 2019

(54) RACK STORAGE SYSTEM AND METHOD FOR OPERATING IT

(71) Applicant: TGW LOGISTICS GROUP GMBH, Wels (AT)

(72) Inventors: Christian Ahammer, Gunskirchen (AT); Rudolf Hansl, Linz (AT)

(73) Assignee: TGW LOGISTICS GROUP GMBH, Wels (AT)

( * ) Notice: Subject to any disclaimer, the term of this patent is extended or adjusted under 35 U.S.C. 154(b) by 1038 days.

(21) Appl. No.: 14/367,265

(22) PCT Filed: Dec. 21, 2012

(86) PCT No.: PCT/AT2012/050206
§ 371 (c)(1),
(2) Date: Oct. 17, 2014

(87) PCT Pub. No.: WO2013/090970
PCT Pub. Date: Jun. 27, 2013

(65) Prior Publication Data
US 2015/0336741 A1    Nov. 26, 2015

(30) Foreign Application Priority Data

Dec. 21, 2011  (AT) .................................. 1864/2011
May 16, 2012  (WO) ................. PCT/AT2012/050072
Oct. 24, 2012  (WO) ................. PCT/AT2012/050168

(51) Int. Cl.
*B65G 1/04*     (2006.01)
*B65G 1/06*     (2006.01)

(52) U.S. Cl.
CPC .......... *B65G 1/065* (2013.01); *B65G 1/0485* (2013.01); *B65G 1/0492* (2013.01)

(58) Field of Classification Search
CPC ..... B65G 1/065; B65G 1/0485; B65G 1/0492
(Continued)

(56) References Cited

U.S. PATENT DOCUMENTS 3,905,492 A   9/1975  Maeda et al.
5,839,872 A   11/1998 Goto et al.
(Continued)

FOREIGN PATENT DOCUMENTS

AT      509 294 A1    7/2011
CN   101641270 A      2/2010
(Continued)

OTHER PUBLICATIONS

International Search Report of PCT/AT2012/050206, dated Feb. 21, 2014.
(Continued)

*Primary Examiner* — Gerald McClain
*Assistant Examiner* — Ashley K Romano
(74) *Attorney, Agent, or Firm* — Collard & Roe, P.C.

(57) ABSTRACT

The invention relates to a rack storage system comprising storage racks (12a, 12b) for load (2) and a load manipulation unit (4), which has at least a first load-lifting device (34a) with a transport device (36a) and a first buffer device (35a) with transport conveying devices (43, 44) and a rack aisle (15) and guide tracks (20) extending in the rack levels in the longitudinal direction of the rack aisle (15) and single-level rack serving devices (3) for transporting load (2) as well as a conveying system being connected to the load-lifting device (34a) for transporting load (2) to and from the load-lifting device (34a). The transport conveying devices (43) each form a removing path for the load (2) and the transport conveying devices (44) each form a storing path for the load (2). In a conveying section adjacent to the load-lifting device (34a), at least one of the conveying devices (106, 107) of the conveying system also comprises a transport conveying device (108; 110) for temporarily storing one or more pieces of load (2), the transport con-
(Continued)

veying device can be approached by the conveyor vehicle (3) via guide tracks (20') to retrieve or store load (2).

36 Claims, 33 Drawing Sheets

(58) Field of Classification Search
USPC .......................................................... 414/279
See application file for complete search history.

(56) References Cited

U.S. PATENT DOCUMENTS

| | | | |
|---|---|---|---|
| 6,923,612 | B2 | 8/2005 | Hansl |
| 8,276,739 | B2 | 10/2012 | Bastian, II et al. |
| 8,474,596 | B2 | 7/2013 | Wolkerstorfer et al. |
| 2004/0197172 | A1* | 10/2004 | Hansl .................. B65G 1/0485 414/281 |
| 2005/0095095 | A1 | 5/2005 | Hansl |
| 2009/0136328 | A1* | 5/2009 | Schafer ................ B65G 1/1378 414/273 |
| 2010/0183409 | A1* | 7/2010 | Checketts .............. B60K 17/30 414/231 |
| 2010/0316468 | A1 | 12/2010 | Lert et al. |
| 2011/0008137 | A1 | 1/2011 | Yamashita |
| 2011/0106295 | A1 | 5/2011 | Miranda et al. |
| 2012/0282068 | A1 | 11/2012 | Tschurwald et al. |
| 2012/0328397 | A1 | 12/2012 | Yamashita |

FOREIGN PATENT DOCUMENTS

| | | |
|---|---|---|
| CN | 101939237 A | 1/2011 |
| CN | 102092552 A | 6/2011 |
| DE | 10 2009 032 406 A1 | 1/2011 |
| EP | 0 647 575 A1 | 4/1995 |
| EP | 0 733 563 A1 | 9/1996 |
| EP | 1401743 B1 | 9/2005 |
| EP | 1772400 A1 | 4/2007 |
| EP | 2032472 B1 | 10/2009 |
| EP | 2 287 093 A1 | 2/2011 |
| EP | 2 327 643 A1 | 6/2011 |
| EP | 2 543 611 A1 | 1/2013 |
| JP | H08-175620 A | 7/1996 |
| JP | H09048507 A | 2/1997 |
| JP | 2004 123240 A | 4/2004 |
| WO | 2009/143548 A1 | 12/2009 |
| WO | 2011/029119 A2 | 3/2011 |
| WO | 2011/086009 A1 | 7/2011 |
| WO | 2011/108636 A1 | 9/2011 |
| WO | 2012/006650 A1 | 1/2012 |

OTHER PUBLICATIONS

Dematic GMBH, "Offer of Dematic", in the period of Sep. 15, 2010 and Apr. 12, 2011, Germany.

* cited by examiner

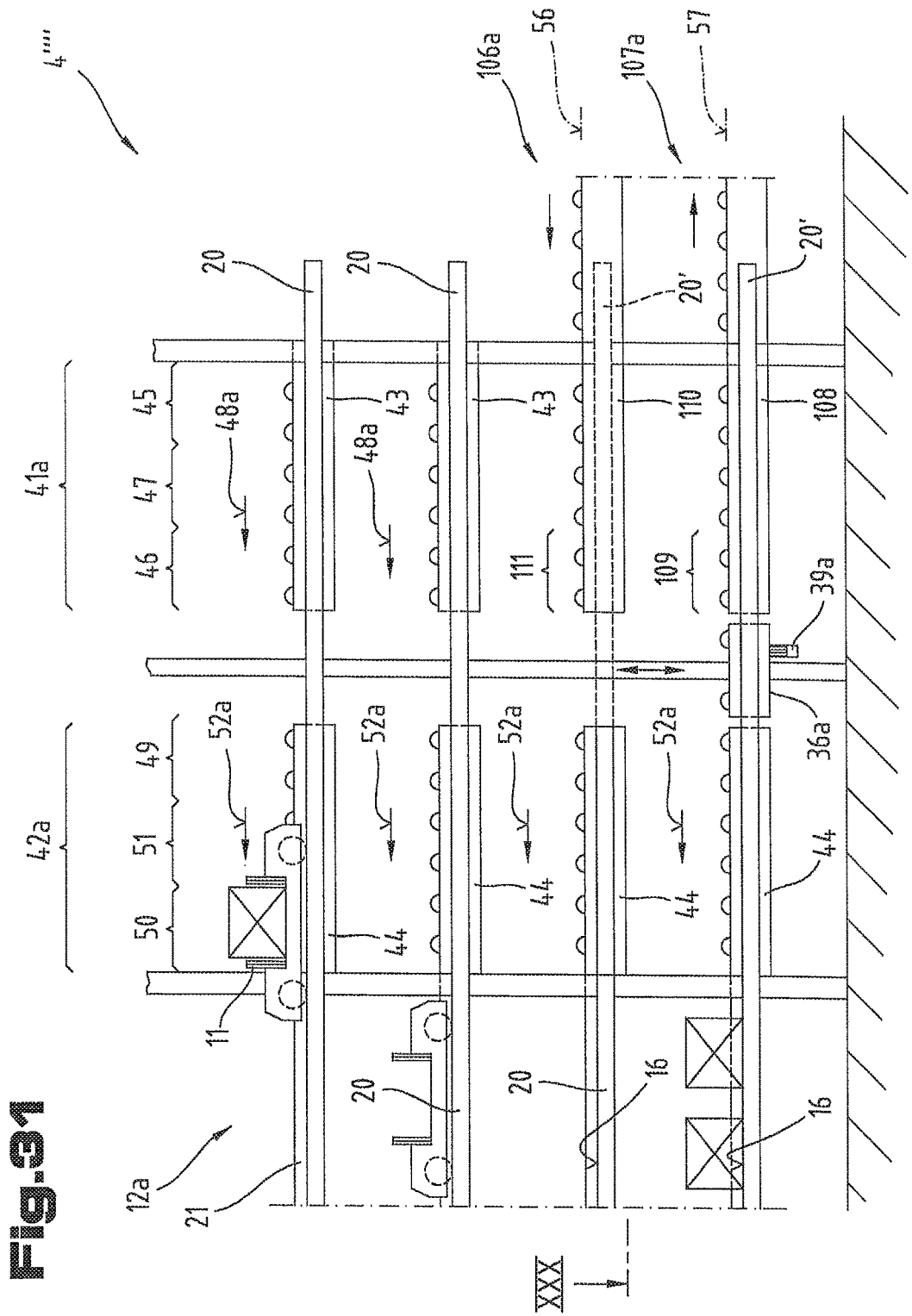

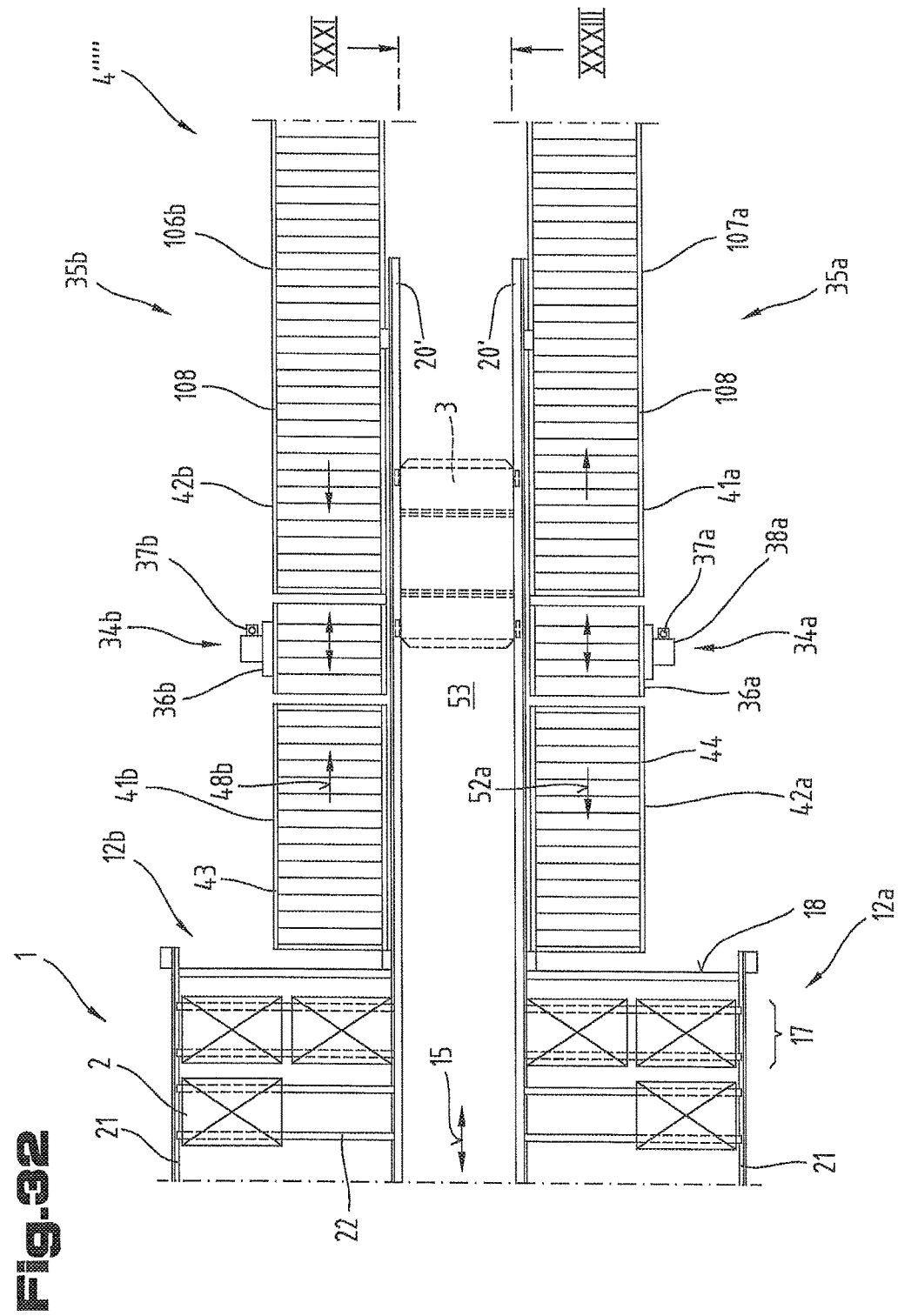

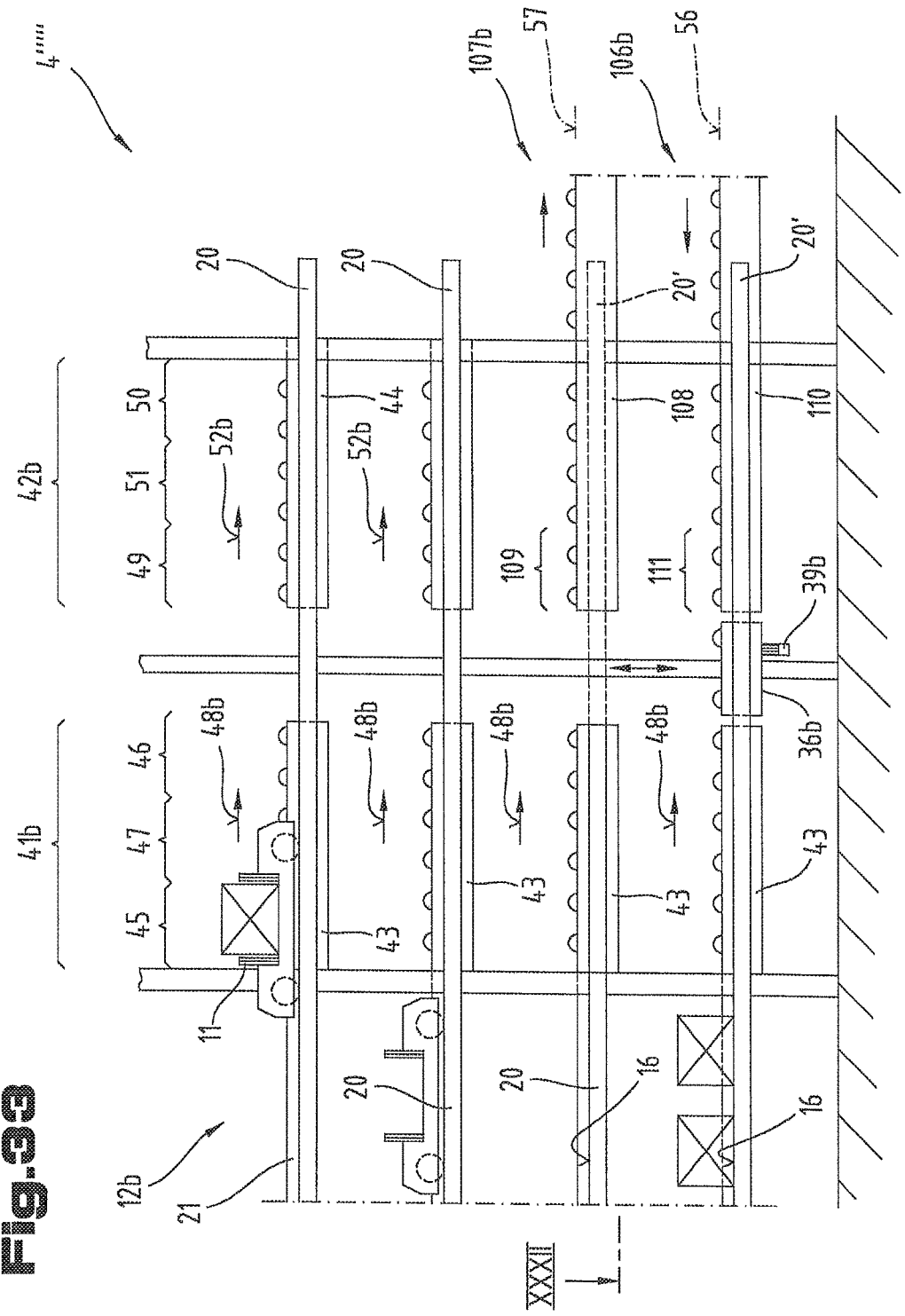

RACK STORAGE SYSTEM AND METHOD FOR OPERATING IT

CROSS REFERENCE TO RELATED APPLICATIONS

This application is the National Stage of PCT/AT2012/050206 filed on Dec. 21, 2012, which claims priority under 35 U.S.C. § 119 of Austrian Application No. A 1864/2011 filed on Dec. 21, 2011; PCT/AT2012/050072 filed on May 16, 2012; and PCT/AT2012/050168 filed on Oct. 24, 2012, the disclosures of which are incorporated by reference. The international application under PCT article 21(2) was not published in English.

The invention relates to a method and a rack storage system comprising storage racks, which have storage places for load in rack levels arranged one above the other, and a load manipulation unit, which has at least a first load-lifting device with a transport device and a first buffer device with transport conveying devices, and at least one rack aisle extending between the storage racks and along the load-lifting device as well as the buffer device, and guide tracks extending in at least some of the rack levels in longitudinal direction of the rack aisle, and at least one single-level rack serving device for transporting load between the storage places in the storage racks and the buffer device in the load manipulation unit, which single-level rack serving device can be moved along the guide tracks, as well as a conveying system for transporting load to and from the load-lifting device, said conveying system being connected to the load-lifting device.

Documents EP 2 327 643 A1 and WO 2011/086009 A1 disclose a shelf storage system comprising a shelving system having storage shelves arranged adjacent to one another and guiding tracks running in shelf levels along a shelving aisle, as well as at least one autonomous conveyor vehicle for transporting the products to the storage places, which conveyor vehicle can be displaced along the guiding tracks. A buffer device with a transport conveying device is provided on the face side, in front of the shelving system at one of the shelf storage sides, with said supplying conveying device arranged on a level with the shelf levels.

A rack storage system of the generic kind is furthermore known from document EP 2 287 093 A1, which rack storage system has a load manipulation unit integrated between the front end rack storage sides in the rack storage, and comprises a first load-lifting device having a transport device and a first buffer device having transport conveying devices. Guide tracks run in longitudinal direction of the rack aisle and pass the first load-lifting device so that a track vehicle can reach a position in front of the load-lifting device.

Document EP 0 733 563 also discloses a shelf storage system comprising a shelving system having storage shelves arranged adjacent to one another and guiding tracks running in shelf levels along a shelving aisle, as well as an autonomous conveyor vehicle in each shelf level for transporting the products to the storage places, which conveyor vehicle can be displaced along the guiding tracks. A buffer device with transport conveying devices is provided in each storage rack, the transport conveying devices arranged on a level with the rack levels. The document does not provide any detailed information on how the processes of storing and retrieving load are performed.

Although these known rack storage systems meet the requirement of a high throughput rate, they have a very complex design and the effort in terms of control engineering is great. This also includes high investment costs.

The objective of the present invention is to propose a rack storage system and a method for operating the same which rack storage system can be realized and operated with little effort in terms of control and mechanics.

The objective of the invention is achieved by the provisioning devices of the first buffer path section each forming a respective removing path for the load in all rack levels where they are arranged in, and by the provisioning devices of the second buffer path section each forming a respective storing path for the load in all rack levels where they are arranged in. In a conveying section and/or an end section adjacent to the load-lifting device, at least one of the conveying devices also comprises a provisioning device for temporarily storing one or more pieces of load, the provisioning devices situated opposite each other on one height level on both sides of the load-lifting device. In those rack levels, where the provisioning devices are arranged in, the (first) guide tracks extend along the rack aisle and the load-lifting device as well as the provisioning devices, so that either the provisioning device in the first buffer path section or the provisioning device in the second buffer path section can be approached by the conveyor vehicle for retrieving load from and/or storing load in the rack storage via the (first) guide tracks in the respective rack level, where the provisioning devices are arranged in. In at least one of the rack levels, where the provisioning devices are arranged in, the (second) guide tracks extend along the rack aisle and the load-lifting device as well as the provisioning devices, so that either the provisioning device of the buffer path section or the provisioning device of the conveying device can be approached by the conveyor vehicle for retrieving and/or storing load via the (second) guide tracks in at least one of the rack levels, where the provisioning devices are arranged in.

The very compact design of the conveying system of the feed area and of the load manipulation unit is advantageous. On a level with the rack levels the conveying devices extend up to the load-lifting device, so that the front edges of the provisioning devices and the conveying devices arranged one above the other are within a vertical plane. In a conveying section and/or an end section adjacent to the load-lifting device, at least one of the conveying devices can also comprise a provisioning device for one or more pieces of load, so that a high throughput rate is achieved even if the load manipulation unit is of such a compact design. Here, the provisioning device can be formed by the conveying device directly or the conveying device includes the provisioning device as a discrete component. It is now possible for the conveying device and/or for the provisioning device to be approached by the conveyor vehicle directly to release load to be retrieved from storage or pick up load to be stored.

A high throughput rate and reliability (redundancy)—as described below in detail—is achieved if the rack storage comprises at least one rack aisle unit, which is provided in the form of storage racks arranged to be adjacent to one another and a rack aisle extending between the latter, as well as if the load manipulation unit with a second load-lifting device with a liftable and lowerable transport device for the storing and retrieving load as well as a second buffer device with provisioning devices for the temporal storage of one or more pieces of load, the rack aisle extending between the adjacent storage racks and along the load-lifting device and the buffer devices, and the conveying system on the one hand comprising a first conveying device for transporting load to the first load-lifting device and a second conveying device for transporting load from the first load-lifting device, and on the other hand a first conveying device for transporting load to the second load-lifting device and a second conveying device for transporting load from the second load-lifting device. In at least some of the rack levels, the second buffer device comprises a fixed first buffer path section and fixed second buffer path section, in which sections the provisioning devices are arranged in. In all rack levels, where they are arranged in, the provisioning devices of the first buffer path section each form a removing path for the load. In all rack levels, where they are arranged in, the provisioning devices of the second buffer path section each form a storing path for the load. In a conveying section and/or an end section adjacent to the load-lifting device, at least one of the conveying devices also comprises a provisioning device for temporal storing one or more pieces of load, the provisioning devices being arranged opposite each other in one height level on both sides of the load-lifting device. In those rack levels, where the provisioning devices are arranged in, the (first) guide tracks extend along the rack aisle and the load-lifting device as well as the provisioning devices, so that either the provisioning device in the first buffer path section or the provisioning device in the second buffer path section can be approached by the conveyor vehicle for retrieving and/or storing load via the (first) guide tracks in the respective rack level, where the provisioning devices are arranged in. In at least one of the rack levels, where the provisioning devices are arranged in, the (second) guide tracks extend along the rack aisle and the load-lifting device as well as the provisioning devices, so that either the provisioning device of the buffer path section or the provisioning device of the conveying device can be approached by the conveyor vehicle for retrieving load from storage and/or storing load in the rack storage via the (second) guide tracks in at least one of the rack levels, where the provisioning devices are arranged in.

It has also turned out to be advantageous if the liftable and lowerable transport device comprises a first gripping unit and a second gripping unit, either gripping unit comprising gripping devices which are configured for relocating load and are arranged on opposite longitudinal sides of the carrying platform, and can be adjusted relative to the carrying platform in both a first direction parallel with the longitudinal sides and a second direction essentially perpendicular to the longitudinal sides. The transport device can be positioned in one of the rack levels between the provisioning devices facing each other or in one of the rack levels between the provisioning device and a conveying device opposite the latter, and the first and/or the second gripping unit can be controlled in such a way that at least a first load and at least a second load can be moved simultaneously by means of the first gripping unit and the second gripping unit, either between the transport device and the transfer or pick-up sections of the provisioning devices or between the transport devices and one of the conveying devices. This being the case, the load is moved exclusively in a horizontal plane by means of the first gripping unit and/or the second gripping unit. It is not necessary to lift/lower the load relative to the stationary bearing tables or the carrying platform during the displacement movement between the transport device and the bearing tables.

Further advantageous embodiments and measures relating to the variants according to the claims 2, 4, 6 to 14 are described below.

The objective of the invention is also achieved by the guide tracks extending continuously along the rack aisle and the load-lifting device as well as the provisioning devices in those rack levels where the provisioning devices are arranged in, the first buffer path section being provided with the provisioning devices and the second buffer path section being provided with the provisioning devices as well as the load-lifting device arranged between the conveying devices and the buffer path sections provided with the liftable and lowerable transport device for storing and retrieving load sideways next to rack aisle along the guide tracks, so that either the provisioning device in the first buffer path section or the provisioning device in the second buffer path section can be approached by the conveyor vehicle for retrieving or storing load via the guide tracks in the respective rack level, and that in all rack levels, where they are arranged in, the provisioning devices of the first buffer path section each form a removing path for the load (exclusively), and in all rack levels where they are arranged in, the provisioning devices of the second buffer path section each form a storing path for the load (exclusively).

The piece/s of load is/are conveyed from the first buffer path section via the load-lifting device to a removal conveying system from where it/they is/are conveyed to a workstation. The second buffer path section however only serves for storing load, which load is fed from a workstation via a storing conveying system. Via the same load-lifting device the load is conveyed to the second buffer path section, from where it is conveyed to the storage rack by means of the single-level rack serving device. Thereby a substantial simplification in terms of control engineering as well as the constructional design is achieved.

It is also advantageous if the first conveying device for transporting the load to the load-lifting device and the second conveying device for transporting the load from the load-lifting device of several rack aisles is connected to an automated distribution system, the distribution system is adopted for transporting the load to and from the conveying devices. Two or more rack aisle units or rack aisles follow the distribution system, so that it is not required for the rack aisle units and/or rack aisles to be operated at full power for storing and retrieving load. This has a favorable effect on the availability of the rack storage system.

A space-saving arrangement and/or an adaption of the conveying system of the feed area to different requirements is achieved if the first conveying device and the second conveying device form first conveying sections running parallel with the rack aisle and aligned facing each other as well as if one of the conveying devices forms a second conveying section and a third conveying section running parallel with the rack aisle, the first and the third conveying section being offset to each other within a preferred horizontal conveying system plane, or the first and the third conveying section being arranged in conveying system planes positioned one above the other, the first and the third conveying section being connected via the second conveying section.

It is also advantageous if the rack storage comprises at least two rack aisle units each rack aisle unit of which is formed by adjacent storage racks and a rack aisle extending between them and comprises the load manipulation unit, and if the first conveying sections of the conveying devices extend in the extension of a storage rack of the first rack aisle unit and the third conveying section of the conveying device extends in the extension of a storage rack of the second rack aisle unit. This arrangement allows a maximum exploitation of the usable storage space and an optimum accessibility of the conveying system, for example in the event of failure or for maintenance reasons.

It can also be advantageous if the rack storage comprises at least two rack aisle units, each rack aisle unit of which is formed by adjacent storage racks and a rack aisle extending between them and comprises the load manipulation unit, the rack aisle units being arranged at a mutual distance, so that an aisle is formed between the adjacent storage racks of the rack aisle units, in the extension of which aisle or within which aisle a part of the third conveying section extends. Thereby, space-saving arrangement of the conveying systems of the feed area is achieved and two load-lifting devices can be arranged in the available space in each rack aisle unit. If two load-lifting devices are provided in each rack aisle unit, these are arranged to be laterally reversed with respect to the third conveying section. With this arrangement, the third conveying section can be used for both the first load-lifting device and for the second load-lifting device.

It can also be advantageous if the rack storage comprises at least one rack aisle unit, which is provided in the form of adjacent storage racks and a rack aisle extending between them, and comprises the load manipulation unit, and if the first conveying sections of the conveying devices extend in the extension of a storage rack of the rack aisle unit and the third conveying section of the conveying device in the extension of the rack aisle. Also this embodiment allows the arrangement of two load-lifting devices in the space available in each rack aisle unit and laterally reversed with respect to the third conveying section.

It is also advantageous if the rack storage comprises at least one rack aisle unit which is formed by adjacent storage racks and a rack aisle extending between them, as well as the load manipulation unit with a second load-lifting device with a liftable and lowerable transport device, for storing and retrieving load as well as a second buffer device having provisioning devices for temporarily storing one or more pieces of load, the rack aisle extending between the adjacent storage racks and along the load-lifting device as well as the buffer device.

Arranging a first buffer path section and a second buffer path section on either sides of the rack aisle in each case is advantageous in terms of reliability (redundancy). If there is a malfunction in one of the load-lifting devices, the operation—thus the storing and retrieving of load—can be continued via the working load-lifting device. It is not required to change the control sequence or the conveying directions and the conveying flow of the working load-lifting device while storing and/or retrieving load.

During a removing operation and controlled by a material flow computer, the single-level rack serving device can furthermore approach a pick-up section optionally in the first buffer path section of either the left side of the rack aisle or the right side of the rack aisle for releasing a piece of load to be retrieved. It is thus possible to form a sequence having the order at which the load has been retrieved from the rack storage.

During a storing process and controlled by a material flow computer, the single-level rack serving device can however approach a pick-up section optionally in the first buffer path section of either the left side of the rack aisle or the right side of the rack aisle for picking up a load to be stored.

It is furthermore possible to achieve a high throughput rate for the rack storage system at comparably low investment costs.

It is also of advantage if the conveying system for transporting load to and from the load-lifting device comprises at least one transfer and pick-up device for one or more pieces of load, the transfer and pick-up device directly following the first conveying device and/or second conveying device of the conveying system, and if the guide track in each rack level where the conveying system for transporting load to and from the load-lifting device is arranged in, extends along the transfer and pick-up device, and the transfer and pick-up device can be approached by the conveyor vehicle by means of the guide track, so that load to be retrieved or stored can be conveyed between the conveyor vehicle and the transfer and pick-up device. It is thereby also possible to provide storage places for load also in that rack level where the conveying system for transporting load to and from the load-lifting device is arranged in, and to use the usable storage volume in an optimum way.

An embodiment is also advantageous where the liftable and lowerable transport device comprises a first gripping unit and a second gripping unit, each of the gripping units comprising gripping devices for relocating load, which gripping devices are situated on opposite longitudinal sides of the carrying platform and can be adjusted relative with respect to the carrying platform in a first direction parallel with the longitudinal sides and/or in a second direction essentially perpendicular to the longitudinal sides, in particular in a first direction parallel with the longitudinal sides as well as in a second direction essentially perpendicular to the longitudinal sides, and at least a first load can be moved by means of the first gripping unit either from one of the pick-up and/or transfer sections in the first buffer path section or by the first conveying system for transporting load to the transport device and at least a second load can be moved by means of the second gripping unit from the transport device either onto one of the pick-up and/or transfer sections in the second buffer path section or onto the second conveying system for retrieving load at the same time. This being the case, the load is exclusively moved in a horizontal plane by means of the first gripping unit and/or the second gripping unit. It is not necessary to lift/lower the load relative to the stationary bearing tables or the carrying platform during the displacement movement between the transport device and the bearing tables.

It is also advantageous if the liftable and lowerable transport device for one or more pieces of load in addition to the gripping units comprises one or more conveying devices arranged one behind the other in conveying direction. It is thereby possible to perform a conveying movement of the individual piece of load or of several pieces of load on the transport devices at the same time as the vertical adjustment movement of the transport device is taking place, in order to create a sorting sequence for an order or to allow positioning the individual piece of load or several pieces of load prior to the load being released to a storing path.

While the provisioning devices according to the first embodiment form one stationary bearing table (without conveying elements) for one or more pieces of load in each pick-up and/or transfer section, it is possible for the provisioning devices according to the second embodiment to be designed as transport conveying devices.

The transport device of the load-lifting device can be such positioned and (motor-) driven in some of the rack levels that at the same time at least a first load and at least a second load can be respectively conveyed from the transport conveying device in the first buffer path section onto the transport device and from the transport device to the transport conveying device in the second buffer path section.

The first buffer path section serves a process of retrieving load from a storage rack according to an order. This order can include one or more pieces of load. The piece/s of load is/are conveyed from the first buffer path section via the load-lifting device to a removal conveyor system from where it/they is/are conveyed to a workstation. The second buffer path section however only serves for storing load, which load is fed from a workstation via a storing conveying system. Via the same load-lifting device the load is conveyed to the second buffer path section, from where it is conveyed to the storage rack by means of the single-level rack serving device.

According to the invention, a so-called "double-cross" is realized while the load is being transferred between the first buffer path section and the load-lifting device and/or between the load-lifting device and the second buffer path section. "Double-cross" refers to simultaneously manipulating and/or moving load to be "retrieved from the rack storage" and of load to be "stored to the rack storage". It is however also possible that several pieces of load to be "retrieved" and several pieces of load to be "stored" are being manipulated at the same time. It is preferred if the number of pieces of load to be "retrieved" corresponds to the number of pieces of load to be "stored" and the number can vary between one piece of load, two, three or four pieces of load. It is also possible to correspondingly define the intake capacity of load on the transport device as well as on the transfer section adjacent to the load-lifting device. A high throughput rate is achieved by means of the described measures.

If one load-lifting device is used exclusively, the provisioning devices, in particular transport conveying devices and bearing tables, of the first buffer path section and provisioning devices, in particular transport conveying device and bearing tables, of the second buffer path section are arranged to be upstream and downstream of the load-lifting device relative to the rack aisle and sideways next to the guide track. Optionally controlled by a material flow computer, the single-level rack serving device can approach either a transfer section in the first buffer path section for releasing load to be retrieved or a pick-up section in the second buffer path section for picking up load to be stored.

The modular design of the load manipulation unit allows that the performance of the system is easily and in small steps scaled between a maximum throughput rate and normal throughput rate.

It is thus possible to configure the rack storage system for different purposes without converting the storage capacity. The performance of the system can grow as flexible as the actual customer's actual business.

The load manipulation unit is provided in the form of simple, standardized transport conveying devices and the load-lifting device, so that the investment costs is considerably lower as compared to rack storage systems known from prior art.

At least in some of the rack levels in the first buffer path section and second buffer path section, the second buffer device can comprise the transport conveying devices arranged in a fixed position, as described above, between which transport conveying devices the transport device of the load-lifting device can be positioned and (motor-)driven in such a way in at least some of the rack levels, that simultaneously at least a first load and at least a second load can be respectively conveyed from the first buffer path section to the transport device and from the transport device to the second buffer path section.

If the transport conveying devices have opposite conveying directions on the left side of the rack aisle and of the right side of the rack aisle respectively, the single-level rack serving device can alternately release a first load and pick up a second load in the first holding position upstream of the transfer and pick-up sections of the buffer path sections which sections are positioned to be opposite each other perpendicular to the rack aisle and/or in the second holding position upstream of the transfer and pick-up sections of the buffer path sections which sections are positioned to be opposite each other perpendicular to the rack aisle. The load-lifting devices are here positioned at a distance at least corresponding to the width of an aisle and arranged laterally reversed opposite each other.

It is also advantageous if the transport conveying devices in the first buffer path section are formed by accumulating tracks conveying the load from a pick-up section remote from the load-lifting device to a transfer section adjacent to the load-lifting device in one single conveying direction, and the pick-up section can be approached by the single-level rack serving device and a load can be relocated to the pick-up section from the single-level rack serving device. Also the transport conveying devices in the second buffer path section can be formed by accumulating tracks conveying the load from a pick-up section adjacent to the load-lifting device to a transfer section remote from the load-lifting device in one single conveying direction, and the transfer section can be approached by the single-level rack serving device and load can be relocated from the transfer section to the single-level rack serving device. It is consequently possible to operate the accumulating tracks without reversing drive, which enables a simplification of the control system and the mechanical design of the transport conveying devices which are present in a large number.

Another advantageous embodiment of the invention shows the accumulating tracks each forming at least one buffer section between the transfer place and the pick-up place. It is thereby possible to avoid so-called "unbalanced loads". The term "unbalanced loads" refers to the "uneven" distribution of orders between several rack levels. If, e.g., an order requires 10 articles and consequently 10 pieces of load (storage containers) which are not distributed in several rack levels but in one single rack level, the single-level rack serving device has to retrieve 10 pieces of load and is consequently required to move back and forth between the rack storage and the load manipulation unit several times correspondingly. If correspondingly dimensioned buffer sections are provided at the transport conveying devices, an even and/or continuous removal of load can be performed despite "unbalanced load". It is preferred if two or three buffer places for load are provided.

If the load-lifting devices are arranged relative to one another at a distance equal to at least the width of an aisle and axially offset in the direction of the rack aisle, it is possible to operate the first load-lifting device by means of the first single-level rack serving device and the second load-lifting device by means of the second single-level rack serving device at the same time.

It is also advantage if the conveying system comprises a conveying device connected to the load-lifting device for transporting load to the load-lifting device and a second conveying device for transporting load from the load-lifting device, and the transport device of the load-lifting device can be positioned and (motor-)driven between the conveying devices opposite each other in such a way that simultaneously at least a first load and at least a second load can be respectively conveyed from the first conveying device onto the transport device and from the transport device onto the second conveying device. According to the invention, a so-called "double-cross" is realized when the load is being transferred between the first conveying device and the transport device and/or between the transport device and the second conveying device, as described above. It is preferred if the number of pieces of load to be "retrieved" correspond to the number of pieces of load to be "stored" and the number can vary between one piece of load, two, three or four pieces of load. It is also possible to correspondingly define the capacity of pieces of load to be received by the transport device as well as by the transfer section (46') at the first conveying device and transfer section (45') at the second conveying device, which transfer sections are adjacent to the load-lifting device. A high throughput rate is achieved by means of the described measures.

It is also possible that the first conveying device for transporting load to the load-lifting device comprises conveying sections extending in conveying system planes one above the other and parallel with the rack aisle, which planes are connected to one another by means of a transfer lifter. This ensures a high storage capacity in the rack storage and a continuous provision of load at a transfer section (46') at the first conveying device. The transfer lifter can be arranged in the lower height region (bottom) of the rack storage or in the upper height region of the rack storage. It is also possible to provide two transfer lifters, the first of which transfer lifters is arranged in the lower height region (bottom) of the rack storage and the second transfer lifter in the upper height region of the rack storage.

Another advantageous embodiment of the invention is where the conveying system comprises a first conveying device connected to the respective load-lifting device for transporting load to the load-lifting device, and a second conveying device for transporting load from the load-lifting device, and a processing track running in the rack aisle, as well as a delivery device for transporting load from the processing track onto the first conveying device. The processing track, delivery device and/or conveying devices can be situated in one single height level or in different height levels. Thereby a simple conveying system can be created and a continuous provision of load at a transfer section (46') at the first conveying device can be ensured.

A space-saving arrangement of the load manipulation unit is achieved if it is directly arranged at the front ends of the storage racks or if it is integrated in the rack storage.

Another advantageous embodiment is given if the first conveying device for transporting load to the first load-lifting device and the second conveying device for transporting load from the first load-lifting device are connected to a first workstation and the first conveying device for transporting load to the second load-lifting device and the second conveying device for transporting load from the second load-lifting device are connected to a second workstation. Since the processes of transporting load to and transporting load from workstations are completely decoupled from one another, it is possible for the first workstation to work independently of the second workstation. The load is conveyed directly from the rack storage via the first load-lifting device and the second conveying system to the first workstation and/or via the second load-lifting device and the second conveying system to the second workstation, and after a completed working process, e.g. an order picking process or loading process of a load carrier, directly conveyed from the first workstation via the first conveying system and the first load-lifting device and/or from the second workstation via the first conveying system and the second load-lifting device. Thereby, the conveying flow of the load is separated and independently operating conveying circuits for load are created.

It can also be of advantage if the transport device of the load-lifting device is such positioned and (motor-) driven in at least some of the rack levels between a first buffer path section and a second buffer path section that simultaneously a first load and a second load are respectively conveyed from the first buffer path section onto the transport device and from the transport device onto the second buffer path section.

The objective of the invention is also achieved by the buffer device comprising a first buffer path section and a second buffer path section arranged in a fixed position in at least some of the rack levels, in which sections the transport conveying devices are arranged in, the transport conveying devices of the first buffer device each comprising one single (non-reversible) accumulating track conveying the load in the same conveying direction in all rack levels where these (transport conveying devices) are arranged in. The first buffer path section exclusively configured for performing a process of retrieving load according to an order. This order can include one or more pieces of load. The piece/s of load is/are conveyed from the first buffer path section via the load-lifting device to a removal conveyor system from where it/they is/are conveyed to a working station. The second buffer path section however only serves for storing load, which load is fed from a workstation via a storing conveying system. Via the same load-lifting device the load is conveyed to the second buffer path section, from where it is conveyed to the storage rack by means of the single-level rack serving device.

In terms of control engineering and construction, it is of essential advantage if on the one hand all first transport conveying devices, and on the other hand also all second transport conveying devices are driven in one single conveying direction inside the buffer device in all rack levels where the first transport conveying devices and the second transport conveying devices are arranged in, the conveying directions of any first transport conveying devices and/or any second transport conveying device being the same.

Further advantageous embodiments and measures, in particular the manipulation of the load by applying the "double-cross", the arrangement of a second load-lifting device and suchlike are described above.

This "double-cross" is used for increasing performance, it is however understood that this does not constitute a compulsory necessity according to the achievement of the present objective.

For a better understanding of the invention the latter is explained in more detail with reference to the following Figures.

In a much simplified, schematic representation:

FIG. 31 shows lateral view of the load manipulation unit according to line XXXI in FIG. 30 and/or FIG. 32;

FIG. 32 shows a detail of a rack storage system having a rack storage and a fourth embodiment of a load manipulation unit as well as a seventh embodiment of the conveying system of the feed area for supplying and removing load in top view;

FIG. 33 shows lateral view of the load manipulation unit according to line XXXIII in FIG. 32.

Figure 1:
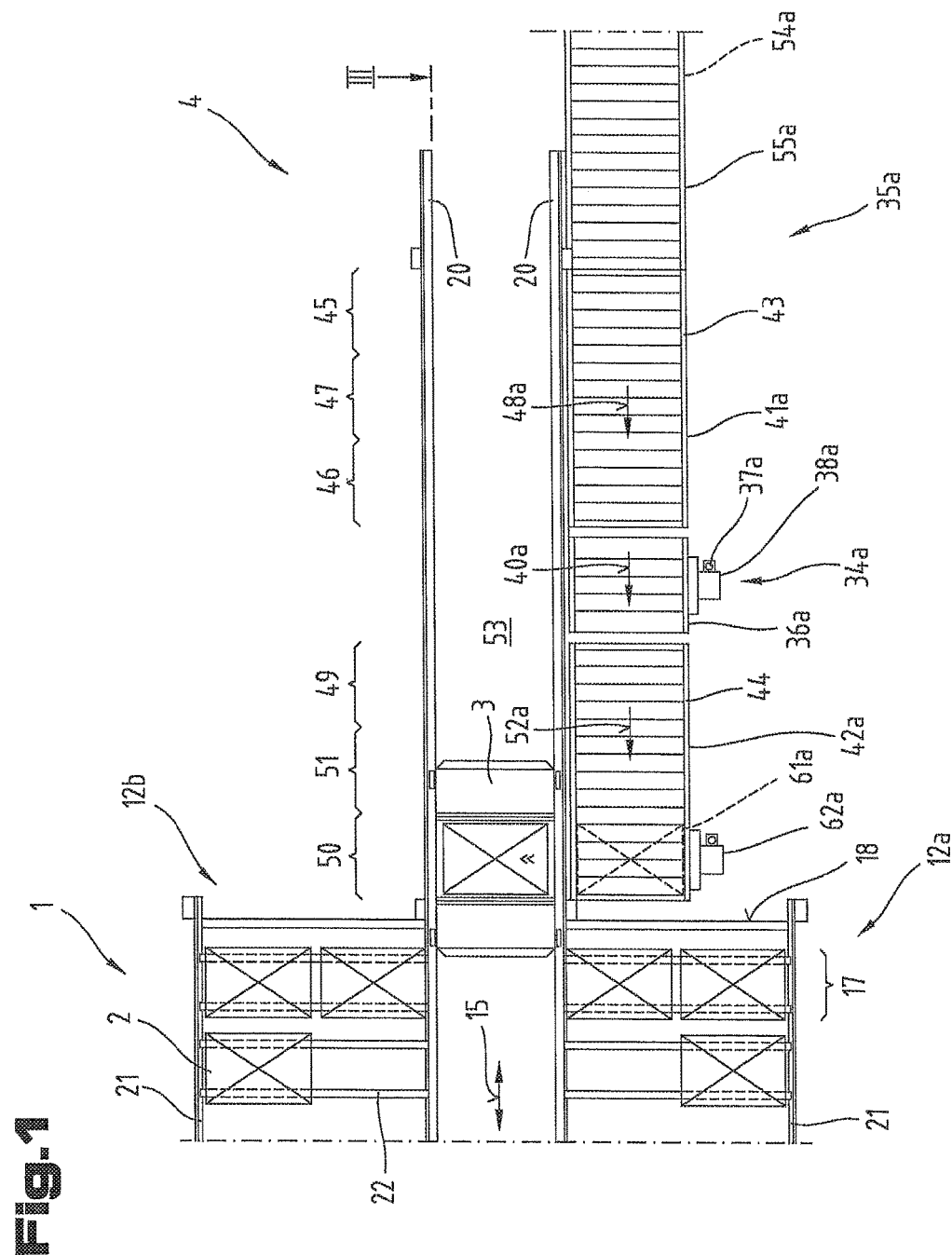
FIG. 1 shows a detail of a rack storage system having a rack storage and a first embodiment of a load manipulation unit in top view.

First of all, it should be noted that in the variously described exemplary embodiments the same parts have been given the same reference numerals and/or the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position. It is also stated that for better clarity of the Figures, only a few rack levels 16 are shown. It is rather the case that the subsequently described rack storage system usually includes between 15 and 25 rack levels.

FIGS. 1 to 5 show a first embodiment of a rack storage system, which comprises a rack storage 1 for load 2, at least one self-propelled, autonomic conveyor vehicle 3, a fully automated load manipulation unit 4 and optionally a conveyor vehicle-lifting device 5.

Figure 4:
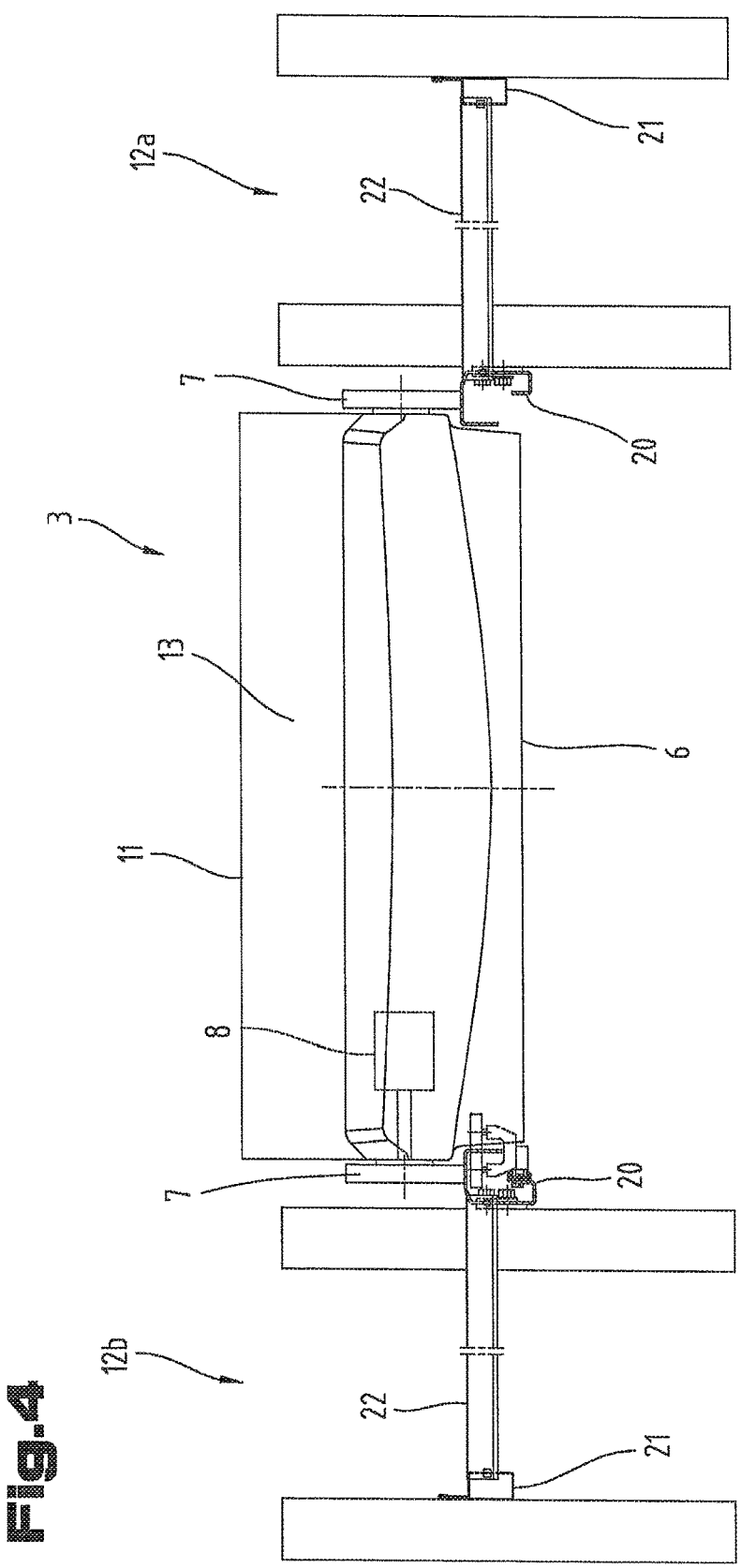
FIG. 4 shows a front view of the rack storage and a conveyor vehicle.
Figure 5:
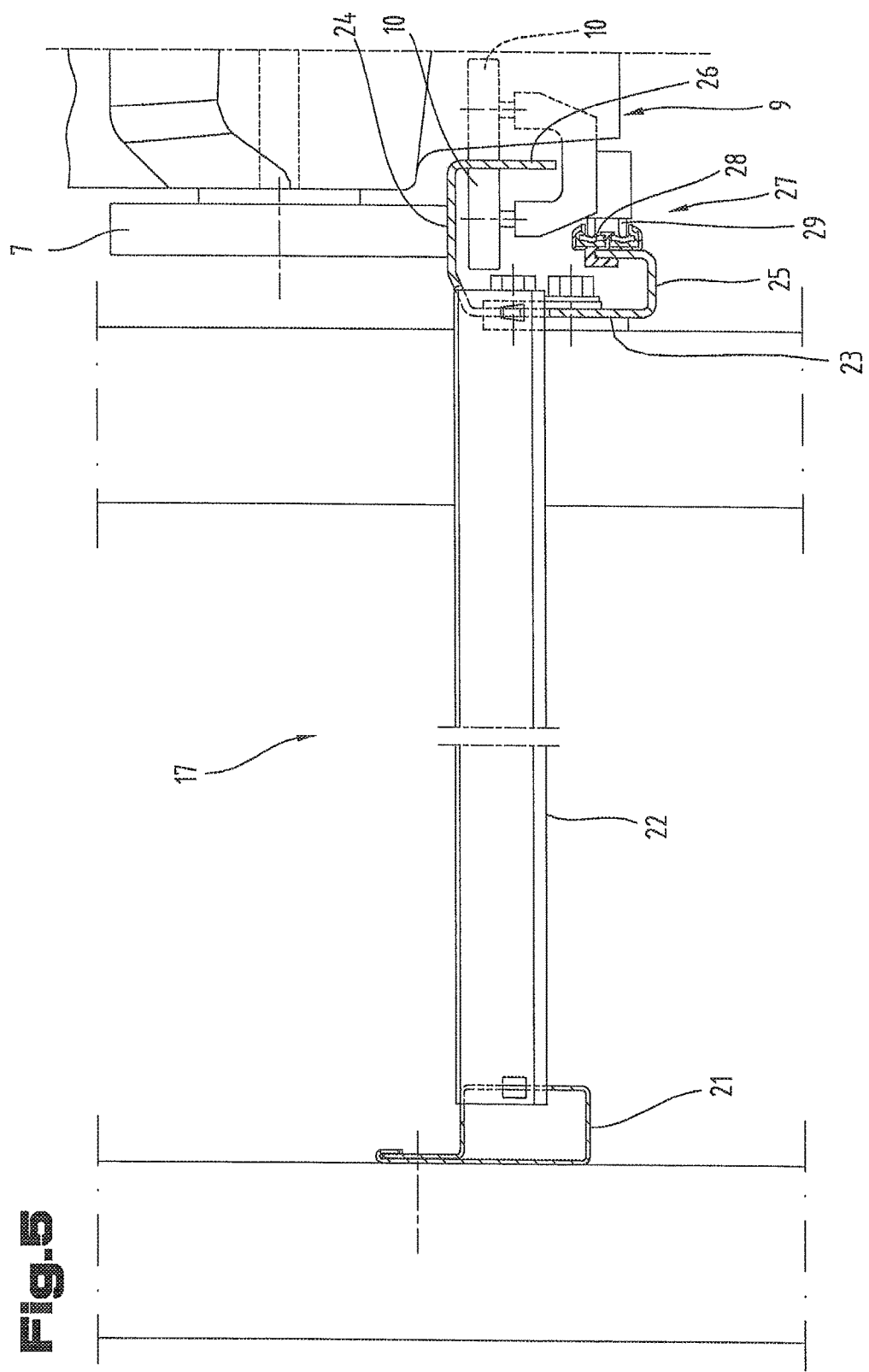
FIG. 5 shows an enlarged view of a section of FIG. 4.

The conveyor vehicle 3 is a single-level rack serving device (shuttle) and comprises, as shown in the FIGS. 4 and 5, a base frame 6, carrying wheels 7, a travel motor 8 for driving at least one carrying wheel 7, a guide device 9 having guide wheels 10, as well as a load receiving device 11, e.g. for storing load 2 in and retrieving load 2 from a storage rack 12a, 12b of the rack storage 1. According to the embodiment shown, the load receiving device 11 comprises telescopic arms 13 which can be extended to both sides relative to the conveyor vehicle 3, and drive elements 14 (FIG. 2) for collecting a load 2 are arranged on each of these telescopic arms. Such a load receiving device 11 is e.g. known from document US 2005/0095095 A1 or EP 0 647 575 A1, and can be advantageously used due to the compact design of the telescopic arms 13 and the reliable operation. The load 2 is e.g. containers, cardboard boxes, tablets and suchlike, or an item.

The rack storage 1 has storage racks 12a, 12b arranged to be parallel at a distance, between which at least one rack aisle 15 extends and which form storage places 17 for the load 2 each, and the storage places are provided one next to the other and in rack levels 16 arranged one above the other. The rack storage 1 forms a first rack storage side 18 and a second rack storage side 19 the face sides of which are arranged to be opposite each other. The rack storage 1 can of course comprise a number of storage racks 12a, 12b and some rack aisles 15 arranged between some adjacent storage racks 12a, 12b.

The storage racks 12a, 12b each comprise vertical front rack rails adjacent to the rack aisle 15 and vertical rear rack rails remote from the rack aisle 15, at least one horizontal front beam 20 extending between the front rack rails in the respective rack level 18 and at least one horizontal rear beam 21 extending between the rear rack rails in the respective rack level 16. The horizontal beams 20, 21 are connected with the rack rails by fastening means, such as screws.

The front horizontal beams 20 extend in longitudinal direction of the rack aisle 15 (x-direction), the horizontal beams 20 arranged as opposing pairs in the respective rack level 16 forming a guide track along which the conveyor vehicle 3 can be moved.

The horizontal beams 20, 21 in the respective rack level 16 are connected to one another by cross members 22 forming the storage places 17 and/or the storage area. The cross members 22 extend between the horizontal beams 20, 21 in depth direction of a rack compartment (z-direction). According to the embodiment shown, the storage racks 12a, 12b form storage places 17 for the load 2 in the rack levels 16, and the storage places are each arranged to be next to one another and behind one another, so that two pieces of load 2 can be stored in the depth direction of the storage racks 12a, 12b, and thus, a so-called "double deep" storage is allowed. It is however also possible that the storage racks 12a, 12b form storage places 17 for the load 2 in the rack levels 16, and the storage places are exclusively arranged next to one another, so that only one piece of load 2 can be stored in the depth direction of the storage racks 12a, 12b, and thus, a so-called "single deep" storage is allowed.

The front horizontal beam 20, see FIG. 5, comprises a tie bar 23, an horizontal upper profile flange 24 angled from the latter, a lower profile flange 25 angled away from the tie bar 23, and a guiding web 26 angled away from the upper profile flange 24. The upper profile flange 24 forms a horizontal running surface for the carrying wheels 7 of the conveyor vehicle 3, and the guiding web 26 forms oppositely situated guiding surfaces for the guide wheels 10 of the guide device 9. The lower profile flange 25 forms a horizontal profile leg and a vertical profile leg angled away from the latter. One of the front horizontal beams 20 arranged as opposing pairs the respective rack level 16 is provided with an electrical energy supply system 27, in particular a conductor line arrangement. This is fixed to the vertical profile leg of the lower profile flange 25, as shown in detail in FIG. 5.

The electrical energy supply system 27 essentially extends across the complete length of the front horizontal beams 20, so that the mobile conveyor vehicle 3 is supplied with electrical energy while it is traveling along the horizontal beams between the rack storage 1 and the load manipulation unit 4 with the energy supply system 27. This being the case, the electrical energy for the travel motor 8 of the conveyor vehicle 3 and/or control signals for the conveyor vehicle 3 are supplied by means of conductor lines 28 arranged at the horizontal beam 20, and the supplied energy can be collected from the conductor lines 28 by means of current collectors 29 arranged at the conveyor vehicle 3 (see FIG. 5), in particular sliding contacts, such as spring activated carbon brushes.

In view of economic considerations it might be advantageous if a conveyor vehicle 3 is used on more than one rack levels 16. It is e.g. possible to use each conveyor vehicle 3 for three rack levels 16. If, in turn, one conveyor vehicle 3 is provided for each rack level 16, a conveyor vehicle-lifting device 5, as shown in FIG. 2, is not required.

If the number of conveyor vehicles 3 is lower than the number of rack levels 16, the conveyor vehicle-lifting device 5 is used, which can place a conveyor vehicle 3 on different rack levels 16 and receive it from different rack levels 16.

The conveyor vehicle-lifting device 5 (switching device) is arranged on the front side of the second rack storage side 19 upstream of the rack storage 1 and comprises a guide frame 30 and a receiving device 32 for the conveyor vehicle 3 which receiving device can be lifted and lowered via a lift drive 31 at the guide frame 30. The receiving device 32 comprises horizontal beams 33 which extend horizontally at a mutual distance parallel with respect to the rack aisle 15 (x-direction). By means of the lifting movement, the receiving device 32 is moved relative to the rack levels 16 in vertical direction (y-direction) up to a y-position determined by a computer system.

Figure 2:
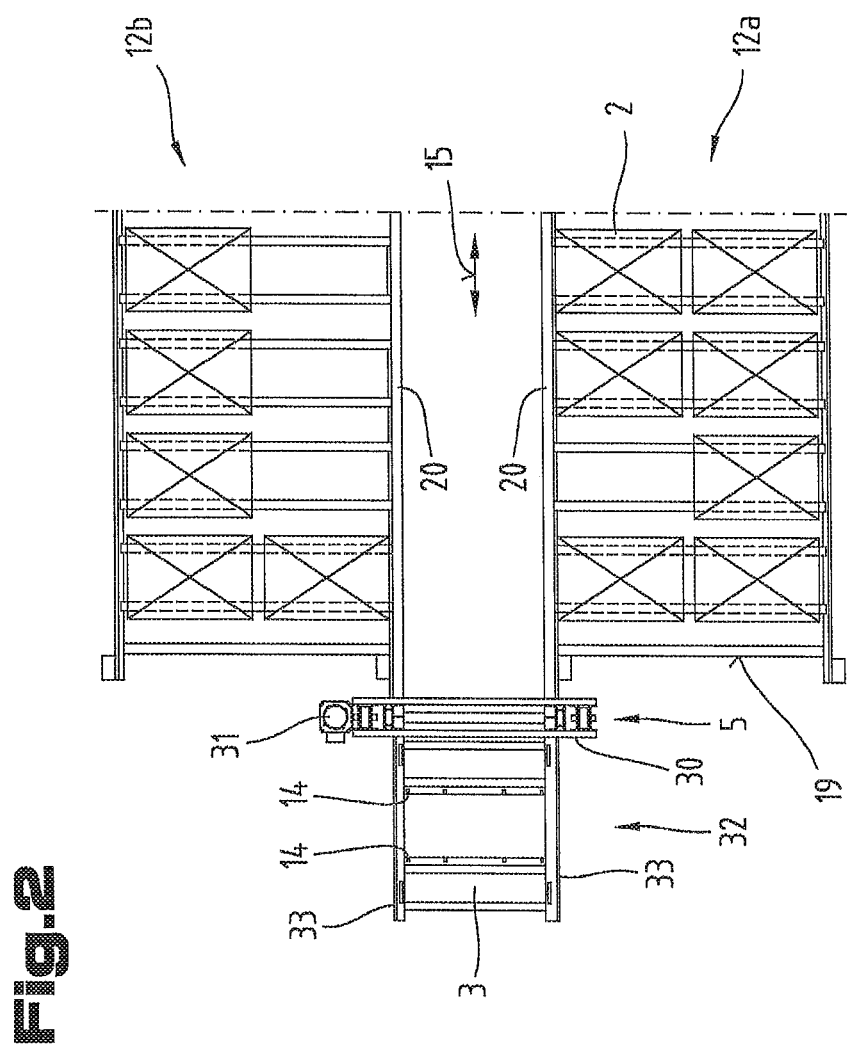
FIG. 2 shows a detail of a rack storage and a conveyor vehicle-lifting device in top view.
Figure 3:
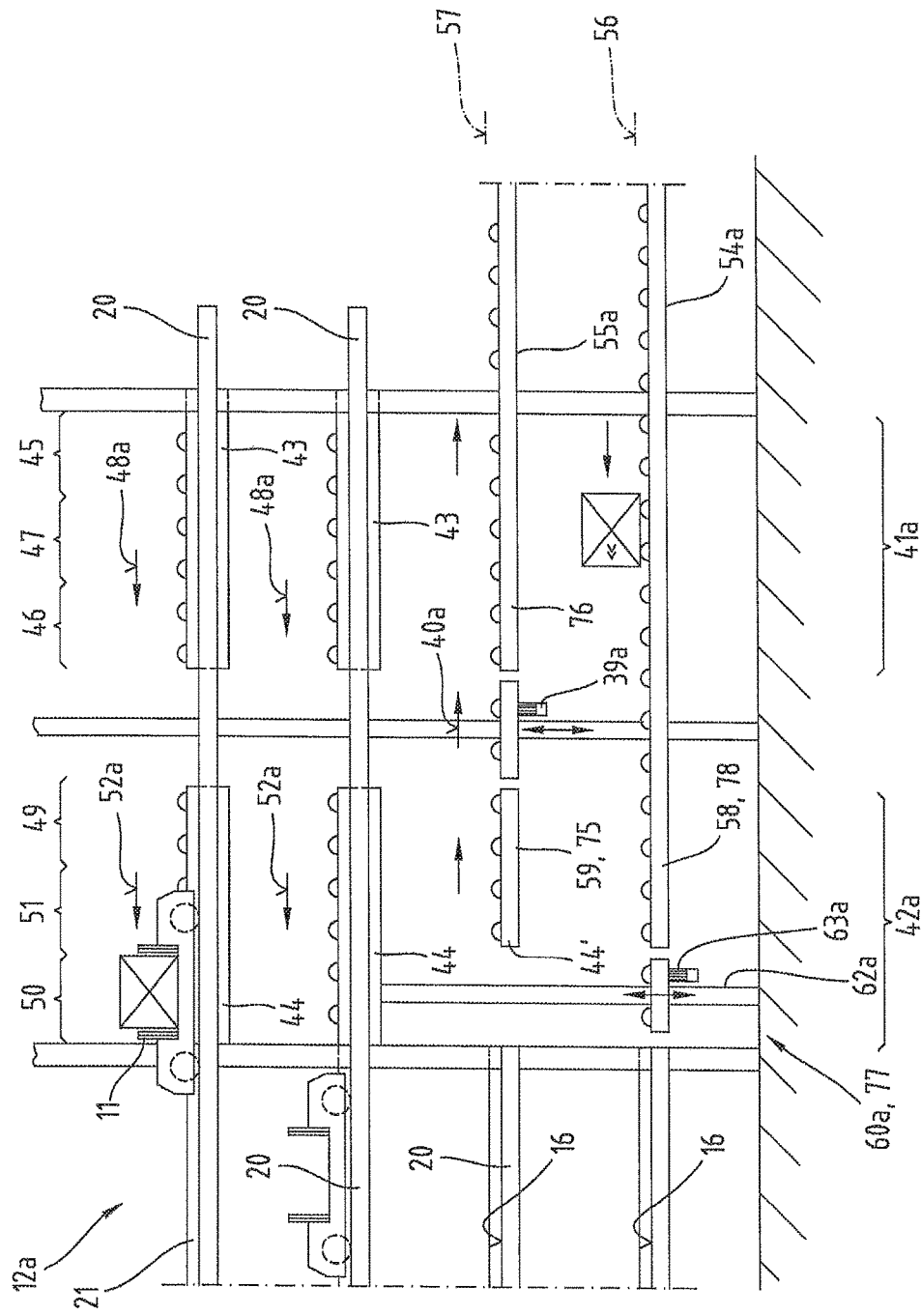
FIG. 3 shows lateral view of the load manipulation unit according to line III in FIG. 1.

As shown in a first embodiment in the FIGS. 1 to 3, the load manipulation unit 4 comprises a first load-lifting device 34a arranged at the front side upstream of the storage racks 12a, 12b, and a first buffer device 35a for temporarily storing load 2.

The load-lifting device 34a arranged in a fixed position comprises a liftable and lowerable transport device 36a for a load 2, and the transport device 36a is built on a lifting frame which may be vertically adjusted by a lift drive 37a. According to the embodiment shown, the transport device 36a is disposed on a first mast 38a via the lifting frame.

The transport device 36a comprises a conveying device which can be reversibly driven by a drive motor 39a (FIG. 3) and has a conveying direction which runs parallel with the rack aisle 15 and is reversible, and which transport device can receive a load 2. If the transport device 36a is positioned between transport conveying devices 43, 44 facing each other, as shown in FIG. 1, the conveying direction 40a corresponds to the conveying directions of the transport conveying devices 43, 44. But if the transport device 36a is positioned between conveying devices 54a, 55a facing each other, as shown in FIG. 3, the conveying direction 40a corresponds to the conveying directions of the conveying devices 54a, 55a. The conveying device can e.g. be a roller track or a roller conveyor or suchlike.

The fixed buffer device 35a comprises a first buffer path section 41a and a second buffer path section 42a, and transport conveying devices 43, 44 are arranged one above the other in each of these buffer path sections 41a, 42a at least in some rack levels 16.

As FIG. 3 shows, no transport conveying devices 43, 44 for allowing the arrangement of a conveying system for transporting load 2 to the load-lifting device 34a and for transporting load 2 from the load-lifting device 34a are provided on the one hand in the lower two rack levels 16 of the first buffer path section 41a and, on the other hand, in the one lower rack level 16 of the second buffer path section 42a.

The transport conveying device 43 in the first buffer path section 41a are each formed by accumulating tracks comprising a pick-up section 45, a transfer section 46 and at least one buffer section 47 between them. The pick-up sections, transfer sections and buffer sections 45, 46, 47 each comprise one single pick up and transfer place and at least one buffer place. It is possible that the load 2 is conveyed from the pick-up section 45 remote from the load-lifting device 34a to the transfer section 46 adjacent to the load-lifting device 34a in one single conveying direction 48a.

The transport conveying devices 44 in the second buffer path section 42a are each formed by accumulating tracks comprising a pick-up place 49, a transfer section 50 and at least one buffer section 51 between them. It is preferred if two or three buffer places are provided. It is possible for the load 2 to be conveyed from the pick-up section 49 adjacent to the load-lifting device 34a to the transfer section 50 remote from the load-lifting device 34a in one single conveying direction 52a.

Consequently, the transport conveying device 43 in the first buffer path section 41a serves for a process of retrieving load 2 and the transport conveying device 44 in the second buffer path section 42a serves for a process of storing load 2.

The transport conveying devices 43, 44 and/or the accumulating tracks are accumulation roller conveyors, accumulation band conveyors and suchlike, and each accumulation position forms the pick-up place 45, 49, the transfer place 46, 50 and the at least one buffer place 47, 51. Thus, at least three pieces of load 2, preferably four pieces of load 2 can be temporarily stored on one transport conveying device 43, 44.

As shown in FIGS. 1 and 3, the transport conveying devices 43, 44 have one single (non-reversible) conveying direction 48a, 52a in the respective rack levels 16. In other words, the transport conveying devices 43, 44 and/or the accumulating tracks are driven in one single (non-reversible) conveying direction 48a, 52a in all rack levels 16 where they are arranged in. It is preferred if the transport conveying devices 43, 44 and/or the accumulating tracks are driven in one single (non-reversible) conveying direction 48a, 52a, as shown in FIGS. 1 and 3, from the right to the left hand side, in each common rack level 16 where they are arranged in. Only the conveying direction 40a of the transport device 36a is reversible, as described above.

As FIGS. 1 and 3 show, horizontal beams 20 extend along the load manipulation unit 4 in longitudinal direction of the rack aisle 15 (x-direction) and in at least some of the rack levels 16. The end sections of the horizontal beams 20 are connected with vertical rails via fastening means, such as screws.

For e.g. manufacturing reasons in producing the front horizontal beams 20, or for reasons related to the assembly of the front horizontal beam 20 and suchlike, it may turn out to be advantageous that several front horizontal beams 20 are strung together in longitudinal direction of the rack aisle 15, and then, the horizontal beams 20 are connected with one another and/or with the rack and vertical rails via a connection device at their end sections facing one another. The cross-section of the strung together horizontal beams 20 is identical in this case.

The horizontal beams 20 arranged as opposing pairs in the respective rack level 16 form a horizontal beam along which the conveyor vehicle 3 can be moved. The horizontal beams 20 and/or the guide tracks extend in longitudinal direction of the rack aisle 15 (x-direction) along the storage racks 12a, 12b and along the load-lifting device 34a and the buffer device 35a.

This being the case, a switching region 53 is defined along the load-lifting device 34a and the buffer device 35a. In order to transport load 2 to be retrieved from the storage places 17 of the storage racks 12a, 12b to the pick-up section 45 of the first buffer path section 41a or to transport load 2 to be stored in the rack storage from the transfer section 50 of the second buffer path section 42a to the storage places 17 of the storage racks 12a, the conveyor vehicle 3 can be guided along the corresponding guide track.

Figure 6:
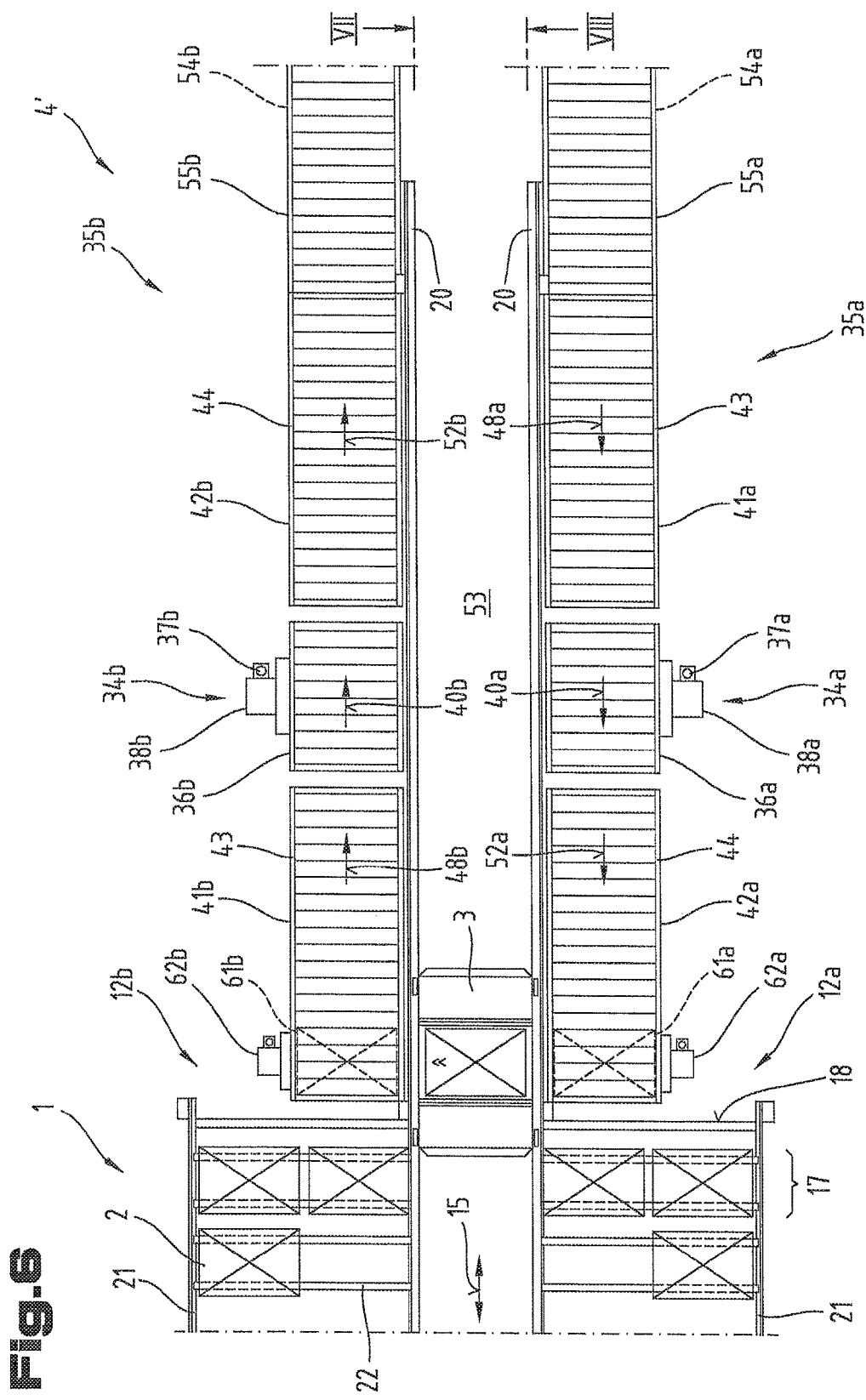
FIG. 6 shows a detail of a rack storage system having a rack storage and a second embodiment of a load manipulation unit in top view.
Figure 7:
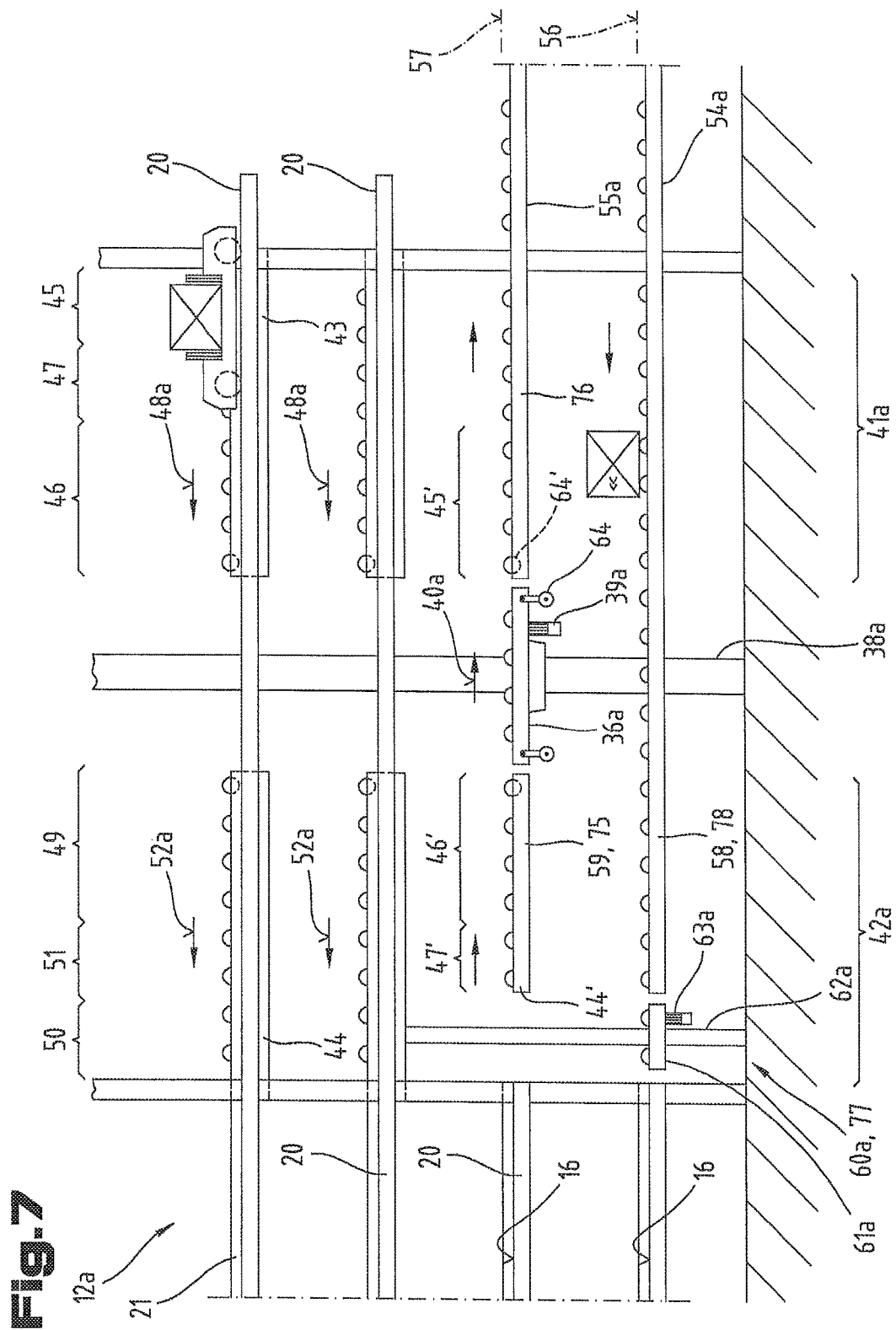
FIG. 7 shows lateral view of the load manipulation unit according to line VII in FIG. 6.

FIGS. 6 and 7 show a second embodiment of a rack storage system, which comprises a rack storage 1 for load 2, at least one self-propelled, autonomic conveyor vehicle 3, a load manipulation unit 4' and optionally a conveyor vehicle-lifting device 5.

Arranged in front of the front side of the storage racks 12a, 12b, the load manipulation unit 4' comprises a first load-lifting device 34a, a first buffer device 35a for temporarily storing load 2, a second load-lifting device 34b and a second buffer device 35b for temporarily storing load 2. Such an embodiment meets the highest performance requirements.

According to the embodiment shown, the load-lifting devices 34a, 34b are arranged to be laterally inversed and opposite each other with respect to the rack aisle 15, preferably in the event of a "double-deep storage". With a "single-deep storage" it is however also possible that the load-lifting devices 34a, 34b are arranged to face one another but are axially offset with respect to one another in the direction of the rack aisle 15.

The fixed load-lifting devices 34a, 34b each comprise a liftable and lowerable transport device 36a, 36b for load 2, and the first transport device 36a is configured on a lifting frame which can be vertically adjusted via a first lift drive 37a, and a second transport device 36b is configured on a lifting frame which can be vertically adjusted via a second lift drive 37b. According to the embodiment shown, the first transport device 36a is mounted on a first mast 38a via the lifting frame, and the second transport device 36b is mounted on a second mast 38b via the lifting frame. The liftable and lowerable transport devices 36a, 36b and/or their conveying devices can be controlled independently of one another.

The transport devices 36a, 36b each comprise a conveying device which can be reversibly driven by a drive motor 39a, 39b (FIG. 3), and has a conveying direction 40a, 40b which runs parallel with the rack aisle 15 and is reversible, and which transport devices can accommodate at least two pieces of load 2 one after the other in conveying direction 40a, 40b.

If the transport device 36a, 36b is positioned between transport conveying devices 43, 44 facing each other, as shown in FIG. 6, the conveying direction 40a, 40b corresponds to the conveying directions of the respective transport conveying devices 43, 44. But, if the transport device 36a, 36b is positioned between conveying devices 54a, 55a, 54b, 55b facing each other, as shown in FIG. 7, the conveying direction 40a, 40b corresponds to the conveying directions of the conveying devices 54a, 55a, 54b, 55b. The conveying device can e.g. be a roller track or a roller conveyor or suchlike.

The fixed buffer devices 35a, 35b each comprise a first buffer path section 41a, 41b and a second buffer path section 42a, 42b, and transport conveying devices 43, 44 are arranged one above the other in each of these buffer path sections 41a, 41b, 42a, 42b at least in some of the rack levels 16.

Figure 8:
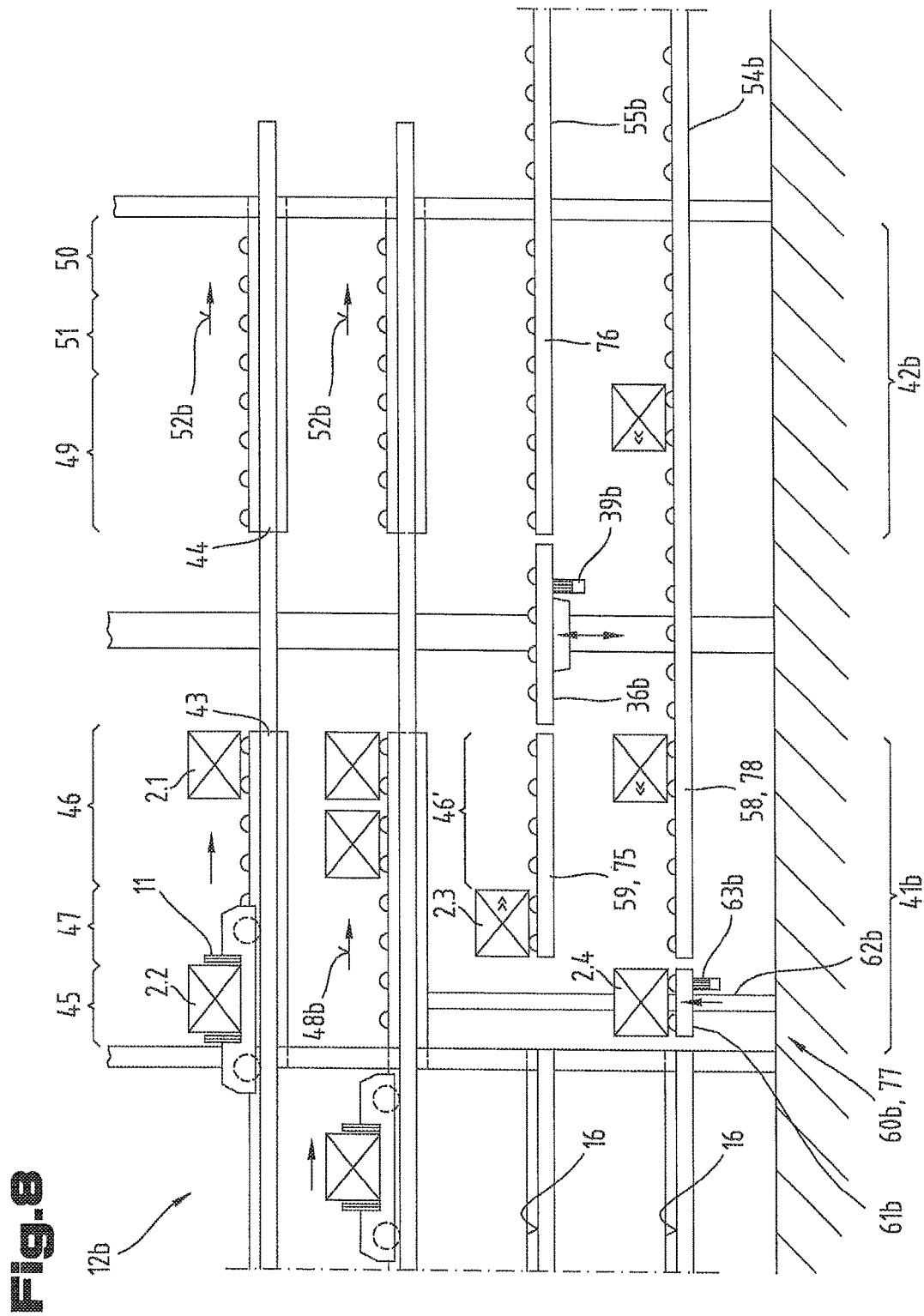
FIGS. 8 to 12 show storing process and a retrieving process in subsequent procedural steps by taking into consideration a high throughput rate, in lateral view of the load manipulation unit according to the line VIII in FIG. 6.

As FIGS. 7 and 8 show, no transport conveying devices 43, 44 for allowing the arrangement of a conveying system for transporting load 3 to the load-lifting device 34a, 34b and for transporting load 3 from the load-lifting device 34a, 34b are provided on the one hand, in the lower two rack levels 16 of the first buffer path section 41a and the second buffer path section 42b, and on the other hand, in the lower rack level 16 of the second buffer path section 42a.

The transport conveying devices 43 in the first buffer path section 41a, 41b are each formed by accumulating tracks comprising a pick-up section 45, a transfer section 46 and at least one buffer section 47 between them. According to this embodiment, the transfer section 46 comprises two transfer places where two pieces of load 2 can be provided on. The pick-up section 45, on the contrary, comprises a pick-up place where one load 2 can be received. The buffer section 51 comprises at least one buffer place for one load 2. By means of the accumulating tracks the load 2 can be conveyed from the pick-up section 45 remote from the load-lifting device 34a, 34b to the transfer section 46 adjacent to the load-lifting device 34a, 34b in one single conveying direction 48a, 48b.

The transport conveying devices 44 in the second buffer path section 42a, 42b are each formed by accumulating tracks comprising a pick-up section 49, a transfer section 50 and at least one buffer section 51 between them. According to this embodiment, the pick-up section 49 comprises two pick-up places where two pieces of load 2 can be received on. According to this embodiment, the transfer section 50, on the contrary, comprises a pick-up place where one piece of load 2 can be provided on. The buffer section comprises at least one buffer place for one piece of load 2. By means of the accumulating tracks the load 2 can be conveyed from the pick-up section 49 adjacent to the load-lifting device 34a, 34b to the transfer section 50 remote from the load-lifting device 34a, 34b in one single conveying direction 52a, 52b.

Consequently, the transport conveying devices 43 in the first buffer path section 41a, 41b serve for a process of retrieving load 2 and the transport conveying devices 44 in the second buffer path section 42a, 42b serve for a process of storing load 2, as will be described in more detail in FIGS. 8 to 12.

The transport conveying devices 43, 44 and/or the accumulating tracks are accumulation roller conveyors, accumulation band conveyors and suchlike, and one accumulation position forms one of the pick-up places for the pick-up sections 49 each, one accumulation position forms the pick-up place for the pick-up sections 45 each, one accumulation position forms one of the transfer places for the transfer sections 46 each, one accumulation position forms the transfer place for the transfer sections 50, one accumulation position forms at least one buffer place 47, 51. Thus, the at least four pieces of load 2, preferably five pieces of load 2 can temporarily be stored on one transport conveying device 43, 44.

As shown in FIGS. 6 and 7, the transport conveying devices 43, 44 have one single (non-reversible) conveying direction 48a, 48b, 52a, 52b in the respective rack levels 16. In other words, the transport conveying devices 43, 44 of each buffer device 35a, 35b and/or the accumulating tracks are driven in one single (non-reversible) conveying direction 48a, 48b, 52a, 52b in all rack levels 16 where they are arranged in. It is preferred if the transport conveying devices 43, 44 of each buffer device 35a, 35b and/or the accumulating tracks in each common rack level 16 where they are arranged in are driven in one single (non-reversible) conveying direction 48a, 48b, 52a, 52b, thus from the right hand side to the left hand side at the buffer device 35a, as shown in FIGS. 6 and 7, and from the left hand side to the right hand side at the buffer device 35b, as shown in FIGS. 6 and 8.

Only the conveying direction 40a, 40b of the transport device 36a, 36b is reversible, as described above.

The (non-reversible) conveying direction 48a, 52a is however opposite with respect to the (non-reversible) conveying direction 48b, 52b.

As FIGS. 6 and 7 show, also according to this embodiment, horizontal beams 20 extend along the load manipulation unit 4' in longitudinal direction of the rack aisle 15 (x-direction) and in at least some of the rack levels 16, as described above. Load 2 to be retrieved can be transported by the conveyor vehicle 3 from the storage places 17 to the pick-up section 45 of the first buffer path sections 41a, 41b or load 2 to be stored can be transported from the transfer section 50 of the second buffer path sections 42a, 42b to the storage places 17.

The horizontal beams 20 and/or the guide tracks extend in longitudinal direction of the rack aisle 15 (x-direction) along the storage racks 12a, 12b and along the load-lifting devices 34a, 34b and the buffer devices 35a, 35b. This being the case, a switching region 53 is defined along the load-lifting devices 34a, 34b and the buffer devices 35a, 35b.

As exclusively indicated in FIG. 7 in a schematic manner, it is also possible that the each of the oppositely situated end sections of the transport device 36a, 36b is provided with a transmission roller 64, with e.g. a toothing, which can be adjusted relatively towards the transport conveying device 43, 44 and is motor-driven. The transmission roller 64 is e.g. mounted on a lever and driven via the drive motor 39a, 39b. Furthermore, the transport conveying device 43, 44 is provided with a transmission roller 64' at its end section facing the load-lifting device 34a, 34b, in which transmission roller 64' the transmission roller 64 of the transport device 36a, 36b can engage in order to transmit a drive torque on a conveying member, such as conveying roller, conveying band and suchlike, comprised by transport conveying device 43, 44. If the transport conveying device 43, 44 is a roller track, the conveying roller adjacent to the load-lifting device 34a, 34b can form the transmission roller 64', which may in turn also be provided with a toothing e.g. The other conveying rollers are coupled with the driven conveying roller and with one another by means of a belt, not shown. In this manner, it is not required for the transport conveying devices 43, 44 which may be driven independently of one another to be equipped with independent drive motors. It is thereby possible to enormously reduce the effort in terms of control and the investment costs can be reduced considerably as well. The transport conveying devices 43, 44 can also be motor-driven independently of the transport device 36a, 36b. If the transport conveying device 43, 44 is a roller track, some or all of the conveying rollers can be so-called motor rollers, such as e.g. disclosed in document WO 2011/029119 A2.

A conveying system of the feed area for transporting load 2 to the load-lifting device 34a and optionally lifting device 34b and for transporting load 2 from the load-lifting device 34a and optionally lifting device 34ab is connected to the load manipulation unit 4; 4'. The latter comprises a first conveying device 54a transporting the load 2 to the lifting device 34a and a second conveying device 55a transporting the load 2 from the lifting device 34a.

If the lifting device 34b and the buffer device 35b are also provided according to the FIGS. 6 and 7, the conveying system also comprises a first conveying device 54b transporting the load 2 to the lifting device 34b, and a second conveying device 55b transporting the load 2 from the lifting device 34b. According to the embodiment shown, the first conveying device 54a; 54b and the second conveying device 55a; 54b are arranged in conveying system planes 56, 57 arranged one above the other in the lower height region (bottom region) of the rack storage 1 and have opposite conveying directions, as indicated by the arrows. It is however also possible for the first conveying device 54a; 54b and also for the second conveying device 55a; 55b to be arranged in conveying system planes 56, 57 situated one above the other in the upper height region of the rack storage 1. The first conveying device 54a; 54b and the second conveying device 55a; 55b extend parallel with the rack aisle 15 in the extension of the respective storage rack 12a; 12b.

It is preferred if the conveying system plane 56 and the lowest rack level 16 are situated within a first horizontal plane and if the conveying system plane 57 and the above rack level 16 are situated in a second horizontal plane. This allows a space-saving arrangement of the conveying system.

As may be taken from FIGS. 1, 3, 6, 7 and 8, the first conveying device 54a; 54b comprises (fixed) conveying sections 58, 59 situated in conveying system planes 56, 57 situated one above the other and extending parallel with the rack aisle 15, which conveying sections are connected to one another by means of a transfer lifter 60a; 60b. The conveying section 59 corresponds to a first conveying section 75 and the conveying section 58 corresponds to a third conveying section 78. Likewise, the second conveying device 55a forms a first conveying section 76. The first conveying sections 75, 76 of the conveying devices 54a, 55a extend parallel with the rack aisle 15 and are aligned facing each other. The first and the third conveying section 75, 78 of the first conveying device 54a; 54b are arranged in conveying system planes 56, 57 situated one above the other, and the first and the third conveying section 75, 78 are connected with each other via a second conveying section 77. The first conveying device 54a; 54b comprises the second conveying section 77 and is formed by the transfer lifter 60a; 60b.

The upper conveying section 59 comprises a fixed transport conveying device 44' of the second buffer path section 42a and optionally the fixed transport conveying device 43' of the first buffer path section 41b. This transport conveying device 43'; 44' is shorter than the other transport conveying device 43, 44 and comprises—according to a first embodiment—the transfer section 46' or—according to a second embodiment—the transfer section 46' and at least one accumulation position 47', as schematically shown in FIG. 7. If also the lifting device 34*b* and the buffer device 35*b* are provided, as shown in FIGS. 6 to 8, the first conveying device 54*b* also comprises a transfer lifter 60*b* for load 2.

The fixed transfer lifter 60*a*; 60*b* comprises a liftable and lowerable transport device 61*a*, 61*b* for load 2, and the first transport device 61*a* is configured on a lifting frame which can be vertically adjusted by a first lift drive (not shown), and a second transport device 61*b* is configured on a lifting frame which can be vertically adjusted by a second lift drive (not shown). According to the embodiment shown, the first transport device 61*a* is mounted on a first mast 62*a* via the lifting frame, and the second transport device 61*b* is mounted on a second mast 62*b* via the lifting frame.

The transport devices 61*a*, 61*b* each comprise a conveying device which can be driven by a drive motor 63*a*, 63*b* (FIGS. 3, 7) and has a conveying direction which runs parallel with the rack aisle 15, and which transport devices can receive only one piece of load 2 or two pieces of load 2 one after the other in conveying direction. The conveying device can e.g. be a roller track or a roller conveyor or suchlike. It is now possible for the transport device 61*a*, 61*b* to be adjusted between the conveying sections 58, 59 by means of the lift drive in order for the load 2 to be picked up from the lower conveying section 58 and be delivered to the upper conveying section 59, and one piece of load 2 is provided at the upper conveying section 59 at the transfer section 46'. Consequently, the transfer section 46' is formed by the conveying device 54*a*, 54*b*.

The transport devices 36*a*; 36*b* can be adjusted independently (decoupled) of each other between the rack levels 16 to match the height level of each rack level 16 and the height level of the conveying system plane 57, so that load 2 can, on the one hand, be conveyed between the transport device 36*a*; 36*b* and the transport conveying device 43, 44, and, on the other hand, between the transport device 36*a*; 36*b* and the transport conveying device 43, 44 and the conveying devices 54*a*, 55*a*, 54*b*, 55*b*.

Since the clear distance between the conveying devices 54*a*, 55*a*; 54*b*; 55*b* approximately corresponds to the width of the rack aisle 15, a very space-saving arrangement of the conveying system of the feed area is achieved. Via a common sorting conveying system, the conveying devices 54*a*, 55*a*; 54*b*; 55*b* are connected to e.g. an automated picking station (not shown) or a loading station for loading a carrier, such as a pallet or suchlike.

The transport conveying devices 43, 44 situated opposite each other are spaced apart from each other in the direction of the rack aisle 15 by at least the length of the transport device 36*a*; 36*b*, so that the transport device 36*a*; 36*b* can be moved between the front edges facing each other of the transport conveying devices 43, 44 when the transport conveying devices are in their the transfer and/or pick-up position elevated to the rack level 16.

Also the conveying devices 54*a*, 55*a*; 54*b*; 55*b* situated opposite each other are spaced apart from each other in the direction of the rack aisle 15 by at least the length of the transport device 36*a*; 36*b*, so that the transport device 36*a*; 36*b* can be moved between the front edges facing each other of the conveying devices when the conveying devices are in their transfer and/or pick-up position lowered to the conveying system plane 57.

The method for operating the rack storage system according to the embodiment in the FIGS. 6 and 7 will now be described by means of the FIGS. 8 to 14. The process of retrieving and storing load 2.1 to 2.6 within the rack levels 16 is shown by means of one of the load-lifting devices 34*b* and the buffer devices 35*b* according to FIGS. 8 to 12. The process of retrieving and storing load 2 can be performed at the load-lifting device 34*a* and the buffer device 35*a* in the same way.

The process of retrieving load 2 is triggered by an order, in particular a picking request. This order can include one or more pieces of load 2.1, 2.2. In practice, it is advantageous if conveyor vehicles 3 can be used, so that the processes of retrieving load can be effected on several rack levels 16 in parallel. The embodiment also shows a conveyor vehicle 3 transporting one single piece of load 2.2. It is however also possible for the conveyor vehicle 3 to transport several pieces of load 2 at the same time.

For a process of retrieving load 2, the conveyor vehicle 3 is moved along the track into the rack storage 1 until it is in front of a storage place 17 (FIG. 6), where a load receiving device 11 takes a piece of load 2.2 to be retrieved according to an order, in particular a picking order, from the storage rack 12*a*, 12*b* onto the conveyor vehicle 3. Then, the conveyor vehicle 3 together with the piece of load 2.2 travels along the track out of the rack storage 1 into the switching region 53 of the load manipulation unit 4' until it is in front of a pick-up place of the first pick-up section 45.

Controlled by a material flow computer it is now possible for the conveyor vehicle 3 to be moved either to a first pick-up section 45 which is remote from the rack storage 1 and in the first buffer path section 41*a* (FIG. 7), or to a second pick-up section 45 which is adjacent to the rack storage 1 and in the second buffer path section 41*b* (FIG. 8). The conveyor vehicle 3 can therefore approach at least one pick-up section 45 which is comprised by the load manipulation unit 4', or separately approach two pick-up sections 45 which are comprised by the load manipulation unit 4'.

If only the lifting device 34*a* and the buffer device 35*a* according to the embodiment according to FIG. 1 are provided, the conveyor vehicle 3 is moved to a first pick-up section 45 remote from the rack storage 1 in order to perform a process of retrieving load 2.

The conveyor vehicle 3 is stopped at the pick-up section 45, as shown in fourth rack level 16 from the bottom in the FIGS. 6 and 8, and there, the piece of load 2.2 to be retrieved is delivered from the conveyor vehicle 3 onto the pick-up section 45 of the transport conveying device 43 in the first buffer path section 41*b* by means of the load receiving device 11.

It is possible to monitor the proper transfer of the piece of load 2.2 on the transport conveying device 43 in the first buffer path section 41*b* by means of sensors, not shown. Then, the load 2.2 is conveyed from the pick-up section 45 in the direction 48*b* onto the transfer section 46.

Figure 9:
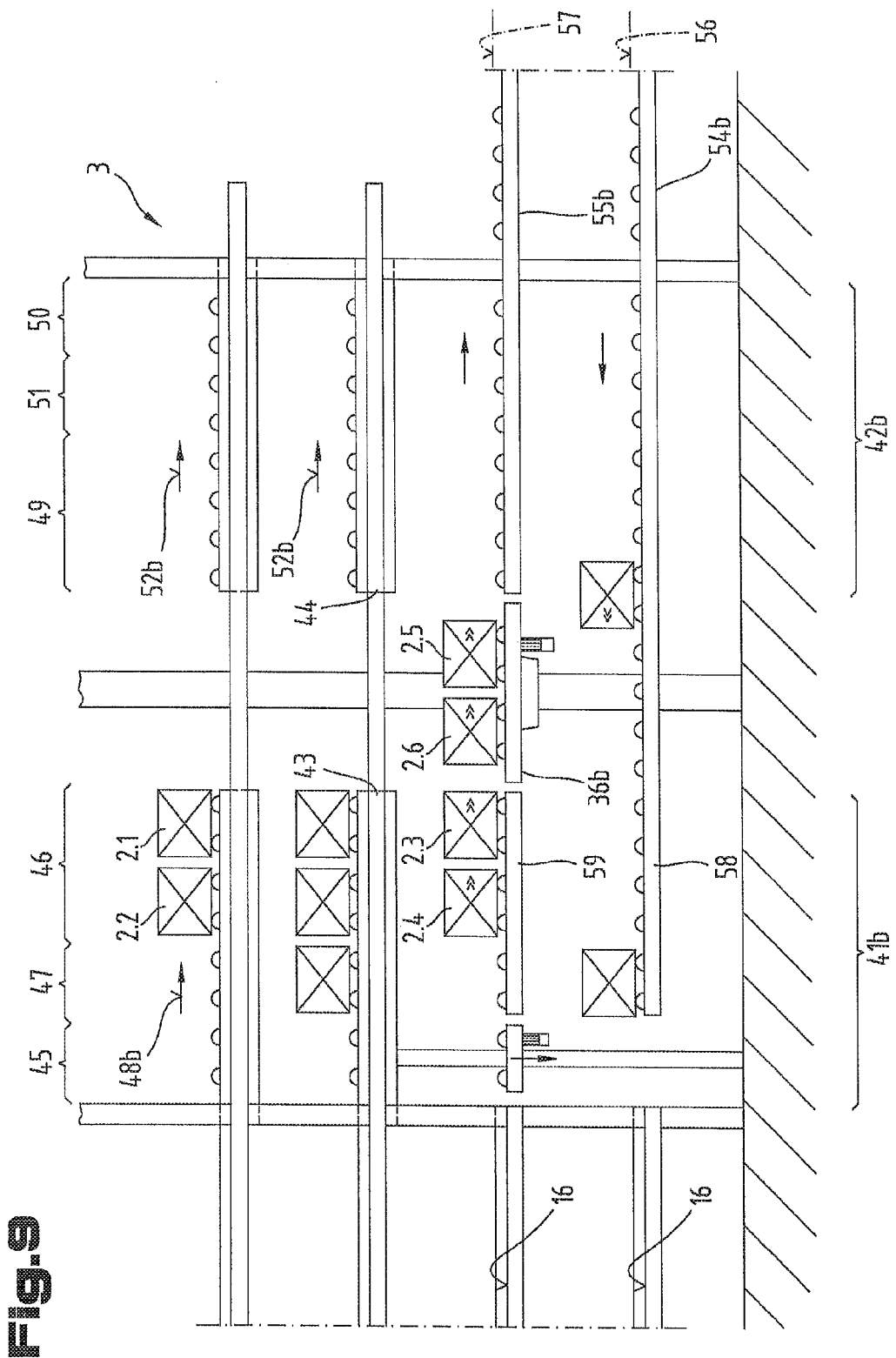

If there is a piece of load 2.1 already present at the front transfer place of the transfer section 46, the load 2.2 is conveyed to the transfer section 46 and provided at the rear transfer place, as shown in FIG. 9 at the fourth rack level 16 from the bottom. If then the conveyor vehicle 3 conveys another load 2 to the pick-up section 45 according to an order, this load is also conveyed in the direction of the pick-up section 46 once the others have been transferred onto the pick-up section 45, and is accumulated in the buffer section 47 behind the transfer section 46, as shown in FIG. 9 in the third rack level 16 from the bottom.

Once the load 2.2 has been transferred to the pick-up section 45, the unoccupied conveyor vehicle 3 can either travel into the rack storage 1 again and pick up load 2 for a retrieving process, or can pick up a piece of load 2 to be stored from a transfer section 50 in the same rack level 16.

As—according to this embodiment—the first buffer path section 41*b* and the second buffer path section 42*a* are arranged to be opposite each other laterally reversed with respect to the rack aisle 15, the conveyor vehicle 3 stopped between the pick-up section 45 and the transfer section 50 can remain in its stopping position, as indicated in FIG. 6, and once the load 2.2 has been transferred to the pick-up section 45 it can there take a load 2 to be stored from the transfer section 50 onto the conveyor vehicle 3 by means of the load receiving device 11.

If only the lifting device 34*a* and the buffer device 35*a* are provided, according to FIG. 1, the conveyor vehicle 3 can travel from the pick-up section 45 to a transfer section 50 remote from it in the second buffer path section 42*a*, once the load 2 has been transferred onto the pick-up section 45 in the first buffer path section 41*a*. The conveyor vehicle 3 is stopped at the transfer section 50 and in the stopping position the load receiving device 11 picks up the load 2 to be stored from the transfer section 50 of the transport conveying device 44 onto the conveyor vehicle 3, as shown in the FIGS. 1 and 3.

Likewise, a storing process is started while the retrieving process in one of the rack levels 16 is taking place. Here, load 2.3, 2.4 is conveyed on the first conveying system 54*b* to the transfer lifter 61*b* and elevated from a lower conveying system plane 56 onto an upper conveying system plane 57, and the load 2.3, 2.4 is provided at a transfer section 46', as indicated in FIGS. 8 and 9. The transfer section 46' is formed by the conveying device 54*b*.

Figure 10:
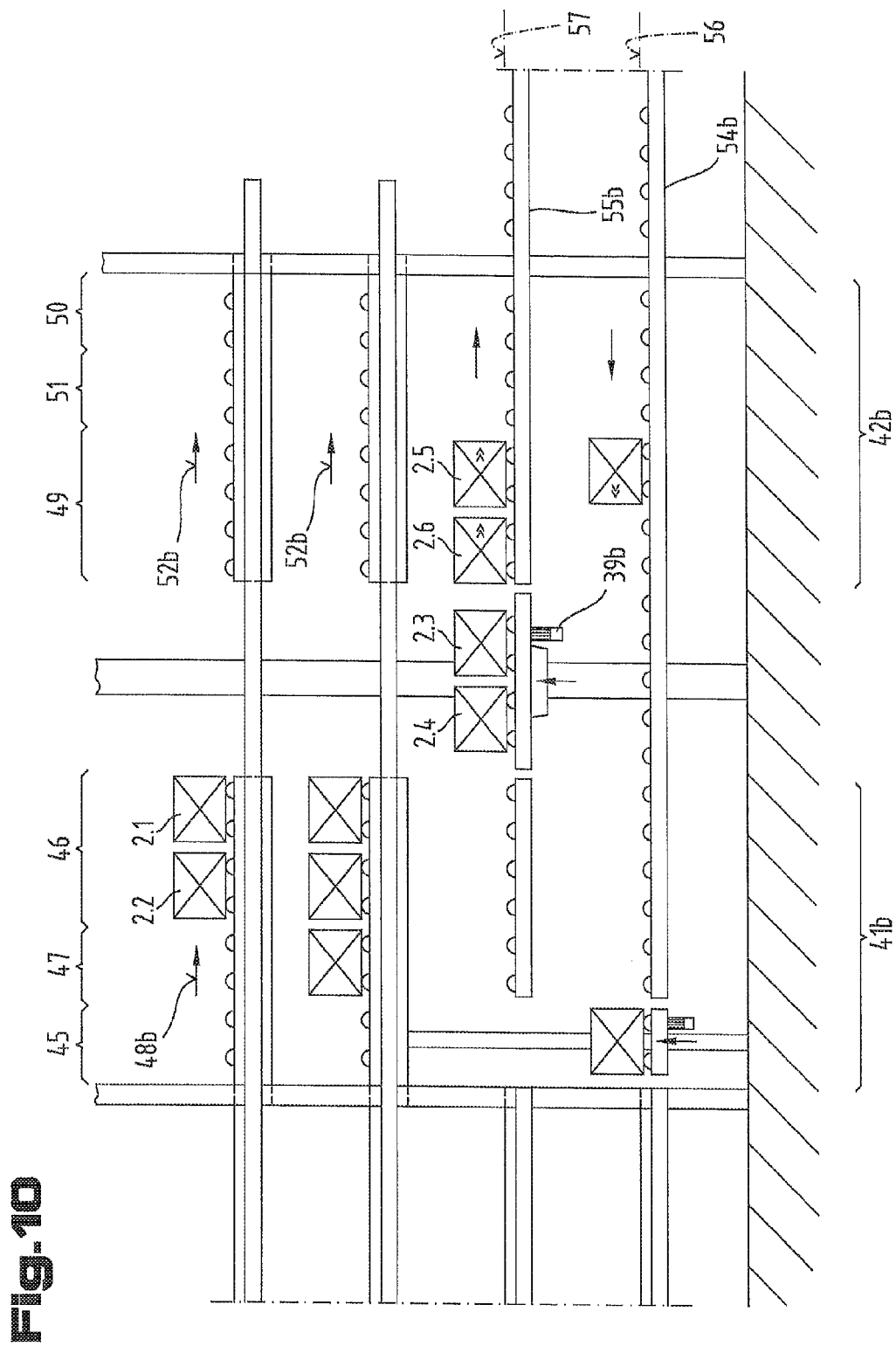

If the transport device 36*b* is now positioned on the conveying system plane 57 between the oppositely situated conveying devices 54*b*, 55*b* and the conveying device of the transport device 36*b* as well as the conveying devices 54*b*, 55*b* are driven, it is possible to simultaneously convey the load 2.3, 2.4, provided at the transfer section 46' and to be stored, from the transfer section 46' onto the transport device 36*b*, and the load 2.5, 2.6 from the transport device 36*b* onto the conveying device 55*b*, as shown in FIGS. 9 and 10. This "double-cross" allows a considerable increase in efficiency of the rack storage system in the region of the conveying system of the feed area.

Figure 11:
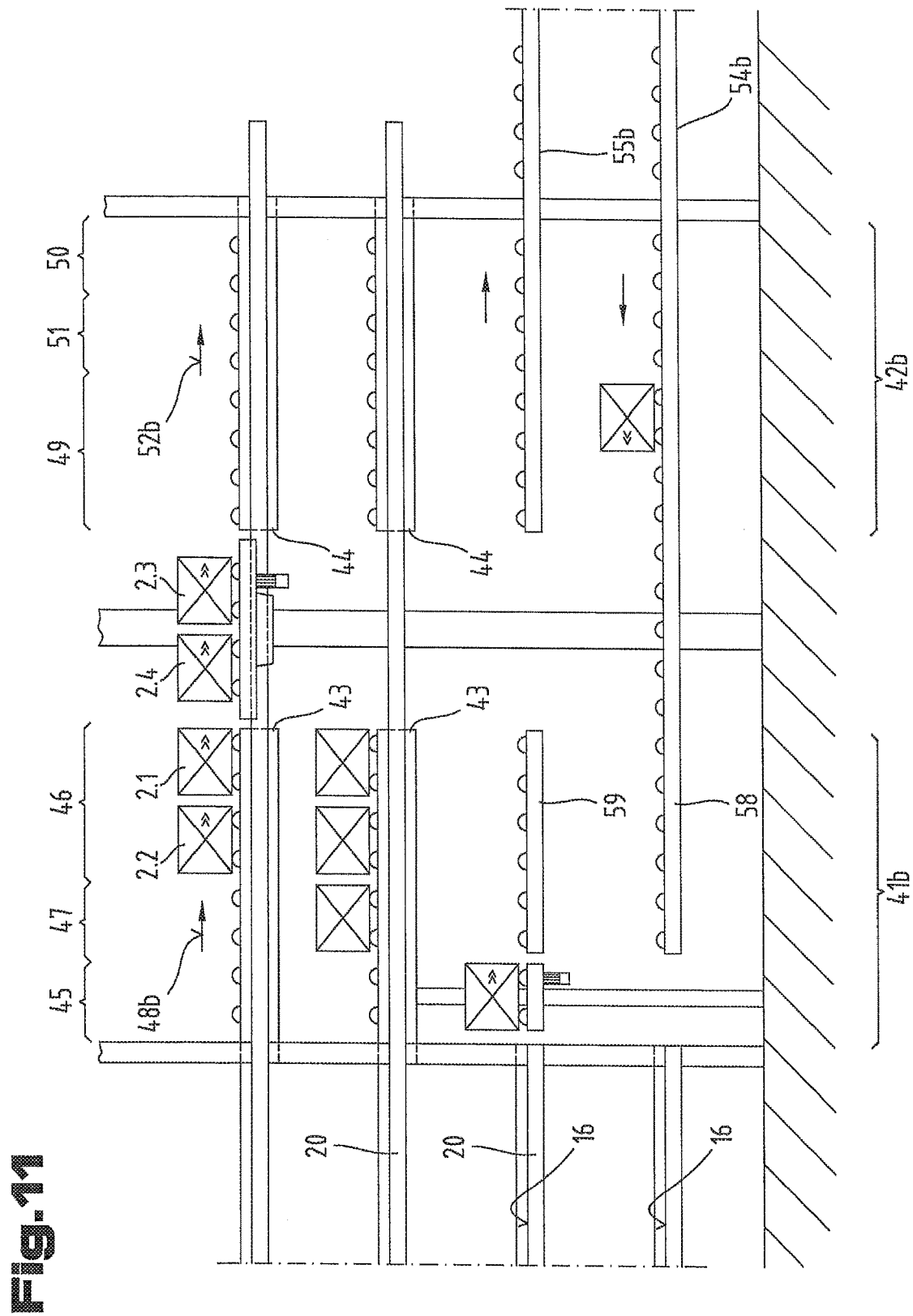

If the load 2.3, 2.4 to be stored is situated on the transport device 36*b*, the latter is adjusted in a rack level 16 defined by the material flow computer, in which rack level the load 2.1, 2.2 required due to an order has already been provided at the transfer section 46, as shown in FIG. 11.

Figure 12:
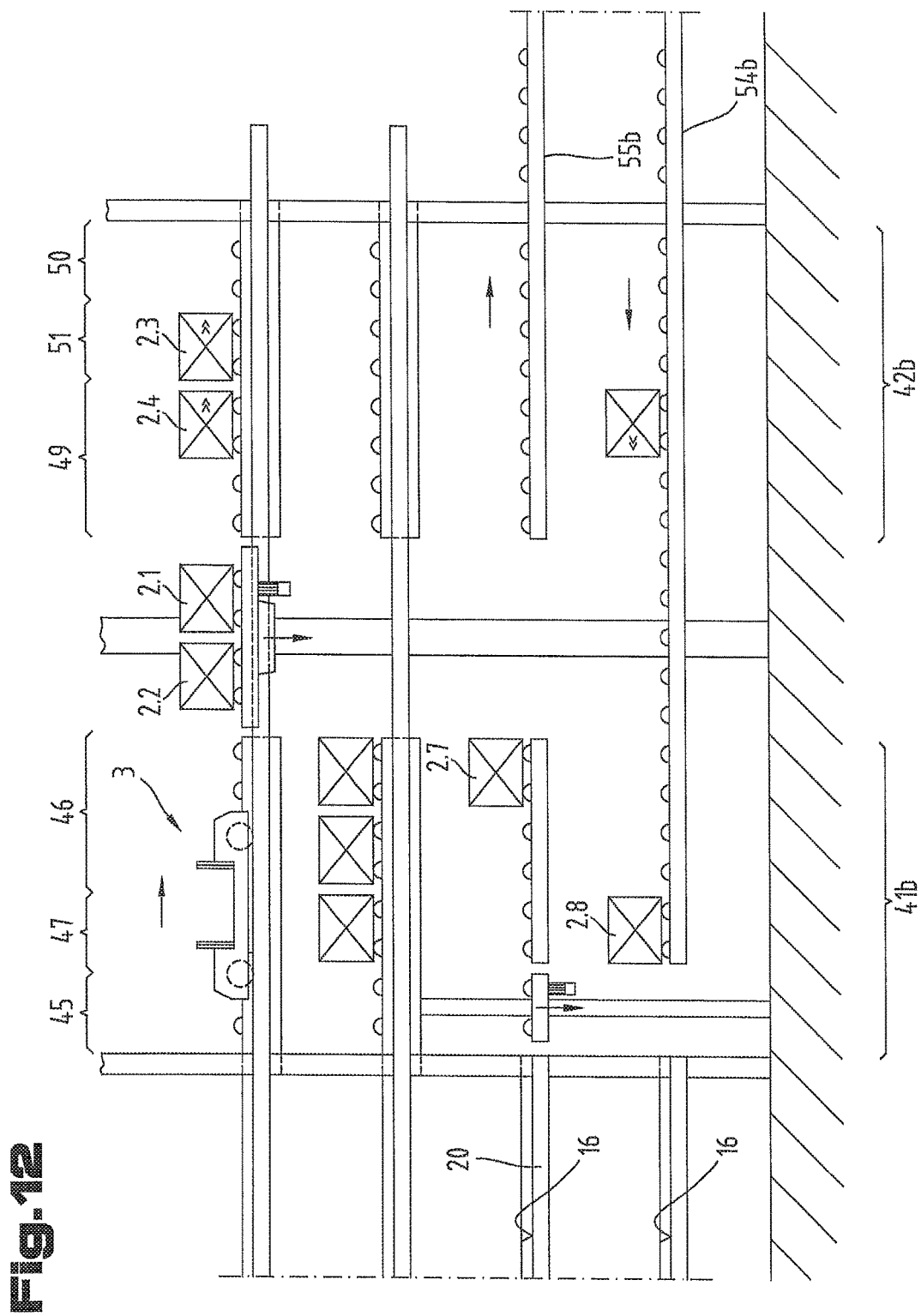

As shown in FIG. 11, the load 2.1, 2.2 to be retrieved has already been provided at the transfer section 46 in the fourth rack level 16 from the bottom, so that the transport device 36*b* is being positioned on this rack level 16 between the transport conveying devices 43, 44, as controlled by the material flow computer. Afterwards, the conveying device of the transport device 36*b* and the transport conveying devices 43, 44 are driven and simultaneously, the load 2.1, 2.2 to be retrieved is conveyed from the first buffer path section 41*b* onto the transport device 36*b* and the load 2.3, 2.4 to be stored is conveyed from the transport device 36*b* onto the second buffer path section 42*b*, as shown in FIG. 12. This "double-cross" in the region of the buffer device 35*b* allows a considerable increase in efficiency of the rack storage system.

Then, the load 2.3, 2.4 is conveyed from the pick-up section 49 in the direction onto the transfer section 50. The conveyor vehicle 3 is then moved to the transfer section 50 from where the first load to be stored 2.3. is transferred to the conveyor vehicle 3 by means of the load receiving device 11. The loaded conveyor vehicle 3 then moves into the rack storage 1. Once the load 2.3 has been stored in a storage place 17, the conveyor vehicle 3 takes a load 2 and delivers the same to the transfer section 45, as described above, and subsequently, the conveyor vehicle moves to the transfer section 50 again and picks up the second load 2.4 to be stored as well.

It is of course also possible for the conveyor vehicle 3 to pick up the two pieces of load 2.3, 2.4 at the same time and store them in the rack storage 1 at one single go. On its return, the conveyor vehicle can also take two pieces of load 2 and deliver them e.g. one after the other to the transfer section 45 in the first buffer path section 41*a*; 41*b* or deliver the first load 2 to the transfer section 45 in the first buffer path section 41*a* and the second load 2 to the transfer section 45 in the first buffer path section 41*b*, as described above.

The transport device 36*b* with the load 2.1, 2.2 received is now lowered between the conveying device 54*a*, 54*b* and afterwards, the transport device 36*b* conveys the load 2.1, 2.2 onto the second conveying device 55*b* by way of an above-described "double-cross", and once again, load 2.7, 2.8 is conveyed from the first conveying device 55*a* onto the transport device 36*b*.

Figure 13:
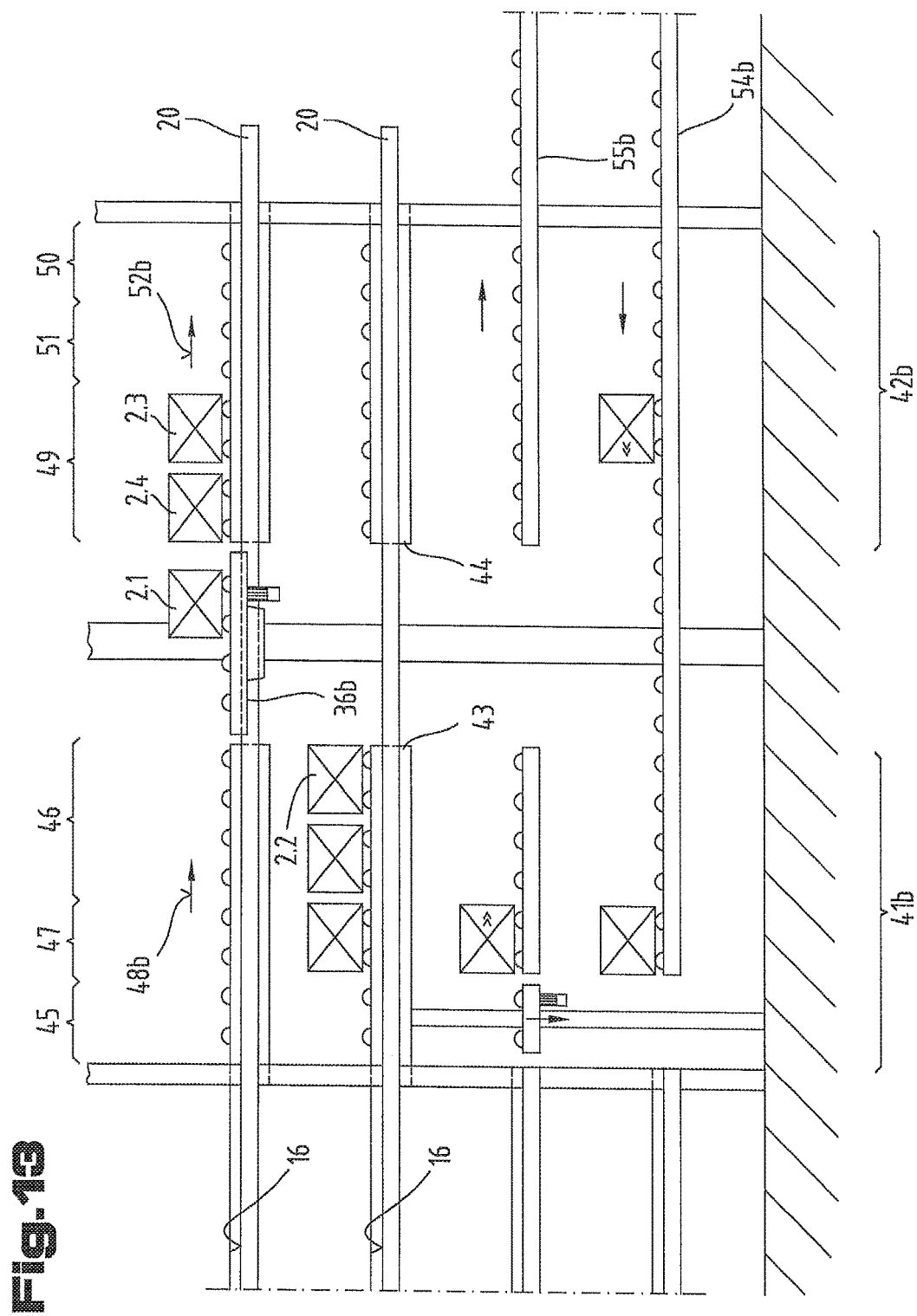
FIGS. 13 to 14 show a storing process and a retrieving process in subsequent procedural steps by taking into consideration a sequence generating, in lateral view of the load manipulation unit according to the line VIII in FIG. 6.
Figure 14:
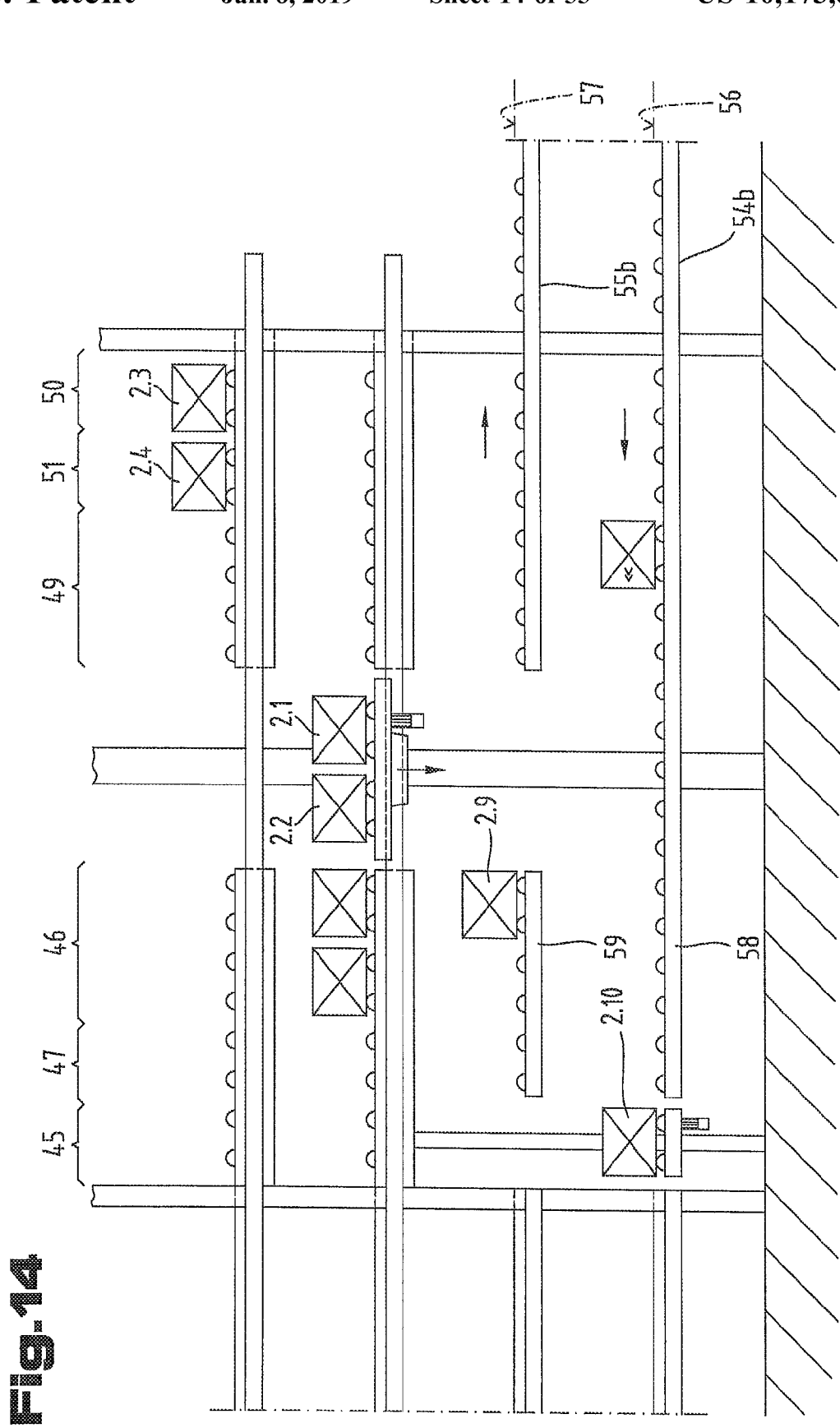

According to another embodiment it is also possible—as shown in FIGS. 13 and 14—for the load 2.1, 2.2 (to be retrieved) required for an order to be placed on transport conveying devices 43 in different rack levels 16. The load 2.1 is e.g. placed in the fourth rack level 16 and the load 2.2 is placed in the third rack level 16. The load to be retrieved 2.1, 2.2 can be associated with different orders and picked up on the transport device 36*b* together. This being the case, the rack levels 16 are approached one after another by lifting or lowering the transport device 36*b*.

If the load 2.3, 2.4 is conveyed from the transport device 36*b* onto the second buffer path section 42*b* in the fourth rack level, the load 2.1 is being conveyed from the first buffer path section 41*b* onto the transport device 36*b* at the same time. Afterwards, the transport device 36*b* is adjusted to the third rack level 16, where the load 2.2 is situated in. Subsequently, the load 2.2 is conveyed from the first buffer path section 41*b* onto the transport device 36*b*.

If load to be retrieved 2.1, 2.2 is now present on the transport device 36*b*, the latter is adjusted to be on a level with the conveying system plane 57 between the conveying devices 54*b*, 55*b* where the load 2.1, 2.2, 2.9, 2.10 can again be manipulated by way of the "double-cross" in a manner described above.

As the load 2.1, 2.2 is picked up one after another, a "finally sorted" sequence (sequencing) of the load 2 required for an order can be obtained, in which order the load may be delivered onto the conveying device 55*b*. Furthermore, it is also possible that the load 2 required for an order is already "presorted" (sequencing) due to the delivery of load 2 via the conveyor vehicles 3 to the pick-up section 45 in the first buffer path section 41*a*, 41*b* on one or several rack levels 16, which delivery has been coordinated by the material flow computer. It is also possible to combine the sequencing.

Arranging a first buffer path section 41*a*, 41*b* and a second buffer path section 42*a*, 42*b* on either sides of the rack aisle in each case is advantageous in terms of reliability (redundancy).

If there is a malfunction in one of the load-lifting devices 34*a*, 34*b*, the operation—thus the retrieving and storing load 2—can however be maintained via the one working load-lifting device 34*a*, 34*b*.

It might also be provided that during the downtime at least one conveyor vehicle 3 on one or several rack levels 16 or the conveyor vehicles 3 in the respective rack levels 16 retrieve those load 2 to be retrieved that has already been transferred onto the (left) pick-up section 45 of the transport conveying device 43 and/or that are already present on the transfer section 46 and/or buffer section 47 from one side and transfer them to the other side onto the (right) pick-up section 45 of the transport conveying device 43. It is preferred that this happens in each rack level 16.

The conveyor vehicle 3 consequently forms a transport path between the pick-up sections 45 arranged on both sides of the rack aisles 15 and offset to one another in longitudinal orientation.

It should also be noted at this point that it is possible for the transfer lifter 60a; 60b to be arranged in the top region of the rack storage as an alternative to the arrangement in the bottom region.

Figure 15:
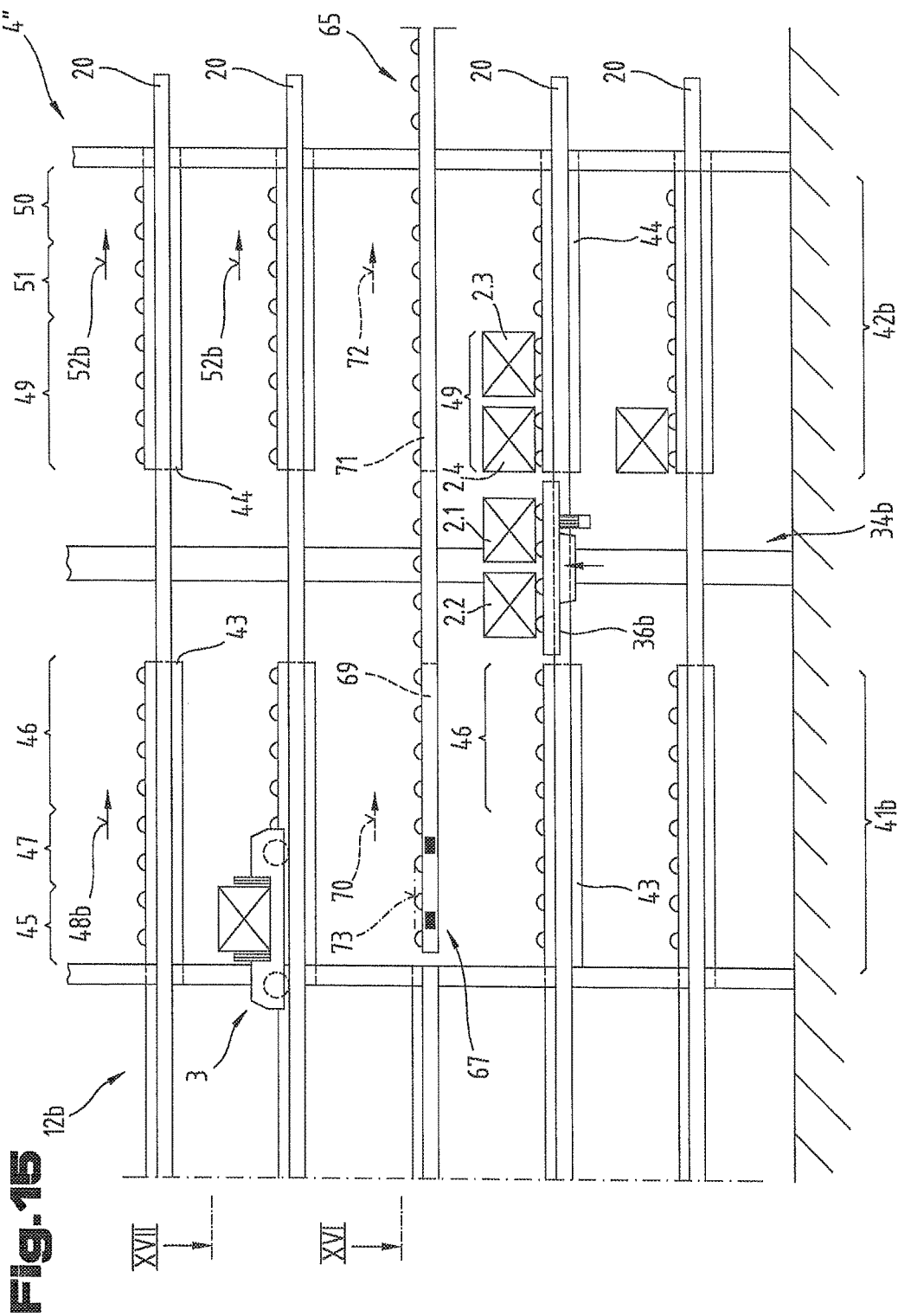
FIG. 15 shows a detail of a rack storage system having a rack storage and a load manipulation unit in lateral view.
Figure 16:
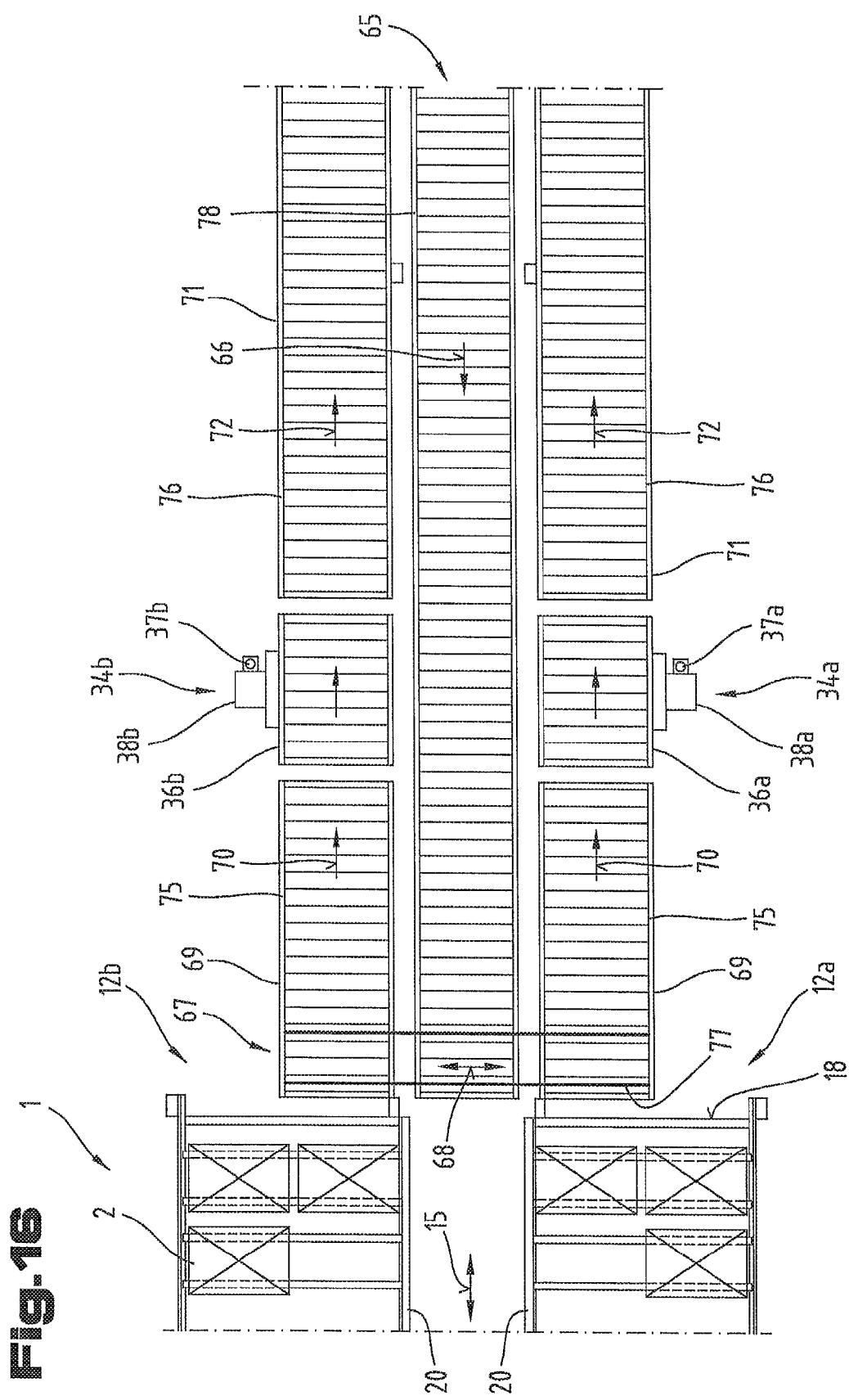
FIGS. 16, 18 show a top view of a first embodiment of the conveying system plane and/or conveying system of the feed area for the embodiment according to FIG. 15 comprising the conveying system for supplying and removing load at different conveying directions.
Figure 17:
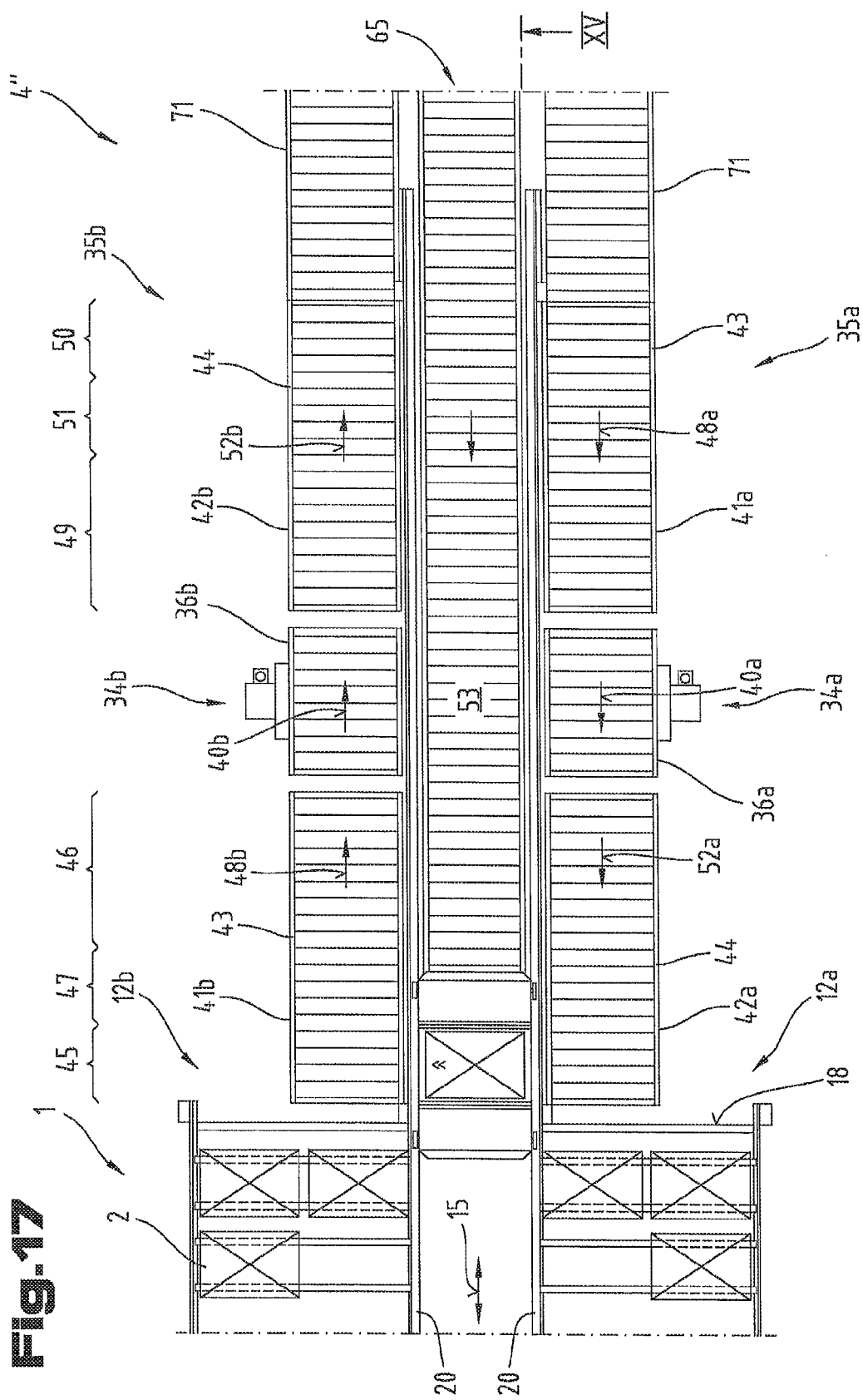
FIG. 17 shows a top view of transport conveying devices and the load-lifting device on a height level of a rack level according to the embodiment in FIG. 15.

FIGS. 15 to 17 show a third embodiment of a rack storage system, which comprises a rack storage 1 for load 2, at least one self-propelled, autonomic conveyor vehicle 3, a load manipulation unit 4" and optionally a conveyor vehicle-lifting device 5, as described above.

On the front side upstream of the storage racks 12a, 12b the load manipulation unit 4" comprises either exclusively a first load-lifting device 34a and a second buffer device 35a or—as shown—a first load-lifting device 34a, a first buffer device 35a, a second load-lifting device 34b and a second buffer device 35b.

The load manipulation unit 4" follows a conveying system of the feed area for transporting load 2 to the load-lifting device 34a and optionally lifting device 34b and for transporting load 2 from the load-lifting device 34a and optionally lifting device 34b.

This conveying system of the feed area is connected to the rack storage 1 on its front side and comprises, according to this embodiment, a central processing track 65 having a conveying direction 66 in the direction towards the rack storage 1, a delivery device 67 disposed on the front end section of the processing track which delivery device has a reversible conveying direction 68 parallel with the rack storage side 18, first conveying devices 69 adjacent to both sides of the delivery device 67 and provided for transporting load 2 to the load-lifting device 34a; 34b having a conveying direction 70 running opposite with respect to the processing track 65 and second conveying devices 71 adjacent to the load-lifting device 34a; 34b for transporting load 2 from the load-lifting device 34a; 34b with a conveying direction 72 running opposite with respect to the processing track 65.

The first conveying device 70 and the second conveying device 71 are preferably disposed within one conveying system plane 73. It is nevertheless also possible for the latter to extend in conveying system planes situated one above the other, so that the transport device 36a, 36b stores and retrieves the load 2 in different conveying system planes. To this end, the conveying devices 70, 71 each extend on both sides and parallel with the rack aisle 15 in the extension of the respective storage rack 12a; 12b. The processing track 65 extends in and parallel with the rack aisle 15.

The processing track 65, conveying devices 70, 71 are each provided in the form of an accumulating track and comprise a roller track or a conveying band and suchlike.

The delivery device 67 is e.g. provided in the form of a liftable and lowerable belt converter which connects the processing track 65 with the conveying devices 69. It is however also possible for the delivery device 67 to be provided in the form of a slide bar which can be actuated by means of an actuator drive in both directions relative to the processing track 65.

As shown in FIG. 16, the first conveying devices 69 each form a first conveying section 75 and the second conveying devices 71 each form a first conveying section 76. The first conveying sections 75, 76 of the conveying devices 69, 71 extend parallel with the rack aisle 15 and are aligned facing each other. The first conveying device 69 furthermore forms a second conveying section 77 and a third conveying section 78 extending parallel with the rack aisle 15. The third conveying section 78 corresponds to the processing track 65. The second conveying section 77 is formed by the delivery device 67. The second conveying section 77 connects The first and the third conveying section 75, 78 of the first conveying device 69 to one another. It is according to another, not shown, embodiment naturally possible that only a first conveying device 69 and only second conveying device 71, as well as only one load-lifting device 34a are provided. This being the case, the delivery device 67 has only one (non-reversible) conveying direction 68.

Figure 18:
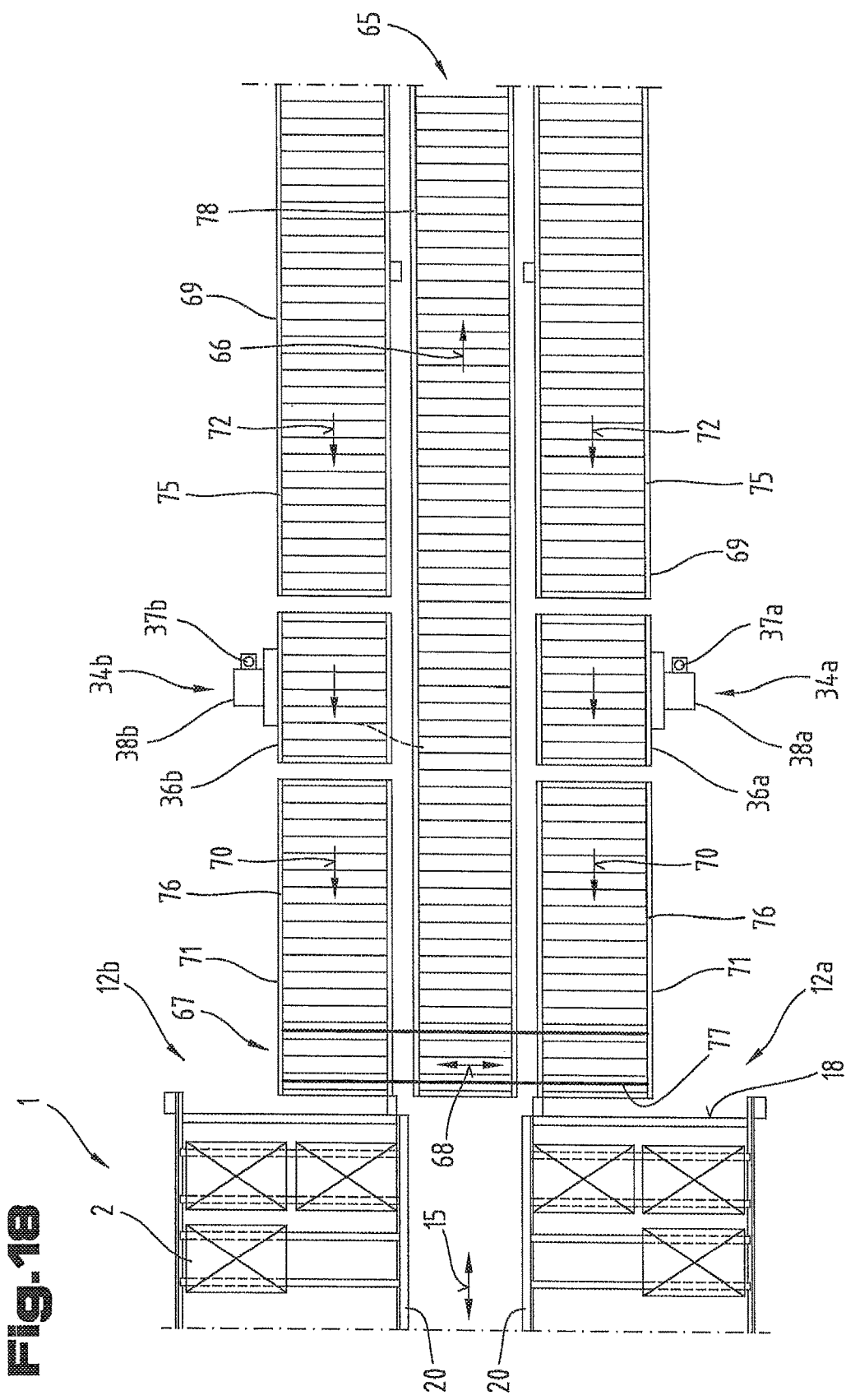

If the conveying direction of the first conveying devices 69 and the second conveying devices 71 are reversed, as shown in FIG. 18, the latter form the first conveying sections 75, 76 extending parallel with the rack aisle 15 and aligned facing each other. In this case, the second conveying devices 71 furthermore form a second conveying section 77 and a third conveying section 78 extending parallel with the rack aisle 15. The first and the third conveying section of the second conveying devices 71 are connected to one another via the second conveying section 77.

Also with this embodiment, the above-described "double-cross" during a process of storing and/or retrieving load 2 in the region between the conveying system of the feed area is on the one hand being realized, while load 2 is being moved between the transport device 36a; 36b and the first conveying device 69 (conveying device for storing load), and on the other hand while load 2 is being moved between the transport device 36a; 36b and the second conveying device 71 (conveying device for retrieving load), which results in an essential increase in efficiency of the rack storage system, as described above.

FIG. 15 shows how load 2.1, 2.2 to be retrieved is picked up from the transfer section 46 of the transport conveying device 43 onto the transport device 36b and how load 2.3, 2.4 to be stored is transferred from the transport device 36b onto the pick-up section 49 of the transport conveying device 44. Then, the load 2.1, 2.2 to be retrieved is lifted by the transport device 36b onto the conveying system plane 73 and the transport device 36b is positioned between the conveying devices 69, 71. Subsequently, the conveying device of the transport device 36b as well as the conveyor devices 69, 71 are driven. This being the case, load to be stored simultaneously (not entered) can be conveyed from the first conveying device 69 onto the transport device 36b, and the load 2.1, 2.2 can be conveyed from the transport device 36b onto the second conveying device 71. These measures enable a "double-cross" in the region of the conveying system of the feed area as well as a "double-cross" in the region of the buffer device 35b, as described above.

This embodiment also allows the sequencing as described above. It is also possible for the load manipulation unit 4" to only exhibit the lifting device 34a and the buffer device 35a, as shown in the FIGS. 1 and 3, but comprise the described conveying system of the feed area.

According to the embodiments shown, the load manipulation unit 4; 4'; 4" is arranged on the front side upstream of the rack storage 1.

It is also possible for the load manipulation unit 4; 4', 4" to be disposed between the rack storage sides 18, 19 on the front side, and can therefore be integrated in the rack storage and/or in the storage racks 12a, 12b.

The embodiments as shown in the FIGS. 6, 7 and/or 15 to 17 are also advantageous if, on the one hand, the first conveying system 54a; 69 and second conveying system 55a; 71 assigned to the first load-lifting device 34a are connected to a first workstation and, on the other hand, if the first conveying system 54b; 69 and the second conveying system 55b, 71 assigned to the second load-lifting device 34b are connected to a second workstation. Consequently, two workstations are connected to each rack aisle 15. The workstation is e.g. a picking station (not shown) or a loading station for loading a carrier, as a pallet or suchlike.

Even if the above-shown embodiment (FIGS. 1-3 and FIGS. 6-8) propose that the transport conveying device 43, 44 are provided from the third rack level 16 only, it is also possible that the transport conveying devices 43 and/or the transport conveying devices 44 are provided in two lower rack levels 16 as well, which is however not shown here. In this case, the first transport conveying devices 43 and/or the second transport conveying devices 44 are arranged in all rack levels 16, which are driven in one single conveying direction 48a, 52a; 48a, 52a, 48b; 52b per buffer device 35a; 35b across all rack levels 16, as described above.

The first transport conveying devices 43 are e.g. provided in the form of conveying sections of the conveying devices 54a; 54b; 55a; 55b. For this purpose it is provided that according to the above descriptions, the horizontal beams 20 extend along the load-lifting device 34a; 34b as well as the buffer device 35a; 35b in the first and the second rack level 16 too. The first transport conveying devices 43 in the first buffer path section 41a; 41b serve for a retrieving process as described above.

To this end, load 2 to be retrieved of the first rack level 16 is transferred by the conveyor vehicle 3 onto the conveying section—forming the above-described pick-up section 45—of the conveying device 54a; 54b, from where it is moved to the transfer lifter 60a; 60b and subsequently to the conveying device 55a; 5b via the transport conveying device 44' as well as the load-lifting device 34a; 34b. It is also possible that the conveyor vehicle 3 transfers the load 2 of the second rack level 16 to be retrieved directly onto the conveying section—forming the above-described pick-up section 45—of the conveying device 55a; 55b from where they are discharged.

According to another embodiment, the first transport conveying devices 43, which are disposed in the first and the second rack level 16 below the first transport conveying devices 43 of the above rack levels 16, and the conveying devices 54a, 55a; 54b, 55b can be provided, and in this case, the conveying devices 54a, 55a; 54b, 55b extend in vertical direction above and/or below the first transport conveying devices 43.

The second transport conveying devices 44 are connected with the transfer lifter 60a; 60b and disposed on the side facing the storage rack(s) 12a; 12b. The second transport conveying devices 44 serve for a storing process as described above.

The transport conveying devices 44 in the second buffer path section 42a, 42b are each provided in the form of accumulating tracks comprising the pick-up place 49, the transfer place 50 and at least one buffer section 51 between the latter, as described above. By means of the accumulating tracks the load 2 can be conveyed from the pick-up section 49 adjacent to the load-lifting device 34a, 34b to the transfer section 50 remote from the load-lifting device 34a in one single conveying direction 52a; 52b. The transfer of the load 2 onto the transport conveying devices 44 can be performed by the transfer lifter 60a; 60b directly, which transfer lifter comprises the above-described transport device 61a; 61b and can be adjusted between the rack levels 16 by the lift drive. To this end, the load 2 is conveyed from the conveying device 54a; 54b via the transfer lifter 60a; 60b either onto the transport conveying device 44 in the first rack level 16 or onto the transport conveying device 44 in the second rack level 16. The transport process of the load 2 onto the transport conveying device 44 in the third or an above rack level 16 has been described above already. For this purpose it is provided that the drive motor 63a, 63b can reverse the conveying direction of the transport device 61a; 61b.

According to this (not shown) embodiment, the load manipulation unit 4; 4' comprises the load-lifting device 34a; 34b and the transfer lifter 60a; 60b.

It should be noted that it is possible for the rack storage system as shown in the FIGS. 1 to 19 to not only exhibit a rack aisle unit but also a number of rack aisle units.

Figure 19:
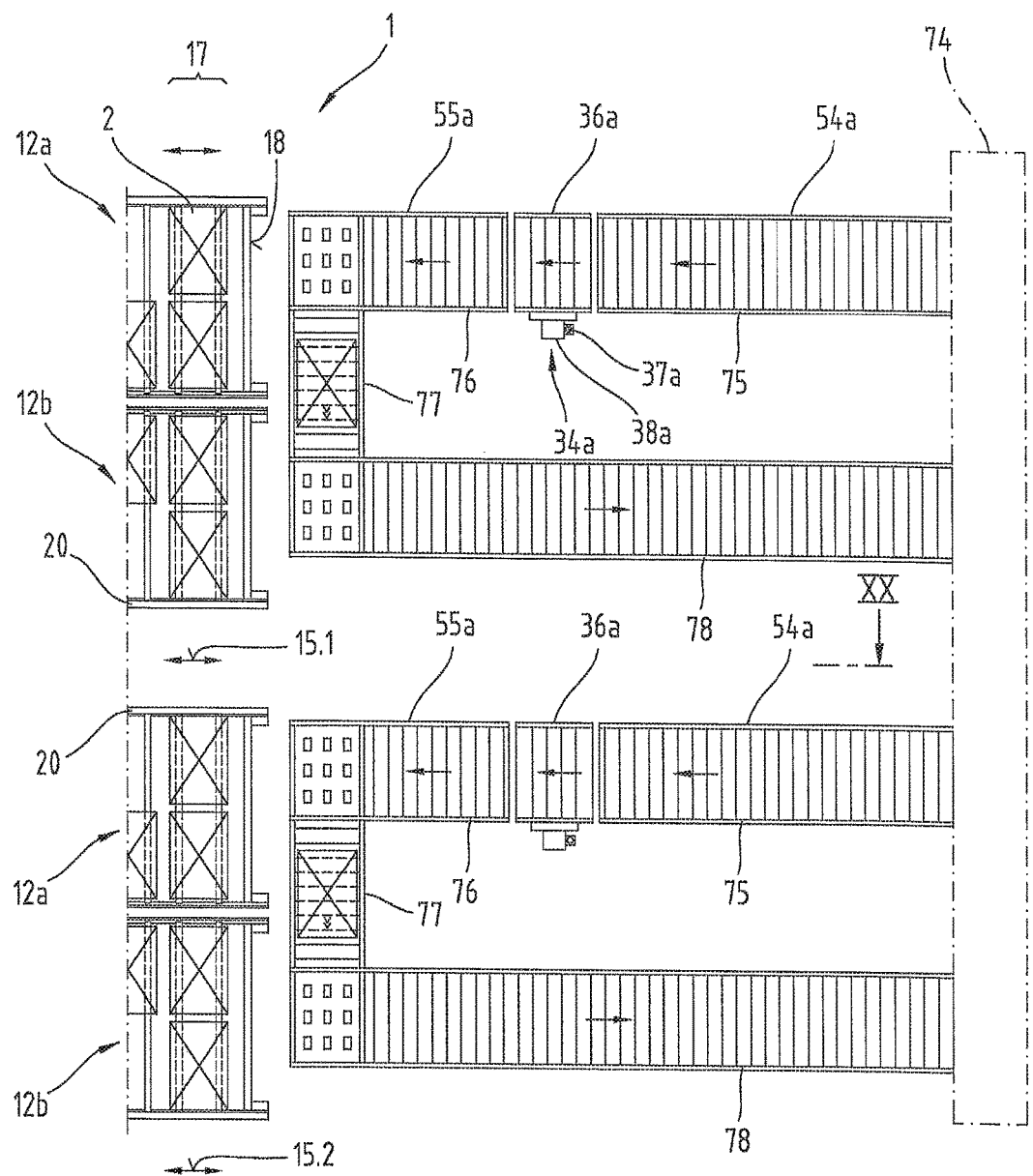
FIGS. 19, 21 show a top view of a second embodiment of the conveying system plane and/or conveying system of the feed area for supplying and removing load at different conveying directions.
Figure 20:
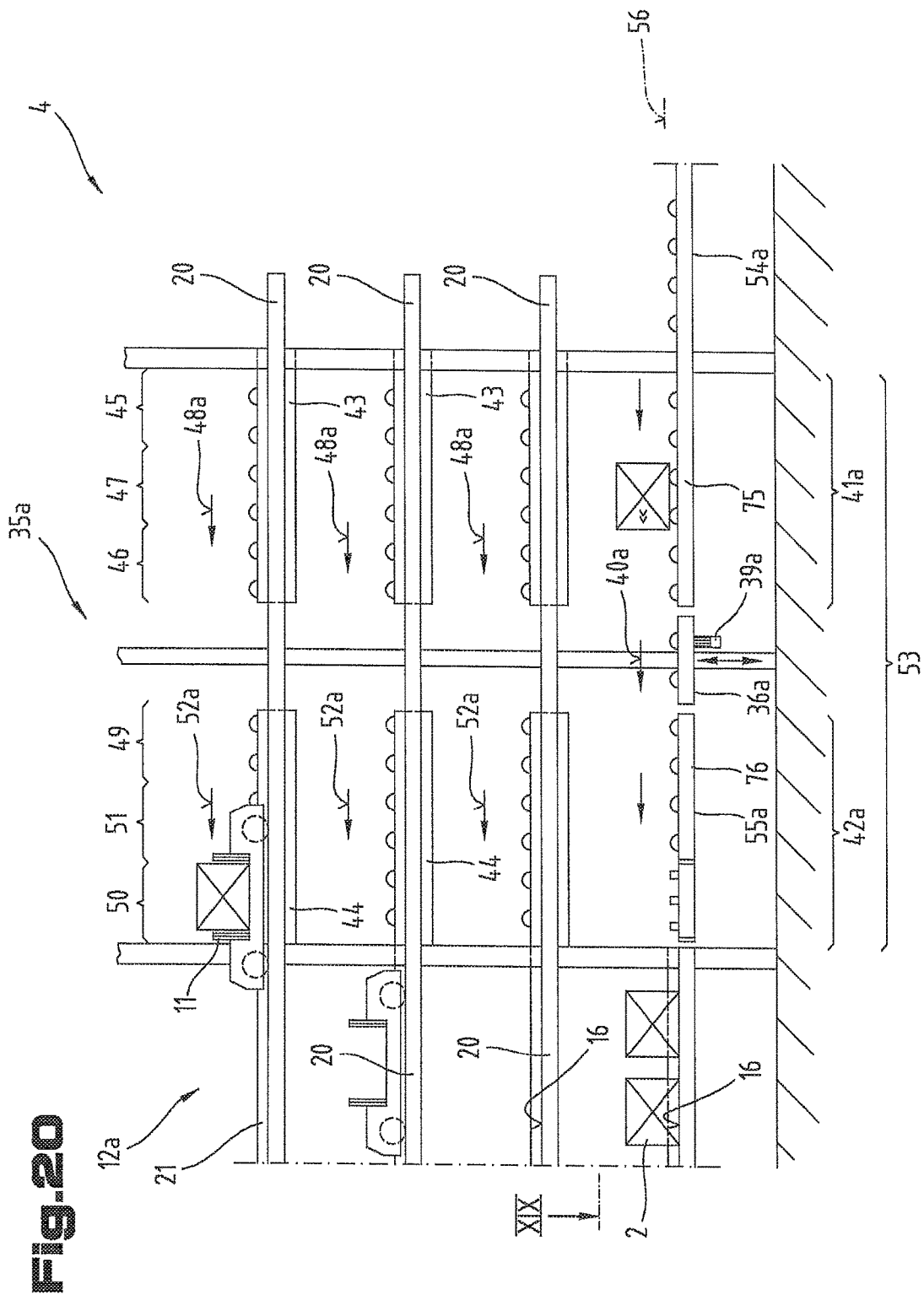
FIGS. 20, 22 show a lateral view of the load manipulation unit according to line XX in FIG. 19 and line XXII in FIG. 21.

FIGS. 19 and 20 show a modified embodiment of the rack storage system according to FIG. 1. Unlike the embodiment described above the rack storage system comprises a conveying system having a first conveying device 54a for transporting load 2 to the load-lifting device 34a and a second conveying device 55a for transporting load 2 from the load-lifting device 34a which is disposed within only one conveying system plane 56 in the lower, middle or upper height region (bottom region) of the rack storage 1. It is preferred if the conveying system plane 56 and the rack levels 16 are disposed within one horizontal plane.

This embodiment also exhibits two rack aisle units, each rack aisle unit of which comprises storage racks 12a, 12b adjacent to one another and a rack aisle 15.1, 15.2 extending between the latter, as well as a load manipulation unit 4, and the storage racks 12a, 12b of the two rack aisle units are adjacent to one another. Each manipulation unit 4 (FIG. 20) comprises a first load-lifting device 34a arranged on the front side upstream of the storage racks 12a, 12b, and a first buffer device 35a for temporarily storing the load 2. The fixed load-lifting device 34a in turn comprises the above-described liftable and lowerable transport device 36a, which can receive one or more pieces of load 2. The transport device 36a comprises a pick-up and transfer device for load 2, which formed e.g. by a conveying device which can be driven by a drive motor 39a (FIG. 20) and has a (not reversible) conveying direction 40a running parallel with the rack aisle 15.1, 15.2.

The conveying device is e.g. a roller track or a conveying band and suchlike. The conveyor system 36a serves for storing load 2 in as well as for retrieving load 2 without being required to change a conveying direction 40a. This being the case, the switching region 53 is defined along the load-lifting device 34a and the buffer device 35a.

The fixed buffer device 35a comprises, as described above, the first buffer path section 41a with the transport conveying devices 43 and the second buffer path section 42a with the transport conveying devices 44. The load-lifting device 34a is such arranged between the buffer path sections 41a, 42a and the conveying devices 54a, 55a that the transport device 36a for storing and retrieving load 2 can be vertically positioned relative with respect to the rack levels 16 and/or with respect to the conveying system plane 56 either between to respectively oppositely situated provisioning devices 43, 44 or between the conveying devices 54a, 55a, so that one or more pieces of load 2 can be conveyed either between the transport device 36a and one of the provisioning devices 43, 44, or between the transport device 36a and one of the conveying devices 54a, 55a.

The provisioning devices 43, 44 as described above in detail of the respective buffer path section 41a, 42a are arranged in each rack level 16, except from that rack level 16 where the conveying system plane 56 extends in. The transport conveying devices 43 arranged in the first buffer path section 41a and/or the accumulating tracks of any rack levels 16 where they are arranged in, each exclusively serve for a process of retrieving load 2 and/or as removing paths having non-reversible conveying directions 48a. The transport conveying devices 44 arranged in the second buffer path section 42a and/or the accumulating tracks of any rack levels 16 where they are arranged in, each exclusively serve for a process of storing load 2 and/or as storing paths having non-reversible conveying directions 52a.

As also shown in FIG. 20, the front horizontal beams 20 extend continuously along the rack aisle 15.1, 15.2 and the load-lifting device 34a as well as the transport conveying devices (43, 44) in those rack levels 16, where the transport conveying devices 43, 44 are disposed in. It is possible for each front horizontal beam 20 to be designed as one single uninterrupted horizontal beam 20, but also provided in the form of several horizontal beams 20 arranged one behind the other in longitudinal direction of the rack aisle 15.1, 15.2. The end sections of the horizontal beams 20 are connected with vertical rails via fastening means, such as screws. It is also possible that they are connected with the transport conveying devices 43, 44 via fastening means, such as screws. The horizontal beams 20 arranged as opposing pairs in the respective rack level 16 form a guide track, so that the conveyor vehicle 3 for storing land retrieving load 2 in the respective rack level 16 can either approach the transport conveying devices 43 in the first buffer path section 41a or the transport conveying devices 44 in the second buffer path section 42a, as described above.

For this purpose, the provisioning devices 43, 44 and the load-lifting device 34a are disposed between the conveying devices 54a, 55a and the buffer path sections 41a, 42a are provided sideways next to the rack aisle 15.1, 15.2 along the guide tracks 20.

In that rack level 16, where the conveying system for transporting load 2 to the load-lifting device 34a and for transporting load 2 from the load-lifting device 34a is disposed in, the front horizontal beams 20 essentially extend across the length of the storage racks 12a, 12b only. The load 2 of this rack level 16 can be retrieved by the conveyor vehicle 3 together with one piece of load 2 or more pieces of load 2 temporarily being moved onto the conveyor vehicle-lifting device 5 (FIG. 2) from where it is subsequently delivered to one of the other rack levels 16 where the transport conveying devices 43, 44 are arranged in. If the load 2 is to be stored in this rack level 16, the conveyor vehicle 3 together with one or more pieces of load 2 is temporarily moved onto the conveyor vehicle-lifting device 5 (FIG. 2) from where it is delivered onto that rack level 16, where the conveying system for transporting load 2 to the load-lifting device 34a and for transporting load 2 from the load-lifting device 34a is disposed in. Another embodiment for retrieving and storing load 2 in this rack level 16 is described in the FIGS. 25 to 27.

As shown in FIG. 19, the first conveying device 54a for transporting load 2 to the load-lifting device 34a and the second conveying device 55a for transporting load 2 from the load-lifting device 34a of several rack aisle units and/or rack aisles 15.1, 15.2 are connected to an automated distribution system 74, schematically shown by dashed lines, which serves for transporting load 2 from and to the conveying devices 54a, 55a. This distribution system 74 comprises a conveying device, such as a roller conveyor and suchlike.

The first conveying device 54a and the second conveying device 55a form first conveying section 75, 76 extending parallel with the rack aisle 15.1, 15.2 and aligned facing each other. The second conveying device 55a furthermore forms a second conveying section 77 and a third conveying section 78 extending parallel with the rack aisle 15.1, 15.2. The first and the third conveying section of the second conveying device 55a are connected to one another via the second conveying section 77.

Figure 21:
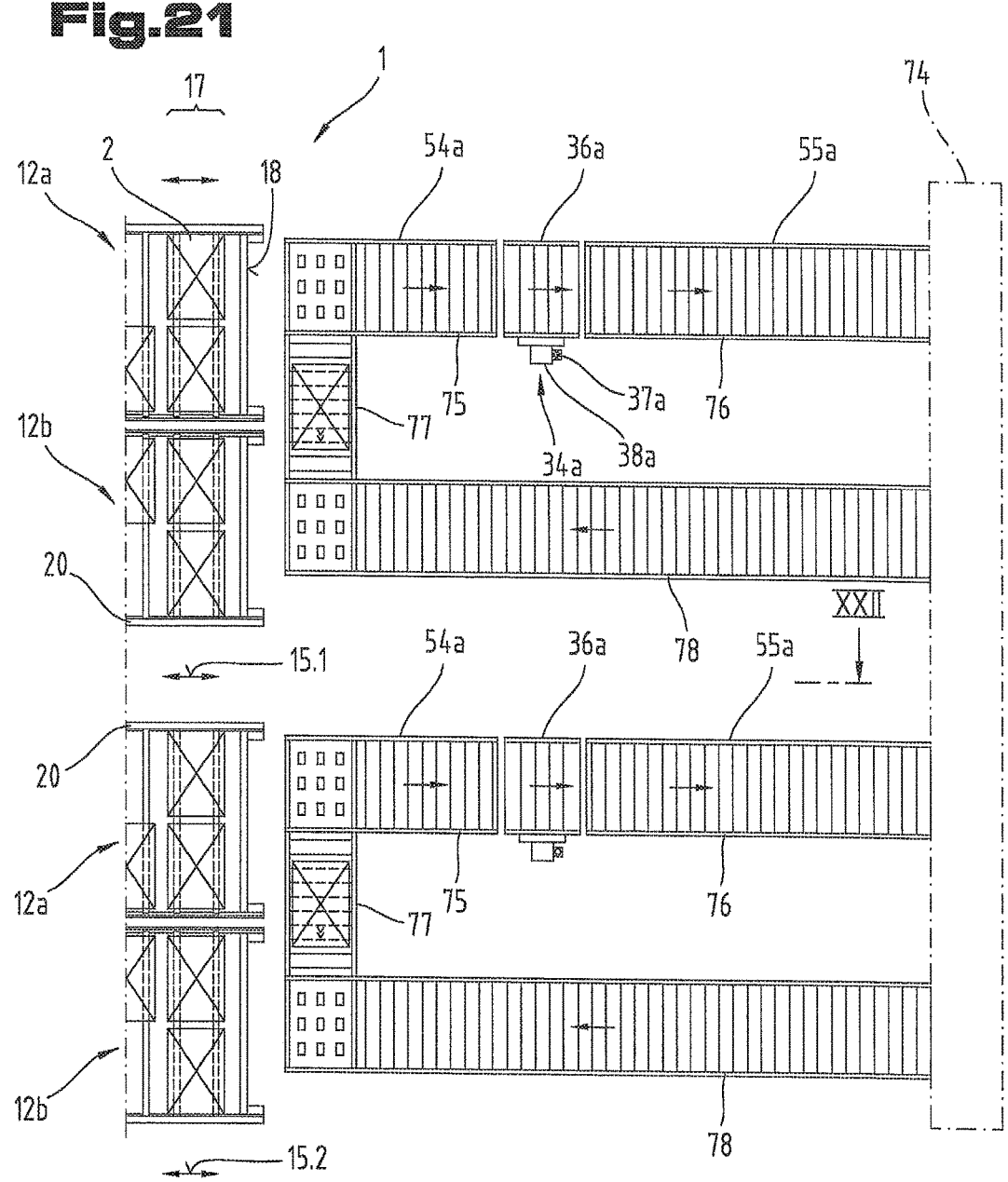
Figure 22:
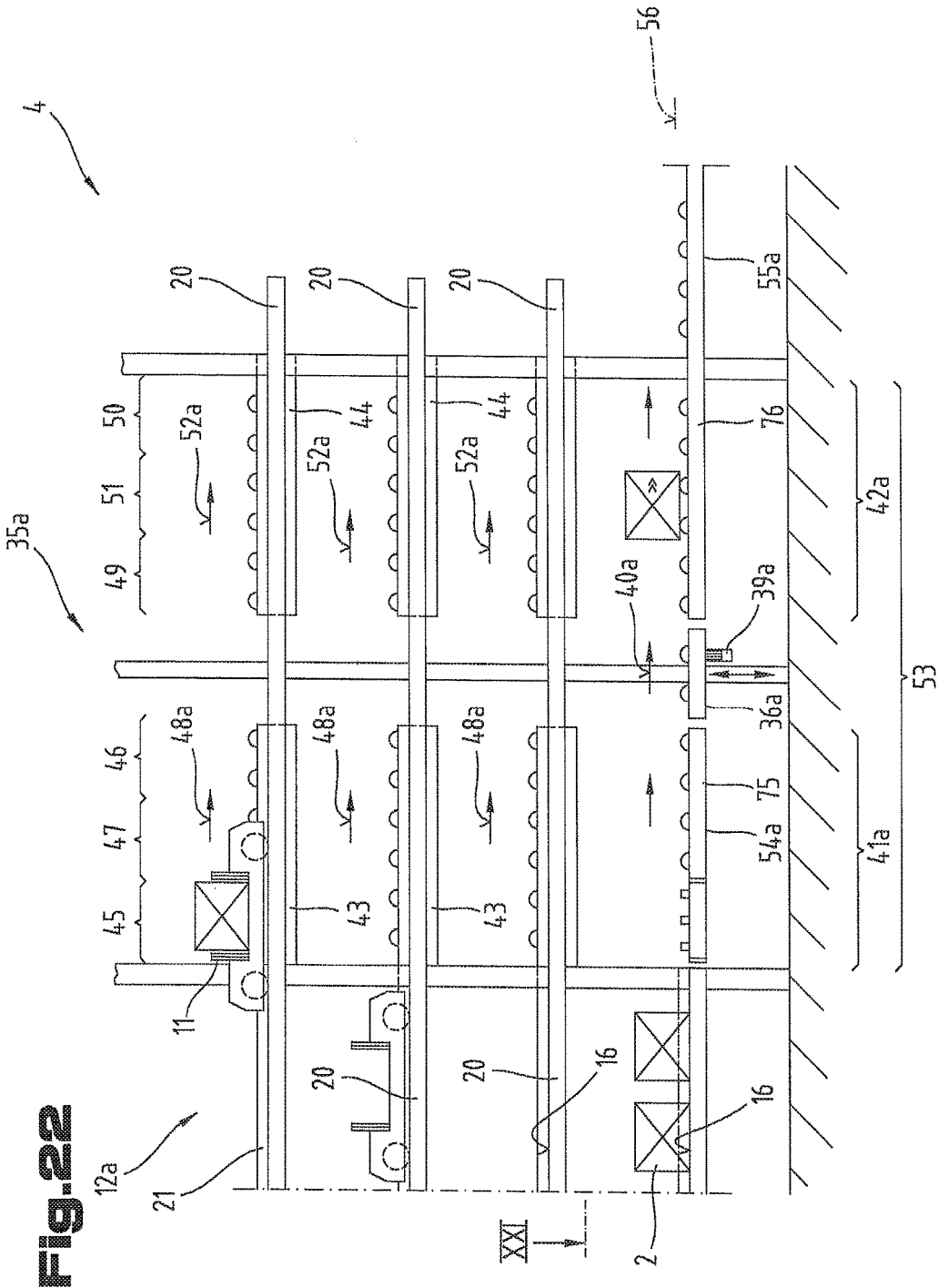

If the conveying direction of the first conveying device 54a and the second conveying device 55a is reversed, as shown in FIGS. 21 and 22, the latter form the first conveying sections 75, 76 extending parallel with the rack aisle 15.1, 15.2 and aligned facing each other. In this case, the first conveying device 54a furthermore forms a second conveying section 77 and a third conveying section 78 extending parallel with the rack aisle 15.1, 15.2. The first and the third conveying section of the first conveying device 54a are connected to one another via the second conveying section 77.

The conveying sections 75, 76, 77 each comprise a motor driven conveying element, such as a roller track, a conveying belt or suchlike. Shifting the load 2 between the first conveying section 76 and the second conveying section 77 and/or the second conveying section 77 and third conveying section 78 can be performed by means of roller separators known per se (e.g. known from WO 2012/006650 A1) or by means of liftable and/or lowerable belt converters and suchlike. It is however possible for the second conveying section 77 to comprise a bow-shaped conveying device, such as a curved conveyor.

According to the embodiments in FIGS. 19 to 22, the first conveying sections 75, 76 of the conveying devices 54a, 55a extend as an extension of a storage rack 12a of the second rack aisle unit. The third conveying section 78 of the second conveying device 55a (FIGS. 19, 20) and/or of the first conveying device 54a (FIGS. 21, 22) extends as an extension of a storage rack 12b of the second rack aisle unit adjacent to the storage rack 12a of the first rack aisle unit.

As also shown in FIG. 22, the transport conveying devices 43 in their function as removing paths and the transport conveying devices 44 in their function as storing paths, as described above, are likewise driven at opposing conveying directions 48a, 52a as compared to the embodiments according to FIGS. 19, 20.

Figure 23:
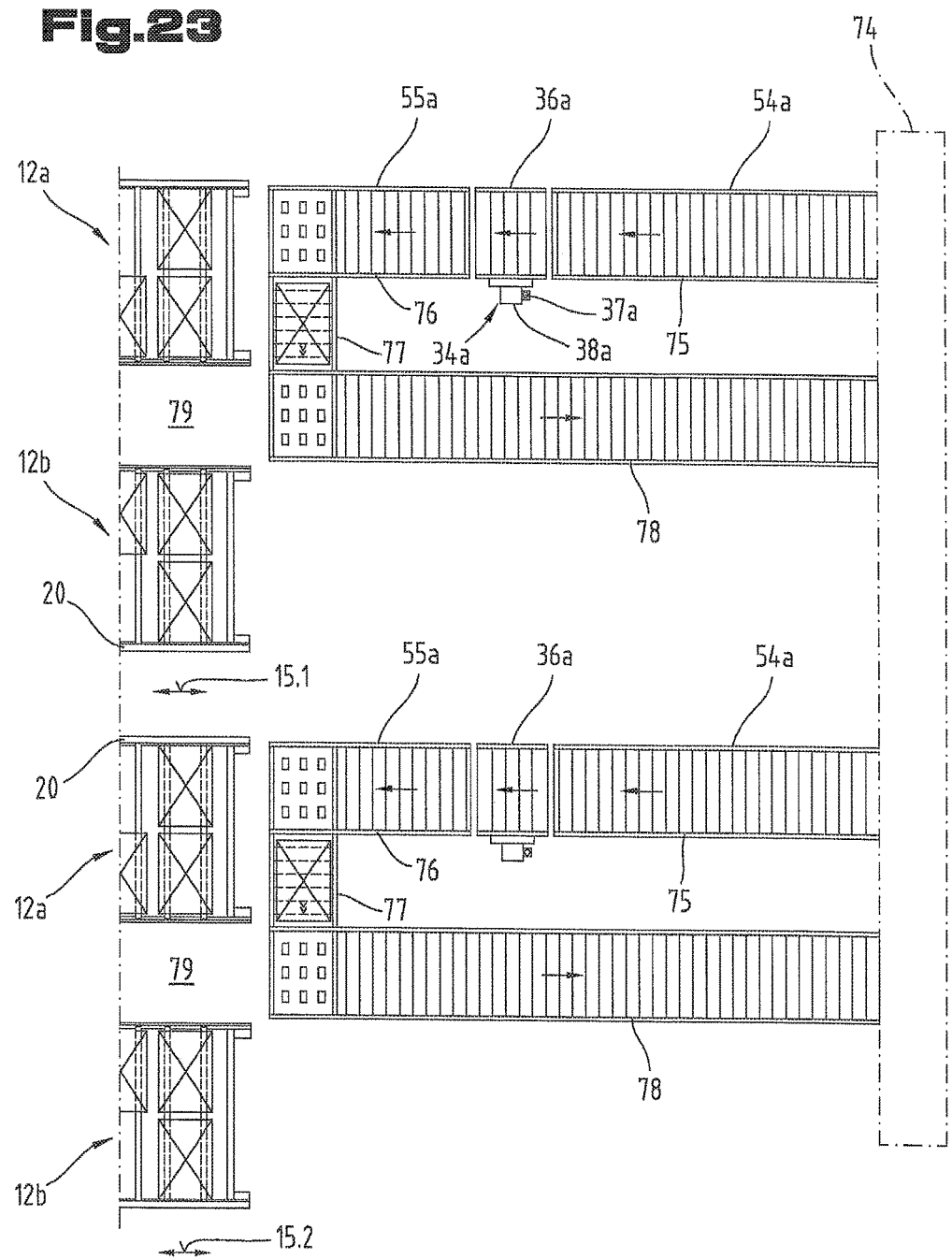
FIGS. 23, 24 show a top view of a third embodiment of the conveying system plane and/or conveying system of the feed area for supplying and removing load at different conveying directions.

FIG. 23 shows the rack storage system according to the FIGS. 19 and 20 showing another arrangement of the above-described conveying system having a first conveying device 54a for transporting load 2 to the load-lifting device 34a and a second conveying device 55a for transporting load 2 from the load-lifting device 34a which is disposed within only one conveying system plane 56 in the lower, middle or upper height region (bottom region) of the rack storage 1. It is preferred if the conveying system plane 56 and the rack level 16 are disposed within one horizontal plane.

The first conveying device 54a and the second conveying device 55a form first conveying section 75, 76 extending parallel with the rack aisle 15.1, 15.2 and aligned facing each other. According to FIG. 23, the second conveying device 55a furthermore forms a second conveying section 77 and a third conveying section 78 extending parallel with the rack aisle 15.1, 15.2. Whilst, according to FIG. 24, the second conveying device 54a furthermore forms a second conveying section 77 and a third conveying section 78 extending parallel with the rack aisle 15.1, 15.2. The first and the third conveying section of the second conveying device 55*a* or of the first conveying device 54*a* are connected to one another via the second conveying section 77.

Figure 24:
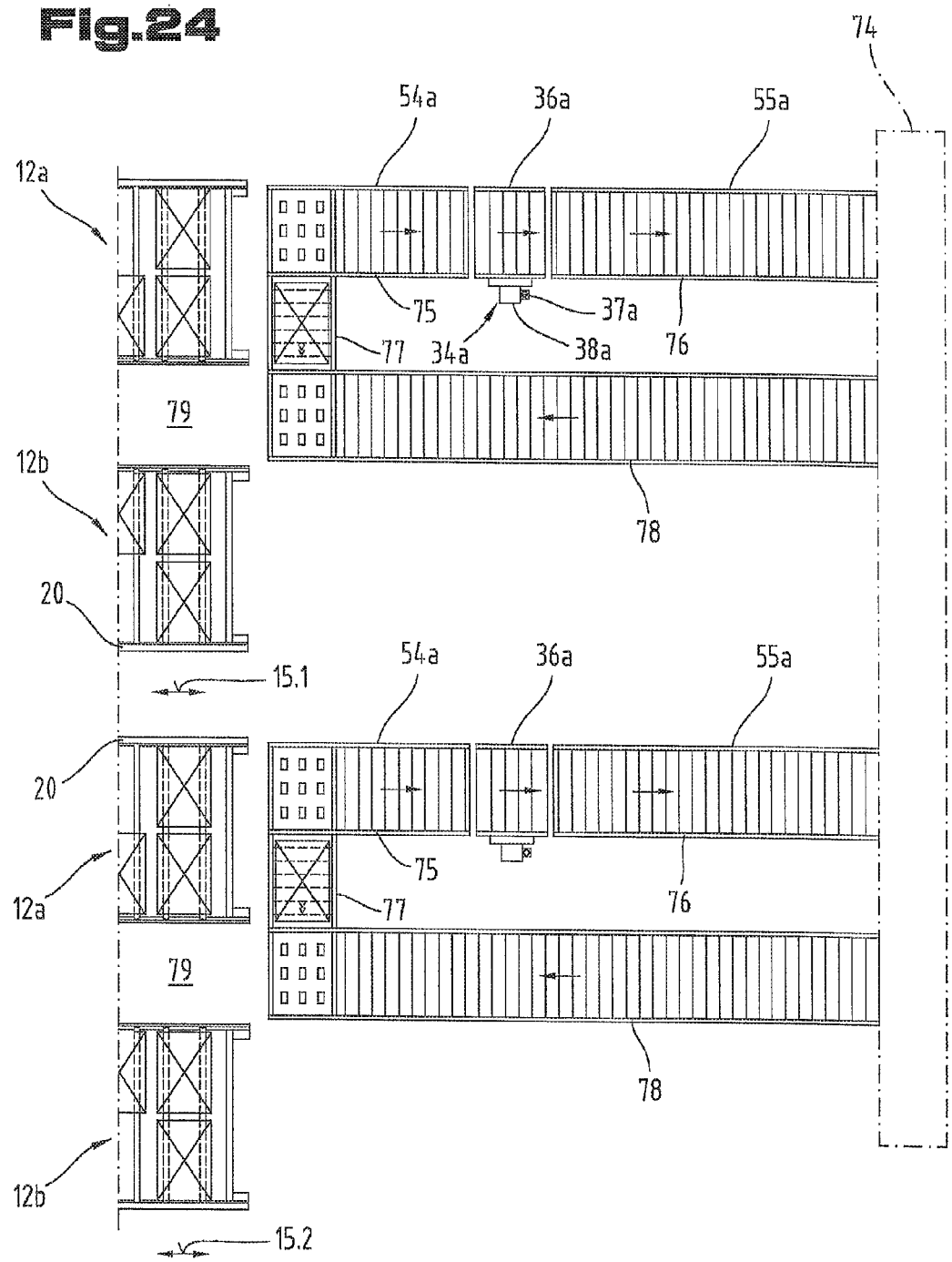

If the conveying direction of the first conveying device 54*a* and the second conveying device 55*a* is reversed, as shown in FIG. 24, the latter form the first conveying sections 75, 76 extending parallel with the rack aisle 15.1, 15.2 and aligned facing each other. In this case, the first conveying device 54*a* furthermore forms a second conveying section 77 and a third conveying section 78 extending parallel with the rack aisle 15.1, 15.2. The first and the third conveying section of the first conveying device 54*a* are connected to one another via the second conveying section 77.

This embodiment also exhibits two rack aisle units, each rack aisle unit of which comprises storage racks 12*a*, 12*b* adjacent to one another and a rack aisle 15.1, 15.2 extending between the latter, as well as the load manipulation unit 4 e.g. according to FIG. 20.

According to this embodiment, the storage racks 12*a*, 12*b* of the adjacent rack aisle units are arranged at a distance to one another, so that an aisle 79 is formed between the storage rack 12*a* of the first rack aisle unit and the storage rack 12*b* of the second rack aisle unit. It is now provided that the third conveying section 78 is disposed on the front side upstream of the storage racks 12*a*, 12*b* and extends as an extension of the aisle 79. It is also possible that a part of the length of the third conveying section 78 projects into the aisle 78 and partially extends inside the aisle 79.

Even if, according to the embodiments according to the FIGS. 16 to 24, the conveying system for transporting load 2 to and from the load-lifting device 34*a*; 34*a*, 34*b* is always drawn at a place upstream of the rack storage 1, it is nevertheless possible for the conveying devices 54*a*; 54*a*, 54*b*; 69, 71 to project into the storage rack 12*a*, 12*b* and/or the storage racks 12*a*, 12*b*. This allows a very space-saving arrangement of the conveying system for transporting load 2 to and from the load-lifting device 34*a*; 34*a*, 34*b*.

Figure 25:
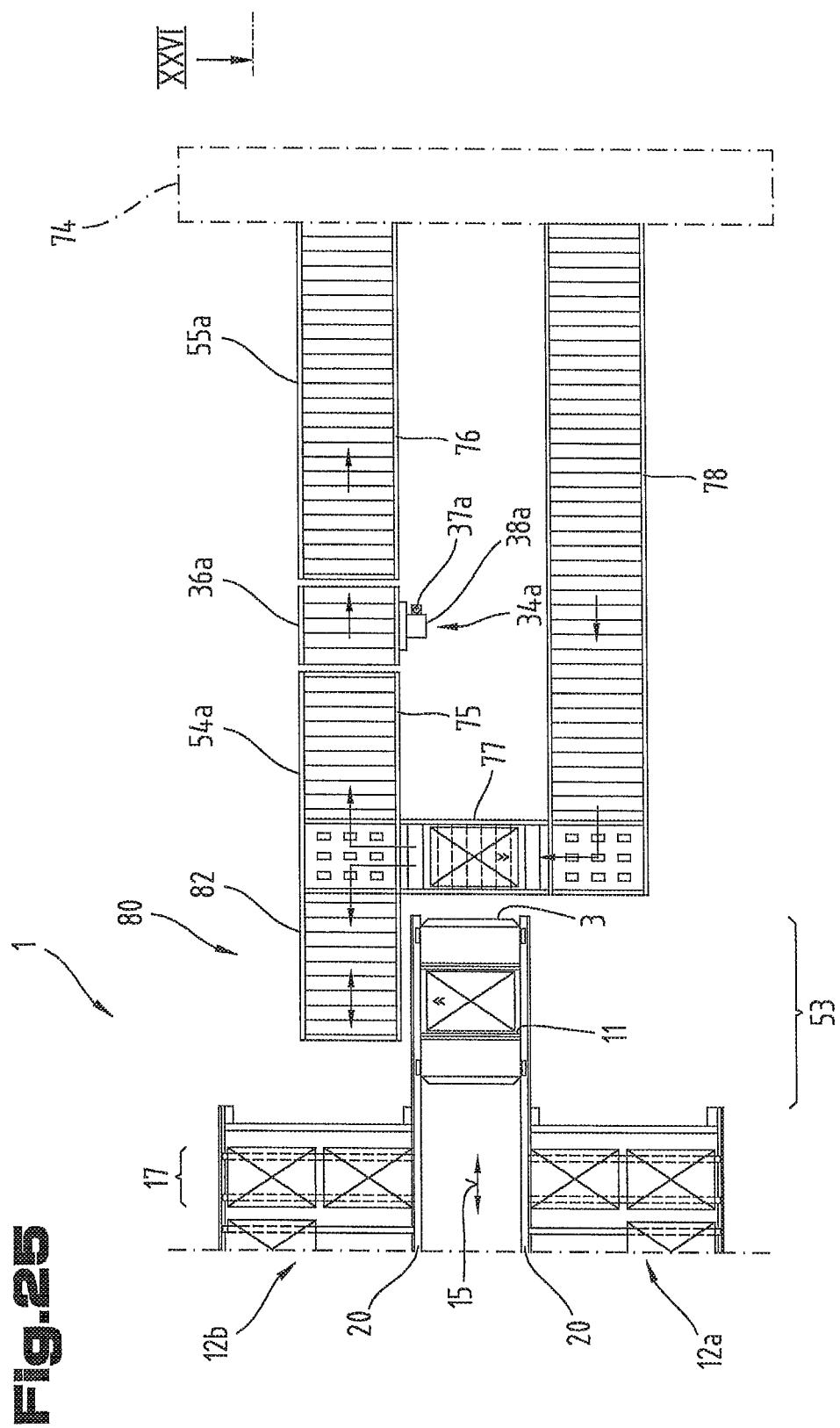
FIG. 25 shows a top view of a fourth embodiment of the conveying system plane and/or conveying system of the feed area for supplying and removing load.
Figure 26:
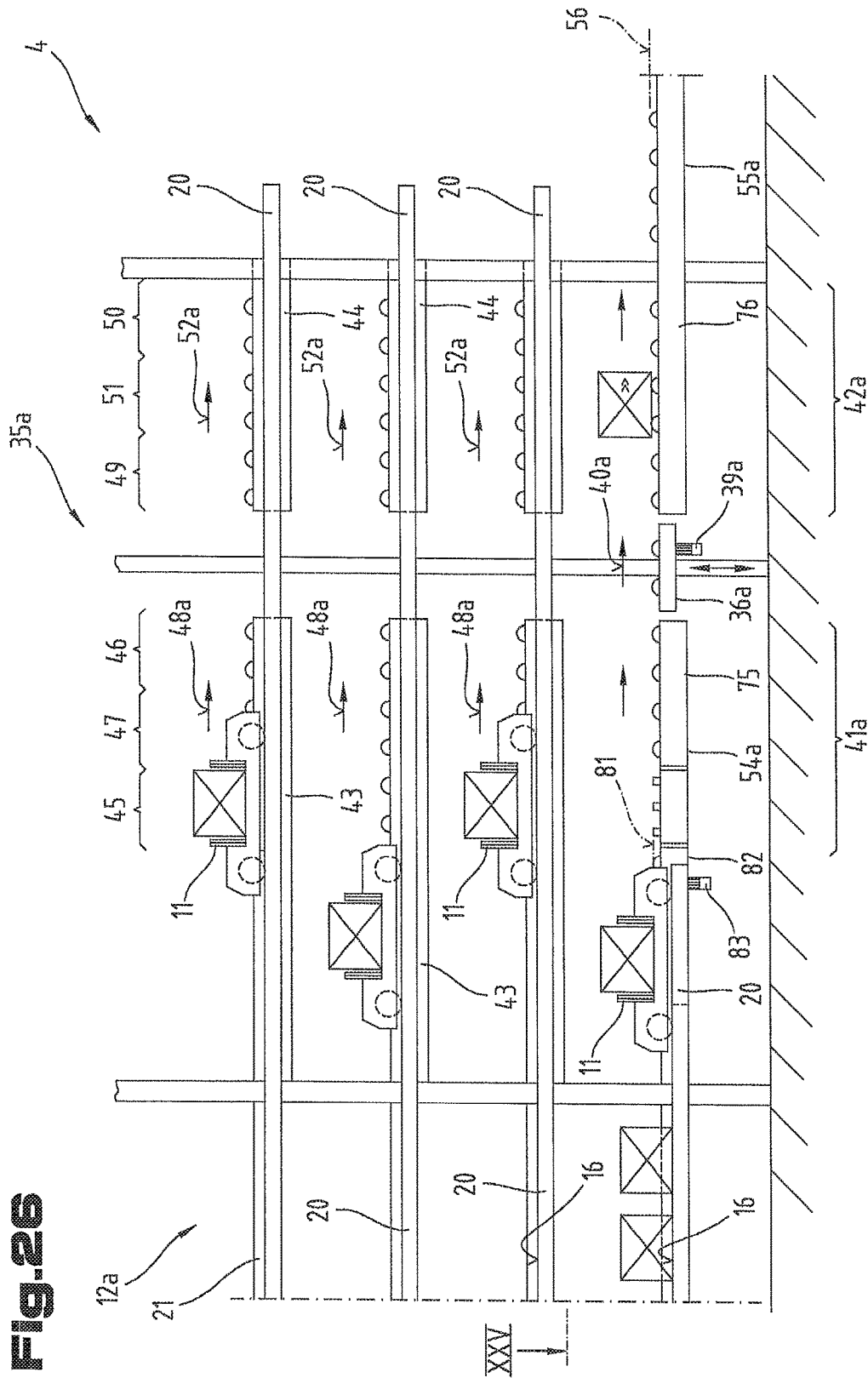
FIG. 26 shows lateral view of the load manipulation unit according to line XXVI in FIG. 25.

The FIGS. 25 and 26 show another embodiment for retrieving and storing load 2 from and into each rack level 16, respectively, where the conveying system plane is arranged in.

The conveying system for transporting load 2 to and from the load-lifting device 34*a* comprises at least one transfer and pick-up device 80 forming a transfer and pick-up area 81 for receiving one or more pieces of load 2. According to the embodiment shown, the transfer and pick-up area 81 of the transfer and pick-up device 80 can receive two pieces of load 2 one behind the other. As—according to this embodiment—only one transfer and pick-up device 80 is provided per rack aisle unit and/or rack aisle 15, the latter comprises a conveying device 82 which can be reversibly driven by a drive motor 83 and has a conveying direction which runs parallel with the rack aisle 15 and is reversible (double arrow). To this end, the conveying device 82 has at least one motor-driven conveying element, such as a roller track, a conveying belt and suchlike. Together with the first conveying device 54*a* and the second conveying device 55*a*, the (third) conveying device 82 forms the conveying system. The conveying element forms the transfer and pick-up area 81 and is coupled to the drive motor 83 (FIG. 26).

The (third) conveying device 82 extends parallel with the rack aisle 15 in the extension of the storage rack 12*a*; 1.2*b* and is connected to the first conveying device 54*a*. The front horizontal beams and/or the guide track 20 extends in this rack level 16 along the transfer and pick-up device 80 so that the transfer and pick-up device 80 can be approached by the conveyor vehicle 3 by means of the horizontal beam 20. In this rack level 16, the switching region 53 is defined at the transfer and pick-up device 80.

If a load 2 is now to be stored in the rack level 16 where the conveying system for transporting load to and from the load-lifting device is disposed in, this load is conveyed from the third conveying section 78 via the second conveying section 77, e.g. via the roller separator shown, to the transfer and pick-up device 80 and made available on the (third) conveying device 82. The load 2 to be stored is picked up from the transfer and pick-up device 80 and/or the (third) conveying device 82 by means of the conveyor vehicle 3. The conveyor vehicle 3 can pick up the load 2 to be stored from the transfer and pick-up device 80 by means of the load receiving device 11. Then, the conveyor vehicle 3 together with the load 2 moves out of the switching region 53, along the track until it is positioned in front of a storage place 17 in the first or second storage rack 12*a*, 12*b*.

If, in contrast, a load 2 is to be retrieved, the conveyor vehicle 3 is moved until it is in front of a storage place 17, where a load receiving device 11 takes a load 2 to be retrieved according to an order, in particular a picking order, from the storage rack 12*a*, 12*b* onto the conveyor vehicle 3. Then, the conveyor vehicle 3 together with the load 2 to be retrieved moves along the track from the storage place 17 into the switching region 53 where it is transferred from the conveyor vehicle 3 onto the transfer and pick-up device 80 and/or the (third) conveying device 82 by means of the load receiving device 11. If the load 2 to be retrieved is present on the transfer and pick-up device 80, the latter will be conveyed onto the second conveying device 55*a* from the (third) conveying device 82, the first conveying device 54*a* and via the transport device 36*a*.

Consequently, the transfer and pick-up device 80 according to this embodiment serves for a process of retrieving and storing load 2. For this purpose, it is only required to reverse the conveying direction of the (third) conveying device 82.

Instead of being carried out by the load receiving device 11 the transfer and pick-up of the load 2 between the (third) conveying device 82 and the conveyor vehicle 3 can also be carried out by a manipulation unit (not shown) which is arranged to be separate from the conveyor vehicle 3. For this purpose, the manipulation unit has a slider which can be operated in both directions relative with respect to the (third) conveying device 82 by means of an actuator drive.

If the conveying direction of the first conveying device 54*a* and the second conveying device 55*a* is reversed, as e.g. described in FIGS. 19 and 20, the (third) conveying device 82 is connected with the second conveying device 55*a*.

Figure 27:
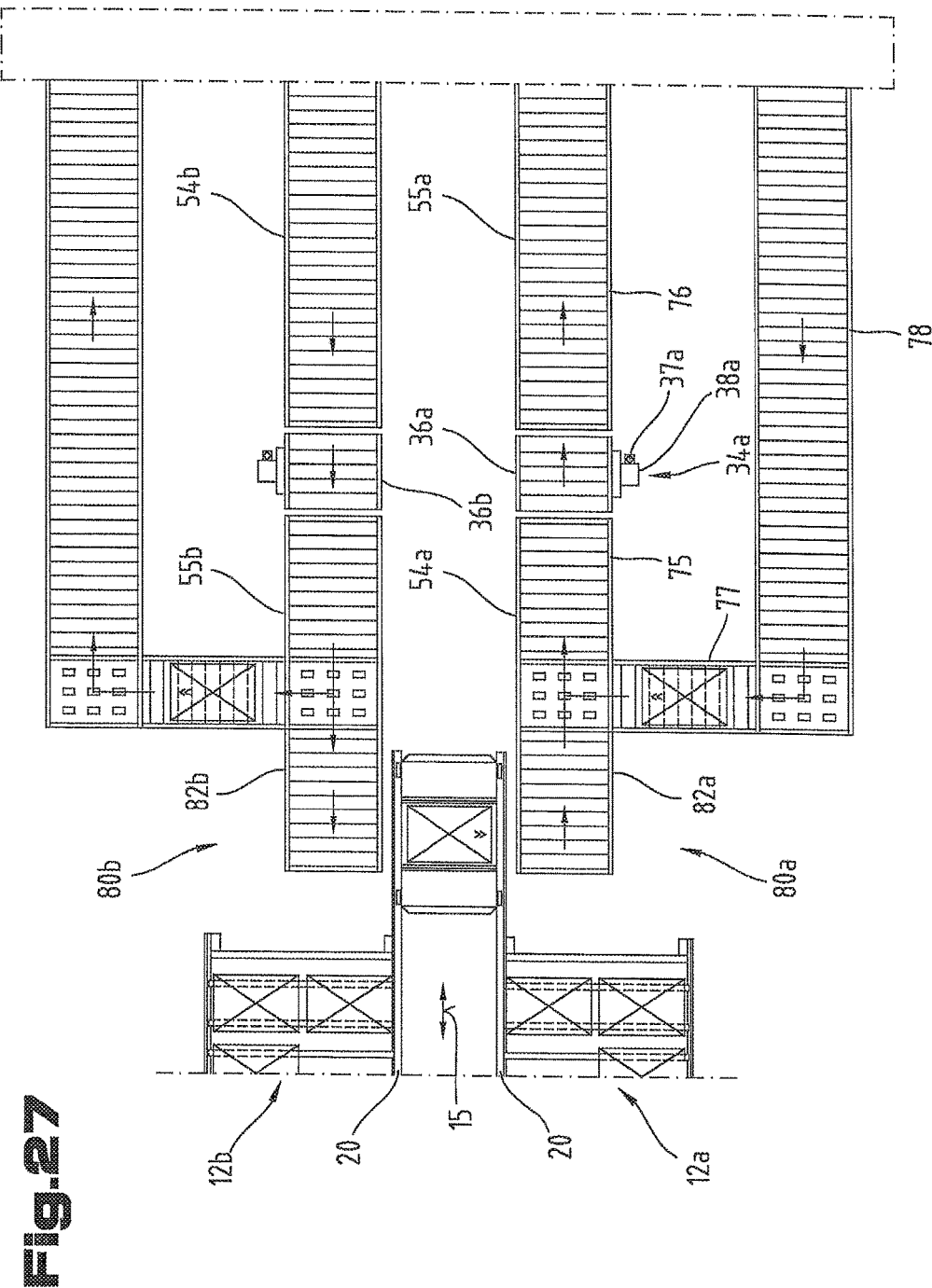
FIG. 27 shows a top view of a fifth embodiment of the conveying system plane and/or conveying system of the feed area for supplying and removing load.

FIG. 27 shows an embodiment for retrieving and storing load 2 from and into that rack level 16, respectively, where the conveying system plane is arranged in, in which embodiment two transfer and pick-up devices 80*a*, 80*b* are provided for each rack aisle unit and/or rack aisle 15. Each transfer and pick-up device 80*a*, 80*b* forms a transfer and pick-up area 81 (as entered in FIG. 26 relating to the conveying device 82) for receiving one or more pieces of load 2.

As, according to this embodiment, separate transfer and pick-up devices 80*a*, 80*b* are provided per rack aisle unit and/or rack aisle 15, the latter comprise one conveying device 82*a*, 82*b* each which can be driven via a drive motor 83 (not shown) having one conveying direction, and are disposed to be parallel with the rack aisle 15. The transfer and pick-up devices 80*a*, 80*b* are arranged opposite one another to be laterally reversed with respect to the rack aisle 15. Thus, the conveyor vehicle 3 stopped in a switching region 53 between the transfer and pick-up devices 80*a*, 80*b* can pick up load 2 to be stored from the second transfer and pick-up device 80b by means of the load receiving device 11 and deliver load 2 to be retrieved onto the first transfer and pick-up device 80a by means of the load receiving device 11. The conveying devices 82a, 82b however have opposite conveying directions, as shown in FIG. 27. Therefore, the first transfer and pick-up device 80a together with the conveying devices 82a serves for a process of retrieving load 2 and the second transfer and pick-up device 80b together with the conveying device 82b for a process of storing load 2. To this end, the conveying device 82a, 82b has at least one motor-driven conveying element, such as a roller track, a conveying belt and suchlike. Together with the first conveying device 54a and the second conveying device 55a, the (third) conveying devices 82a, 82b form the conveying system. The conveying element forms the transfer and pick-up area 81 and is coupled to a drive motor 83a, 83b (not shown). The (third) conveying devices 82a, 82b each extend parallel with the rack aisle 15 in the extension of the storage racks 12a; 12b. One of the (third) conveying devices 82a is connected with the first conveying device 54a. The other one of the (third) conveying devices 82b is connected with the conveying device 54b.

If a load 2 is now to be stored in the rack level 16 where the conveying system for transporting load to and from the load-lifting device is disposed in, this load is conveyed from the first conveying device 54b via the transport device 36b onto the second conveying device 55b from where it is conveyed onto the (third) conveying device 82b. The load 2 to be stored is picked up from the transfer and pick-up device 80b and/or the (third) conveying device 82 and stored by means of the conveyor vehicle 3, as described above.

If, however, a load 2 is to be retrieved the latter will be conveyed onto the second conveying device 55a from the (third) conveying device 82 via the first conveying device 54a and the transport device 36a.

If the conveying system is arranged in accordance with FIG. 1 it is of course also possible that several transfer and pick-up devices 80 are arranged in rack levels 16 situated one above the other per load manipulation unit 4 and that several transfer and pick-up devices 80 follow the transfer lifter 60a and/or the first conveying device 54a. The transfer lifter 60a can pick up a load 2 from one of the transfer and pick-up devices 80 and retrieve it, but it can also transfer a load 2 onto one of the transfer and pick-up devices 80 and store it.

An arrangement of the conveying system according to FIG. 6 or 15 allows that per load manipulation unit 4', 4", several transfer and pick-up devices 80 are arranged in rack levels 16 situated one above the other, which follow the transfer lifter 60a, 60b (FIG. 6) and/or the first conveying device 69 (FIG. 15).

Even if—according to the arrangements according to the FIGS. 25 to 27—the transfer and pick-up device(s) 80 are always entered upstream of the rack storage 1, it is nevertheless also possible for the transfer and pick-up device(s) 80 to be integrated in the storage rack 12a, 12b and/or the storage racks 12a, 12b and arranged below and/or above the storage places 17. This allows a very space-saving arrangement of the conveying system for transporting load 2.

Figure 28:
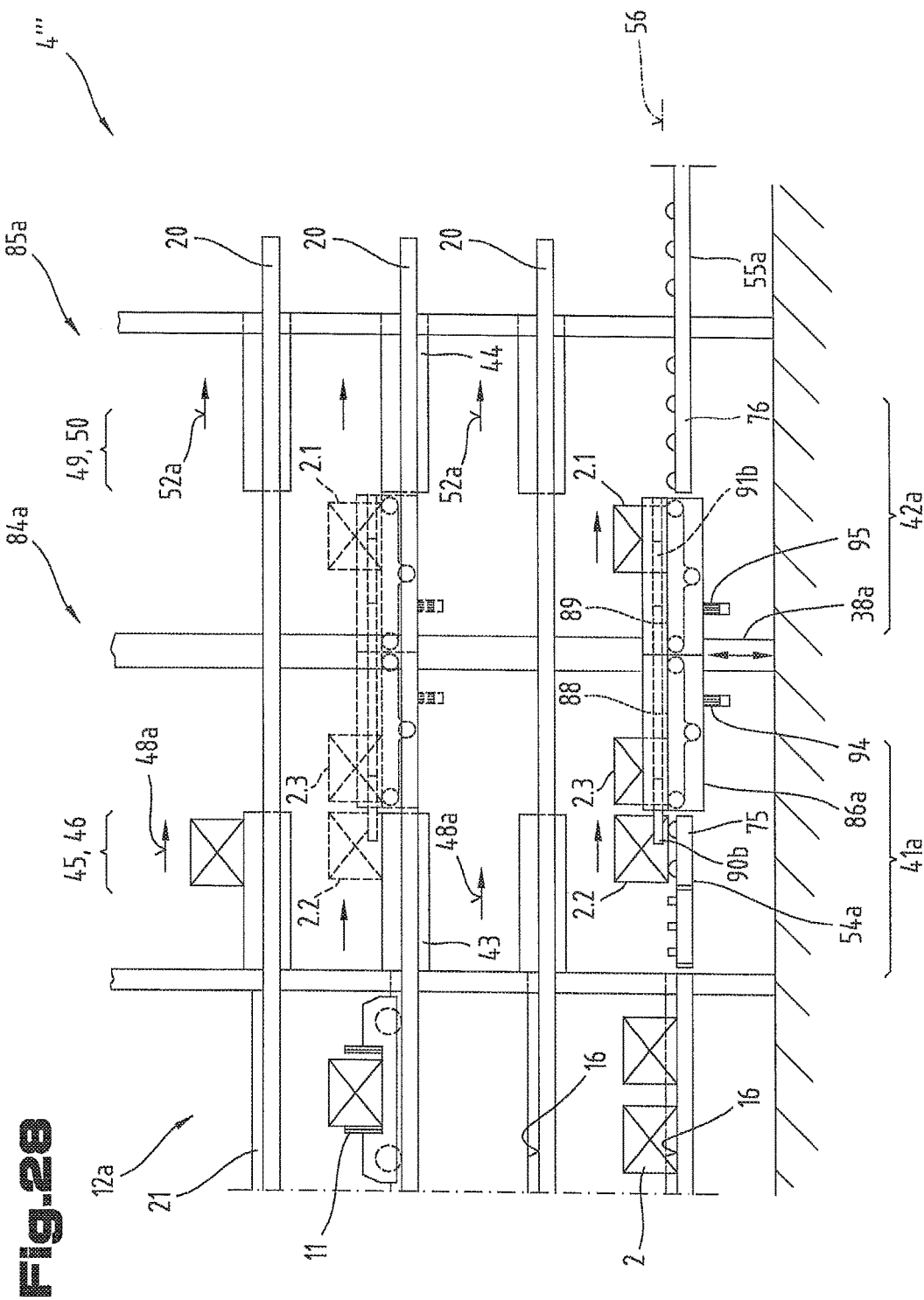
FIG. 28 shows a lateral view of a third embodiment of a load manipulation unit.

FIG. 28 shows another embodiment of a fully automated load manipulation unit 4" which is arranged on the front side upstream of the storage racks 12a, 12b and comprises a first load-lifting device 84a and a first buffer device 85a for temporarily storing load 2. It is also possible for the load manipulation unit 4"" to be disposed between the rack storage sides 18, 19 arranged on the front side, and can therefore be integrated in the rack storage 1 and/or in the storage racks 12a, 12b. It is also possible for the load manipulation unit 4"" to comprise—as in the arrangement described above—a first load-lifting device 86a and a first buffer device 85a as well as a second load-lifting device 84b and a second buffer device 85b. It is furthermore possible for the conveying system of the feed area to be used according to the explanations in FIGS. 15, 16, 18; 19-22; 23, 24; 25, 26; 27.

For the sake of simplicity, reference will be made to the arrangement of a first load-lifting device 84a and a first buffer device 85a exclusively. The reference numerals of the alternative embodiments will be given in brackets.

The fixed load-lifting device 84a comprises a liftable and lowerable transport device 86a for one or more pieces of load 2, and the transport device 86a is built on a lifting frame which may be vertically adjusted by a lift drive (not shown). According to the embodiment shown, the transport device 86a is disposed on a first mast 38a via the lifting frame.

Figure 29:
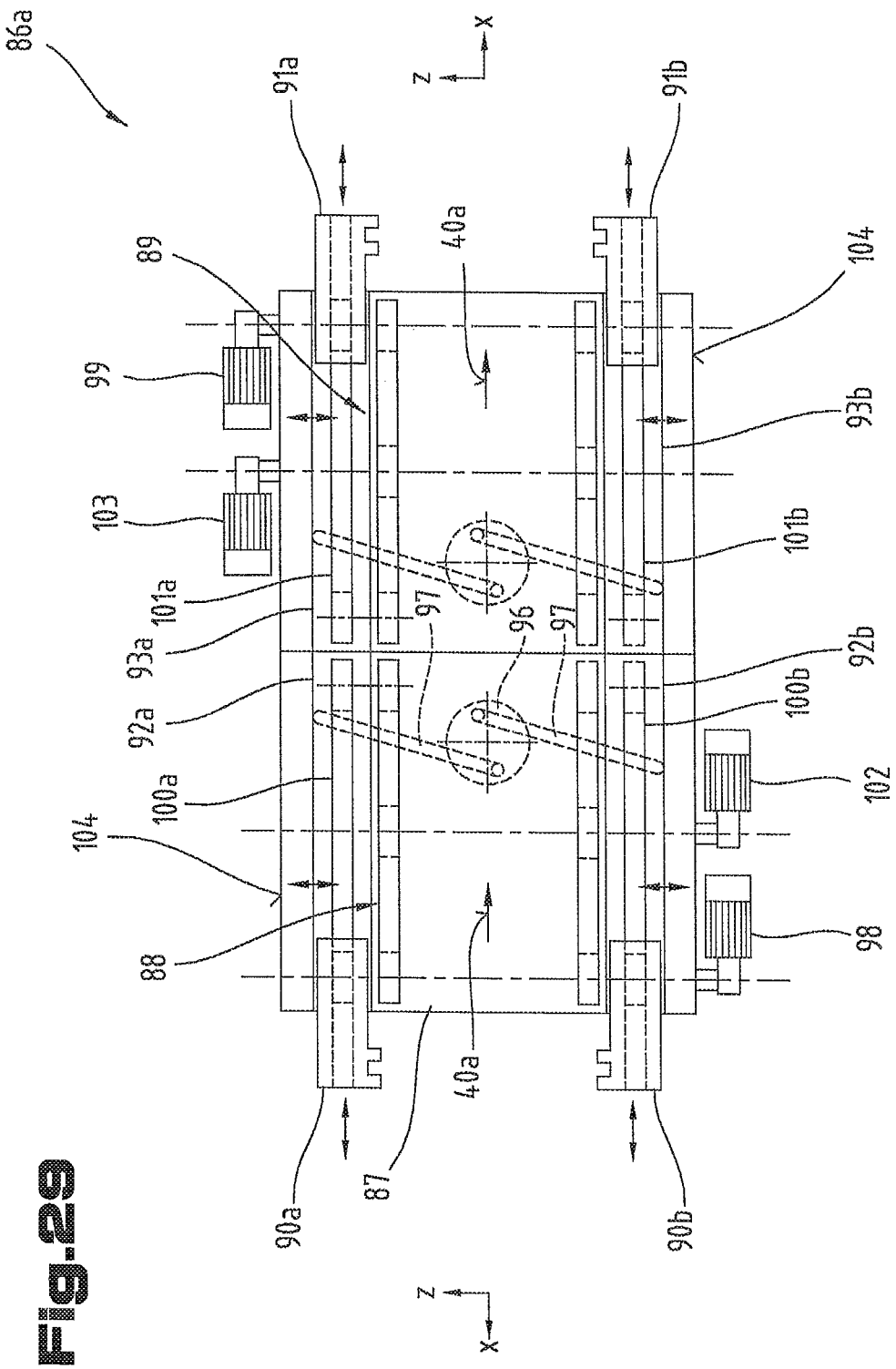
FIG. 29 shows a transport device for the load-lifting device of the load manipulation unit according to FIG. 28.

According to this embodiment, the transport device 86a, as shown in FIG. 29 in more detail, comprises a carrying platform 87 for one or more pieces of load 2 and a gripping unit for pulling/pushing the load 2 between the conveying devices 54a, 55a (54b, 55b; 69, 71) and the transport device 86a (86b) or between the provisioning devices 43, 44 and the transport device 86a (86b). The carrying platform 87 has longitudinal sides 104 extending parallel with the rack aisle 15 and front sides facing away from each other, and the front sides extend essentially vertically with respect to the longitudinal extension of the rack aisle 15. It is preferred that the transport device 86a comprises gripping units that can be driven independently of one another. The first gripping unit comprises gripping devices 90a, 90b which are arranged on the longitudinal sides 104 of the carrying platform 87 and which longitudinal sides extend parallel with the rack aisle 15, and the second gripping unit comprises gripping device 91a, 91b which are arranged on the longitudinal sides 104 of the carrying platform 87 which longitudinal sides extend parallel with the rack aisle 15. It is also possible for the transport device 86a to comprise a first conveying device 88 and a second conveying device 89 disposed on the carrying platform 87, which devices are arranged one behind the other in conveying direction 40a. The transport device 86a serves for both processes, for storing and retrieving load 2.

The gripping devices 90a, 90b, 91a, 91b for the manipulation of load are each guided in parallel running longitudinal guides 92a, 92b, 93a, 93b arranged on both longitudinal sides 104 of the carrying platform 87 in a horizontal plane. The longitudinal guides 92a, 92b, 93a, 93b with the gripping devices 90a, 90b, 91a, 91b can be displaced relative to one another by first actuator drives which can be operated independently of one another in z-direction (double arrow—perpendicular with respect to the longitudinal extension of the rack aisle 15). The first actuator drives each comprise a drive motor 94, 95 (FIG. 28) and a transmission means which can be operated by the latter, to which transmission means the longitudinal guides 92a, 92b, 93a, 93b are connected, so that the longitudinal guides 92a, 92b and the gripping devices 90a, 90b are synchronously moved towards one another or away from one another via the drive motor 94 and/or the longitudinal guides 93a, 93b and the gripping devices 91a, 91b are synchronously moved towards one another or away from one another via the drive motor 95. To this end, the gripping devices 90a, 90b of the first pair of gripping devices and the gripping devices 91a, 91b of the second pair of gripping devices can be operated in z-direction independently of another.

The transmission means are each provided in the form of push rods 97 which are connected to a first end in an articulated manner at diametrically opposed coupling points by means of a disc drive 96, the second ends of the push rods 97 being connected with the longitudinal guides 92*a*, 92*b*, 93*a*, 93*b* in an articulated manner.

The gripping devices 90*a*, 90*b*, 91*a*, 91*b* can also be adjusted in x-direction (double arrow—parallel with the longitudinal extension of the rack aisle 15) via second actuator drives which can be operated independently of one another. The second actuator drives each comprise a reversible drive motor 98, 99 and a transmission means 100*a*, 100*b*, 101*a*, 101*b* which can be operated by the latter, to which transmission means the gripping devices 90*a*, 90*b*, 91*a*, 91*b* are coupled in such a way that it is possible for the gripping devices 90*a*, 90*b* or for the gripping devices 91*a*, 91*b* to be synchronously retracted or approached via the reversible drive motor 98 and/or the reversible drive motor 99, respectively.

To this end, the gripping devices 90*a*, 90*b* of the first pair of gripping devices and the gripping devices 91*a*, 91*b* of the second pair of gripping devices can be operated in x-direction independently of another.

The transmission means 100*a*, 100*b*, 101*a*, 101*b* are arranged in pairs and the first pairs of transmission means 100*a*, 100*b* and the second pairs of transmission means 101*a*, 101*b* can be driven synchronously each. Continuously circulating drive mechanisms, such as e.g. toothed belt drives, are used, which are connected and/or coupled in terms of movement to the gripping devices 90*a*, 90*b*, 91*a*, 91*b*.

For gripping a load 2, the gripping devices 90*a*, 90*b* and/or 91*a*, 91*b* are displaced until they are on both sides of the load 2 and by a feed motion of the linear guides 92*a*, 92*b* or 93*a*, 93*b* in z-direction, the pairs of gripping devices are displaced in the direction towards the respective oppositely situated side wall of the load 2 and brought into a form-locking engagement, e.g. through ribs at the load 2. A force-locking engagement is also possible.

If the first conveying device 88 and the second conveying device 89 are also provided on the transport device 86*a* (86*b*), sorted load 2 from a retrieving process can be received on the transport device 86*a* (86*b*) according to the above described principle. The first conveying device 88 and the second conveying device 89 are coupled to drive motors 102, 103 which can be operated independently of each other and have a conveying direction 40*a* extending parallel with the rack aisle 15. It is preferred if the drive motors 102, 103 have one drive direction only.

While the load 2 is being subjected to the repositioning process between the conveying devices 54*a*, 55*a* (54*b*, 55*b*; 69, 71) and the transport device 86*a* (86*b*) or between the provisioning device 43, 44 and the transport device 86*a* (86*b*) the drive motors 98, 102 and/or the drive motors 99, 103 are each driven synchronously. If a load 2 is repositioned between the first conveying device 88 and the second conveying device 89 on the transport device 86*a* (86*b*), the drive motors 102, 103 are being driven synchronously meanwhile.

As shown as an example in FIG. 28 it is possible for a first load 2.1. (to be retrieved) to be transferred from the transport device 86*a* (86*b*) onto the conveying device 55*a* (55*b*; 71) by means of the second gripping devices 91*a*, 91*b* and for a second load 2.2 (to be stored) to be picked up from the conveying device 54*a* (54*b*; 69) onto the transport device 86*a* (86*b*) by means of the first gripping devices 90*a*, 90*b*. The transfer and pick up of the load 2.1, 2.2 can be performed at the same time (synchronously) and in the same direction of motion. In the meantime, third load 2.3. (to be stored) already present on the transport device 86*a* (86*b*) is being conveyed on the transport device 86*a* (86*b*) by means of the conveying device 88 and/or the transport device 89, so that a space for the second load 2.2 (to be stored) is cleared.

Furthermore, as shown as an example in dashed lines, it is possible that a first load 2.1. (to be stored) is transferred from the transport device 86*a* (86*b*) onto one of the provisioning devices 44 by means of the second gripping devices 91*a*, 91*b* and that a second load 2.2 (to be retrieved) is taken from one of the provisioning devices 43 onto the transport device 86*a* (86*b*) by means of the first gripping devices 90*a*, 90*b*. The transfer and pick up of the load 2.1, 2.2 can be performed at the same time (synchronously) and in the same direction of motion. In the meantime, a third load 2.3. (to be retrieved) already present on the transport device 86*a* (86*b*) is conveyed by means of the conveying device 88 and/or the transport device 89 on the transport device 86*a* (86*b*), so that a space for the second load 2.2 (to be retrieved) is cleared.

The conveying devices 88, 89 are exclusively configured to carry out a sorting function and/or position the load 2 on the transport device 86*a* (86*b*) during a process of retrieving and/or storing load 2. Relocating the load 2 between the conveying devices 54*a*, 55*a* (54*b*, 55*b*; 69, 71) and the transport device 86*a* (86*b*) but also relocating the load 2 between the provisioning device 43, 44 and the transport device 86*a* (86*b*) is carried out by means of the gripping devices 90*a*, 90*b* and/or 91*a*, 91*b*.

The fixed buffer device 85*a* comprises a first buffer path section 41*a* (41*b*) and a second buffer path section 42*a* (42*b*), and transport conveying devices 43, 44 are arranged one above the other in each of these buffer path sections 41*a*, 42*a* (41*b*, 42*b*) in any rack level 16, except from that rack level 16 where the conveying system plane 56 extends in. As opposed to the above-described transport conveying devices, these provisioning devices 43, 44 serve for making available load 2 exclusively. A conveying function is not required, as the transport device 86*a* (86*b*) is provided with the gripping devices 90*a*, 90*b* and/or 91*a*, 91*b* for pulling/pushing load 2.

The transport conveying devices 43 and/or accumulation positions of any rack levels 16, where they are arranged in, arranged in the first buffer path section 41*a* (41*b*), each exclusively serve for a process of retrieving load 2 and/or as removing paths. The transport conveying devices 44 and/or accumulation positions of any rack levels 16, where they are arranged in, arranged in the second buffer path section 42*a* (42*b*), each exclusively serve for a process of storing load 2 and/or as storing path.

The transport conveying devices 43 in the first buffer path section 41*a* (41*b*) are each formed by accumulating tracks comprising a pick-up section 45 and/or a transfer section 46. On this pick-up and/or transfer section 45, 46, it is on the one hand possible that load 2 to be retrieved is picked up from the conveyor vehicle 3 by the load receiving device 11, and also that load 2 to be retrieved is transferred onto the transport device 86*a* (86*b*) by means of the transport device 86*a* (86*b*) and/or the gripping devices 90*a*, 90*b*.

The transport conveying devices 44 in the second buffer path section 42*a* (42*b*) are each formed by accumulating tracks comprising a pick-up section 49 and/or a transfer section 50. On this pick-up and/or transfer section 49, 50, it is on the one hand possible that load 2 to be stored is transferred from the transport device 86*a* (86*b*) by means of the transport device 86*a* (86*b*) and/or the gripping devices 90a, 90b, and on the other hand that load 2 to be stored is picked up onto the conveyor vehicle 3 by means of the load receiving device 11. According to the embodiment shown each accumulation position can accommodate one load 2.

This embodiment allows a particularly advantageous design of the provisioning devices 43, 44, as neither an independent drive per provisioning device 43, 44 nor a transmission roller 64' per provisioning devices 43, 44 is required. In the simplest case, the provisioning devices 43, 44 each comprise a stationary bearing table for one or more pieces of load 2 in the pick-up and/or transfer section 45, 46 and/or 49, 50.

In the course of a process of storing and retrieving load 2, it is also possible that this transport device 86a (86b) carries out the process of relocating load 2 to be stored and retrieved between the conveying devices 54a, 55a (54b, 55b; 69, 71) and the transport device 86a (86b) and also the process of relocating load 2 to be stored and retrieved between one of the provisioning devices 43, 44 and the transport device 86a (86b) at the same time. Thus, the transport device 86a (86b) is able to realize a "double-cross" in the region of the buffer device 85a (85b) in the region of the conveying system of the feed area.

It should also be noted that the transport device 86a (86b) can also exhibit gripping devices, each of which is arranged on telescopic arms and which can be swiveled about an axis which lies parallel with the extension direction of the telescopic arms, in order to be able to engage behind the load 2 at one of the front or rear side walls in a form-locking way, as already described in document U.S. Pat. No. 6,923,612 B2.

This results on the one hand in the possibility to transfer two or more pieces of load 2 to be stored from the transport device 86a (86b) onto the pick-up and/or transfer section 49, 50 at the same time by means of the transport device and/or the gripping devices making use of the "double-cross", or to take two or more pieces of load 2 to be retrieved from the pick-up or transfer section 45, 46 onto the transport device 86a (86b) at the same time. Consequently, at least four pieces of load 2 are dealt with at the same time.

It is on the one hand possible to take two or more pieces of load 2 to be stored from the conveying device 54a (54b; 69) onto the transport device 86a (86b) at the same time by means of the transport device and/or the gripping devices making use of the "double-cross", or to transfer two or more pieces of load 2 to be retrieved from the transport device 86a (86b) onto the conveying device 55a (55b; 71) at the same time. Consequently, at least four pieces of load 2 are dealt with at the same time.

The transport device 86a (86b) as shown in more detail in FIG. 29 comprises—according to this embodiment—a carrying platform 87, optionally a first conveying device 88 mounted to the latter, optionally a second conveying device 89 mounted to the latter, and gripping devices 90a, 90b, 91a, 91b arranged on the longitudinal sides 104 of the carrying platform 87. The transport device 86a serves for both processes, for storing and retrieving load 2.

Figure 30:
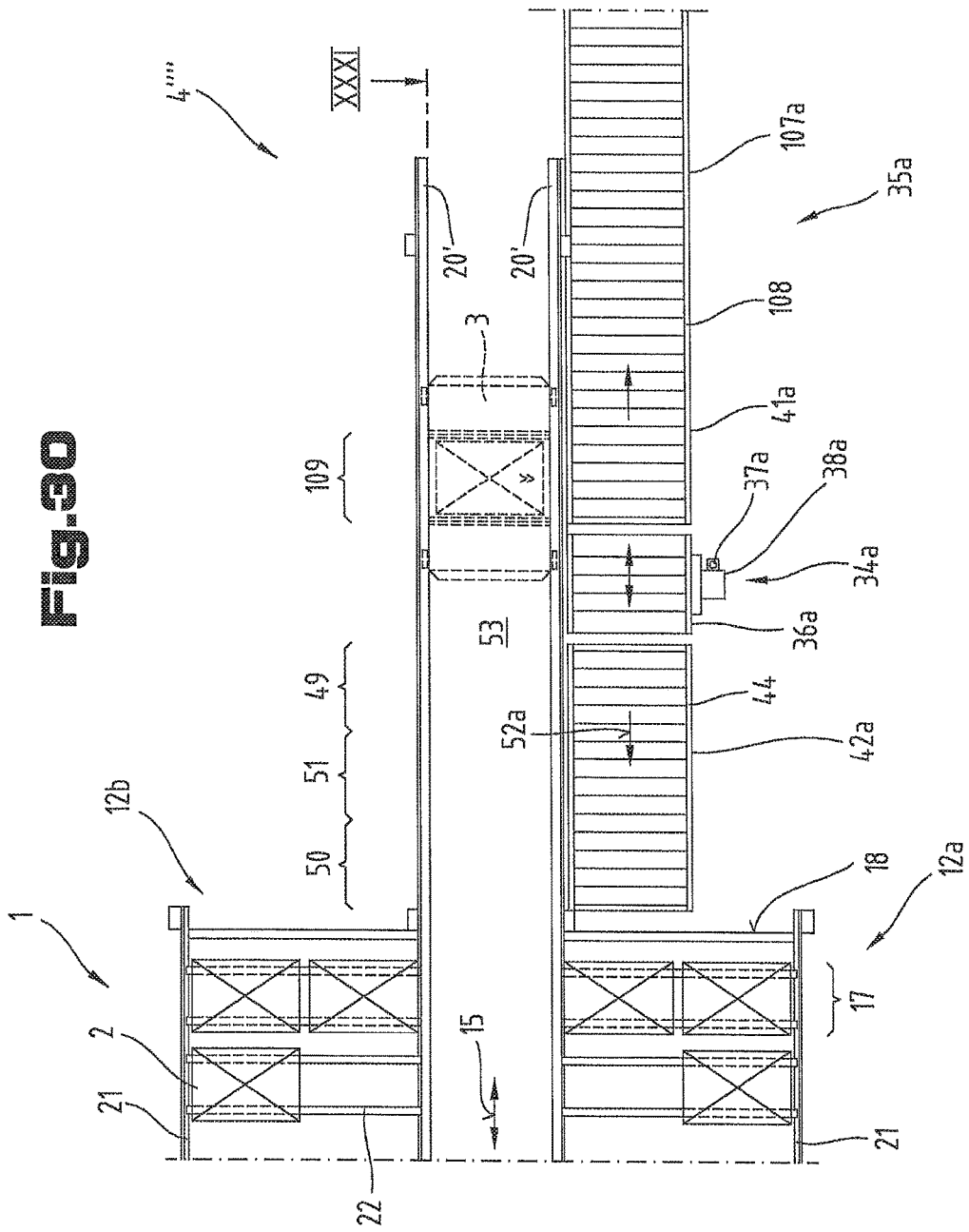
FIG. 30 shows a detail of a rack storage system having a rack storage and a fourth embodiment of a load manipulation unit as well as a sixth embodiment of the conveying system of the feed area for supplying and removing load in top view.

FIGS. 30 to 31 show a fourth embodiment of a rack storage system, which comprises a rack storage 1 for load 2, one or more self-propelled, autonomic conveyor vehicles 3, a load manipulation unit 4'''' in a further embodiment and optionally a conveyor vehicle-lifting device 5, as described above. The fully automated load manipulation unit 4'''' comprises a first load-lifting device arranged at the front side in front of the storage racks 12a, 12b, and a first buffer device for temporarily storing the load 2. It is also possible for the load manipulation unit 4'''' to be disposed between the rack storage sides 18, 19 (FIGS. 2, 30) on the front side, and can therefore be integrated in the rack storage 1 and/or in the storage racks 12a, 12b.

The fixed load-lifting device 34a either corresponds to the embodiment according to the FIGS. 1 to 27 or the embodiment according to the FIGS. 28 to 29. According to a first embodiment, the liftable and lowerable transport device 36a comprises a conveying device which can be reversibly driven by a drive motor 39a (FIG. 31), and has a conveying direction which runs parallel with the rack aisle 15 and can receive one or more pieces of load 2. According to the second embodiment (not shown in this Fig.), the liftable and lowerable transport device 86a comprises a carrying platform 87 for one or more pieces of load 2 and a gripping unit for pulling/pushing the load 2 between the conveying devices 106a, 107a and the transport device 86a or between the provisioning devices 43, 44 and the transport device 86a. The reference numerals of the alternative embodiment (FIGS. 28, 29) will be given in brackets. According to both embodiments, the transport device 36a; 86a serves for storing and retrieving load 2.

The fixed buffer device 35a (85a) comprises a first buffer path section 41a and a second buffer path section 42a, and provisioning devices 43, 44 are arranged one above the other in each of these buffer path sections 41a, 42a at least in some of rack levels 16. Whilst no provisioning devices 43 are arranged in the first buffer path section 41a on the level of those rack levels 16 where the conveying devices of the conveying system of the feed area are arranged in, the provisioning devices 44 are arranged in the second buffer path section 42a on the level of each rack level 16.

Whilst the provisioning devices 43 44 according to the embodiment shown are provided in the form of the above-described transport conveying devices, there is also the possibility that the stationary bearing tables (without conveying elements) are used instead for temporarily storing one or more pieces of load 2, as described above in more detail.

As shown in FIG. 31, the provisioning devices 43 of the first buffer path section 41a each form a respective removing path for the load 2 in each rack level 16 where they are arranged in, and the provisioning devices 44 of the second buffer path section 42a each form a respective storing path for the load 2 in all rack levels 16 where they are arranged in. This being the case, the provisioning devices 43, 44 are disposed in the extension of the storage rack 12a and face one another in each rack level 16.

As opposed to the explanations above, another embodiment of the conveying system of the feed area is provided, where the first conveying device 106a and the second conveying device 107a are disposed in height levels situated one above the other and extend parallel with the rack aisle 15, the first conveying device provided for transporting load 2 to the load-lifting device 34a (84a) and the second conveying device provided for transporting load 2 from the load-lifting device 34a (84a). To this end, the conveying devices 106a, 107a extend in the extension of the storage rack 12a and are disposed on that (exclusively one first) side of the load-lifting device 34a (84a), which faces away from the storage rack 12a. On that (second) side of the load-lifting device 34a (84a) facing the storage rack 12a the provisioning devices 44 are arranged per rack level 16. This being the case, the height levels can correspond to the rack levels 16. The conveying devices 106a, 107a can e.g. be a roller track or a roller conveyor and suchlike.

In other words: on a level with those rack levels 16, where the conveying devices 106a, 107a are disposed in, the conveying devices 106a, 107a and provisioning devices 44 are provided per rack level 16, as shown in FIG. 31.

As also shown in the FIGS. 30 and 31, the second conveying device 107a forms a provisioning device 108 for temporarily storing one or more pieces of load 2 in a conveying section adjacent to the load-lifting device 34a (84a). Whilst the provisioning device 108 according to the embodiment shown is provided in the form of a transport conveying device, there is also the possibility that a stationary bearing table (without conveying elements) is used instead for temporarily storing one or more pieces of load 2. The provisioning device 108 is embodied in the first buffer path section 41a and has a pick-up section 109. The pick-up section 109 comprises one or more pick-up places and can—according to the arrows—receive one or more pieces of load 2 one behind the other in conveying direction. The provisioning device 108 and/or the pick-up section 109 extend across a section of the conveying device 107a.

It is furthermore provided that—as opposed to the embodiments above—the guide tracks 20' extend continuously on the level of the rack level 16, where also the second conveying device 107a is arranged in, along the rack aisle 15 and the load-lifting device 34a (84a), as well as the provisioning device 108, with the result that either the provisioning device 44 in the second buffer path section 42a or the provisioning device 108 of the conveying device 107a can be approached by the conveyor vehicle 3 via the guide tracks 20' for storing and retrieving load 2 in this rack level 16. Thus, in order to perform a process of retrieving load 2, the conveying device 3 can move as far as the transfer section 109 and/or the pick-up place at the conveyor vehicle 107a, where it can deliver load 2 to be retrieved directly onto the conveying device 107a, as indicated by dashed lines in FIG. 30 only for reasons of clarity. For a process of storing load 2 in the rack storage 1, the conveyor vehicle 3 is moved in this rack level 16 along the guide tracks 20' up to the transfer section 50 where load 2 to be stored is taken onto the conveyor vehicle 3 e.g. by means of the load receiving device 11. Then, the conveyor vehicle 3 moves into the rack storage 1 in order to store the load 2 in one of the storage racks 12a, 12b.

The guide tracks 20 in those rack levels 16 where the provisioning devices 43, 44 are arranged in extend continuously along the rack aisle 15 and the load-lifting device 34a (84a) as well as the provisioning devices 43, 44, so that in these rack levels 16 the provisioning devices 43 in the first buffer path section 41a can be approached by the conveyor vehicle 3 via the guide tracks 20 for retrieving load 2, and the provisioning devices 44 in the second buffer path section 42a can be approached by the conveyor vehicle 3 via the guide tracks 20 for storing load 2.

As also shown in FIG. 31, the first conveying device 106a forms a provisioning device 110 for temporarily storing one or more pieces of load 2 in a conveying section adjacent to the load-lifting device 34a (84a). Whereas the provisioning device 108 according to the embodiment shown is provided in the form of a transport conveying device, there is also the possibility that a stationary bearing table (without conveying elements) is used instead for temporarily storing one or more pieces of load 2. The provisioning device 110 is embodied in the first buffer path section 41a and has a pick-up section 111. The transfer section 111 comprises one or more transfer places and can—according to the arrow—receive one or more pieces of load 2 one behind the other in conveying direction. The provisioning device 108 and/or the transfer section 111 extend across a section of the conveying device 106a.

This arrangement allows the load 2 to be conveyed directly in this rack level 16 from the first conveying device 106a via the transport device 36a (86a) up to the provisioning device 44, where the load can be picked up by the conveyor vehicle 3.

A further embodiment is conceivable, shown by the dashed lines in FIG. 31, where the guide tracks 20' also extend continuously on the level of this rack level 16, where the first conveying device 106a is arranged in, along the rack aisle 15 and the load-lifting device 34a (84a), as well as the provisioning device 110, with the result that either the provisioning device 44 in the second buffer path section 42a or the provisioning device 110 of the conveying device 106a can be approached by the conveyor vehicle 3 via the guide tracks 20' for storing and retrieving load 2 in this rack level 16. Thus, in order to perform a process of storing load, the conveying device 3 can move up to the transfer section 111 and/or the pick-up section at the conveyor device 106a, where it can pick up a load 2 to be stored directly from the conveying device 106a, which is not indicated for reasons of clarity. Then, the conveyor vehicle 3 moves into the rack storage 1 in order to store the load 2 in one of the storage racks 12a, 12b.

The transfer and/or pick-up of load 2 between the conveyor vehicle 3 and the conveying device 106a; 107a is preferably performed by means of the load receiving device 11, as described above.

It should also be noted that is also possible for the first buffer path section 41a to be disposed on the left hand side of the load-lifting device 34a and for the second buffer path section 42a to be disposed on the right hand side of the load-lifting device 34a, so that the provisioning devices 43 are disposed on the left hand side of the load-lifting device 34a and the provisioning devices 44 are disposed on the right hand side of the load-lifting device 34a. Likewise, the conveying direction 48a, 52a is reversed, i.e. from the left to the right.

FIGS. 32 and 33 show a fifth embodiment of a rack storage system, which comprises a rack storage 1 for load 2, one or more self-propelled, autonomic conveyor vehicles 3, a load manipulation unit 4"" in a further embodiment and optionally a conveyor vehicle-lifting device 5, as described above. Arranged on the front side upstream of the storage racks 12a, 12b, the fully automated load manipulation unit 4"" comprises a first load-lifting device 34a, a first buffer device 35a for temporarily storing load 2, a second load-lifting device 34b and a second buffer device 35b for temporarily storing load 2. It is also possible that the load manipulation unit 4"" to be disposed between the rack storage sides 18, 19 arranged on the front side, and therefore to be integrated in the rack storage 1 and/or in the storage racks 12a, 12b. The fixed load-lifting device 3b either corresponds to the embodiment according to the FIGS. 1 to 27 or the embodiment according to the FIGS. 28 to 29, as described above in connection with FIGS. 30 and 31. The transport device 36b; 86b in turn serves for storing and retrieving load 2.

The first buffer device 35a corresponds to the embodiment already described in FIGS. 30 and 31.

The fixed disposed second buffer device 35b (85b) comprises a first buffer path section 41b and the second buffer path section 42b, and provisioning devices 43, 44 are arranged one above the other in each of these buffer path sections 41b, 42b at least in some of rack levels 16. Whilst no provisioning devices 44 are arranged in the second buffer path section 42b on the level of those rack levels 16 where the conveying devices of the conveying system of the feed area are arranged in, the provisioning devices 44 are arranged in the first buffer path section 41*b* on the level of each rack level 16.

Whilst the provisioning devices 43, 44 according to the embodiment shown are provided in the form of the above-described transport conveying devices, there is also the possibility that the stationary bearing tables (without conveying elements) are used instead for temporarily storing one or more pieces of load 2, as described above in more detail.

As shown in FIG. 33, the provisioning devices 43 of the first buffer path section 41*b* each form a respective removing path for the load 2 in each rack level 16 where they are arranged in, and the provisioning devices 44 of the second buffer path section 42*b* each form a respective storing path for the load 2 in all rack levels 16 where they are arranged in. This being the case, the provisioning devices 43, 44 are disposed in the extension of the storage rack 12*a* and are arranged to face one another in each rack level 16.

It should also be noted that is also possible for the first buffer path section 41*b* to be disposed on the right hand side of the load-lifting device 34*b* and for the second buffer path section 42*b* to be disposed on the left hand side of the load-lifting device 34*b*, so that the provisioning devices 44 are disposed on the left hand side of the load-lifting device 34*b* and the provisioning devices 43 are disposed on the right hand side of the load-lifting device 34*b*. Likewise, the conveying direction 48*b*, 52*b* is reversed, i.e. from the right to the left.

The first conveying device 106*a* for transporting load 2 to the load-lifting device 34*a* (84*a*) and the second conveying device 107*a* for transporting load 2 from the load-lifting device 34*a* (84*a*) are disposed on height levels situated one above the other and extending parallel with the rack aisle 15. To this end, the conveying devices 106*b*, 107*b* extend in the extension of the storage rack 12*b* and are disposed on that (exclusively one first) side of the load-lifting device 34*b* (84*b*), which faces away from the storage rack 12*b*. On that (second) side of the load-lifting device 34*b* (84*b*) facing the storage rack 12*b* the provisioning devices 43 are arranged per rack level 16. This being the case, the height levels can correspond to the rack levels 16. The conveying devices 106*b*, 107*b* can e.g. be a roller track or a roller conveyor and suchlike.

As also shown in FIG. 33, the first conveying device 106*b* in a conveying section adjacent to the load-lifting device 34*b* (84*b*) forms a provisioning device 110 for temporarily storing one or more pieces of load 2. Whilst the provisioning device 110 according to the embodiment shown is provided in the form of a transport conveying device, there is also the possibility that a stationary bearing table (without conveying elements) is used instead for temporarily storing one or more pieces of load 2. The provisioning device 110 is embodied in the second buffer path section 41*b* and has a transfer section 111. The transfer section 111 comprises one or more transfer places and can—according to the arrow—receive one or more pieces of load 2 one behind the other in conveying direction. The provisioning device 110 and/or the transfer section 111 extend across a section of the conveying device 106*b*.

The second conveying device 107*b* in a conveying section adjacent to the load-lifting device 34*b* (84*b*) forms a provisioning device 108 for temporarily storing one or more pieces of load 2. Whilst the provisioning device 108 according to the embodiment shown is provided in the form of a transport conveying device, there is also the possibility that a stationary bearing table (without conveying elements) is used instead for temporarily storing one or more pieces of load 2. The provisioning device 108 is embodied in the second buffer path section 41*b* and has a pick up section 109. The pick-up section 109 comprises one or more pick-up places and can—according to the arrow—receive one or more pieces of load 2 one behind the other in conveying direction. The provisioning device 108 and/or the pick-up section 109 extend across a section of the conveying device 106*a*.

This arrangement allows the load 2 to be conveyed directly in this rack level 16 from the provisioning device 43 via the transport device 36*a* (86*a*) up to the second conveying device 107*b*, where the load can be delivered by the conveyor vehicle 3.

It is furthermore provided that the guide tracks 20' extend continuously on the level of the rack level 16, where also the first conveying device 106*b* is arranged in, along the rack aisle 15 and the load-lifting device 34*b* (84*b*), as well as the provisioning device 110, with the result that either the provisioning device 43 in the first buffer path section 41*b* or the provisioning device 110 of the conveying device 106*b* can be approached by the conveyor vehicle 3 via the guide tracks 20' for storing and retrieving load 2 in this rack level 16. Thus, in order to perform a process of storing load 2, the conveying device 3 can e.g. move up to the transfer section 111 and/or the transfer place (FIG. 33) at the conveyor device 106*b*, where it can directly pick up load 2 to be stored from the conveying device 106*b* as—for reasons of clarity—indicated by dashed lines in FIG. 32 only. Then, the conveyor vehicle 3 moves into the rack storage 1 in order to store the load 2 in one of the storage racks 12*a*, 12*b*.

A further embodiment is conceivable, shown by dashed lines in FIG. 33, where the guide tracks 20' also extend continuously on the level of this rack level 16, where the second conveying device 107*b* is arranged in, along the rack aisle 15 and the load-lifting device 34*b* (84*b*), as well as the provisioning device 108, with the result that either the provisioning device 43 in the first buffer path section 41*b* or the provisioning device 108 of the conveying device 107*b* can be approached by the conveyor vehicle 3 via the guide tracks 20' for storing and retrieving load 2 in this rack level 16. Thus, in order to perform a process of retrieving load 2, the conveying device 3 can move up to the pick-up section 109 and/or the pick-up place at the conveyor device 107*b*, where it can directly deliver a load 2 to be retrieved onto the conveying device 107*b*, as not indicated for reasons of clarity.

If the conveying directions 48*b*, 52*a* for the load 2 at the provisioning devices 43, 44 of the buffer devices 35*a*, 35*b* are arranged to be opposite in each rack level 16, as shown in FIG. 32, the conveyor vehicle 3 can—if placed between the provisioning devices 43, 44—deliver load 2 to be retrieved onto the provisioning device 43 and pick up load 2 to be stored from the provisioning device 44. A displacement movement is not required. The same applies if the conveying directions for the load 2 at the provisioning devices 110 of the conveying devices 106*b*, 107*a* are opposite in each rack level 16 and the conveyor vehicle 3 is positioned between the provisioning devices 110 of the conveying devices 106*b*, 107*a*.

It is also possible—as however not shown here—that the conveying directions for the load 2 at the provisioning devices 108, 110 of the conveying devices 106*b*, 107*a* are the same in the rack level 16, and thus both conveying devices within this rack level 16 are either designed for retrieving or storing load 2. The same applies if the conveying directions for the load 2 at the provisioning devices 108, 110 of the conveying devices 106a, 107b are the same in the rack level 16, and thus both conveying devices within this rack level 16 are either designed for retrieving storing load 2.

According to the embodiments shown in the FIGS. 30 to 33, the first conveying device 106a; 106b and the second conveying device 107a; 107b are arranged in conveying system planes 56, 57 situated one above the other, e.g. in the lower, middle or upper height level of the rack storage 1. It is also possible to provide one or more provisioning devices 43; 44 between the conveying devices 106a; 106b, 107a; 107b arranged one above the other in one or more rack levels 16. Hence, the second conveying device 107a; 107b is arranged in the first rack level 16, the provisioning device 43; 44 is arranged in the second rack level 16, and the conveying device 106a; 106b is arranged in the third rack level 16.

Even if FIGS. 30 to 33 only show one rack aisle unit, it is possible for the rack storage 1 to exhibit a number of rack aisle units, and then, the first conveying device 106a; 106b for transporting load 2 to the load-lifting device 34a; 34b (84a; 84b) and the second conveying device 107a; 107b for transporting load 2 from the load-lifting device 34a; 34b (84a; 84b) of several rack aisle units and/or rack aisles is connected to an automated distribution system 74, not shown in this Fig., which distribution system is adopted for transporting load 2 to and from the conveying devices 106a; 106b, 107a; 107b. This distribution system 74 comprises a conveying device, such as a roller conveyor and suchlike.

According to the embodiments in FIGS. 31 to 33, also above-described "double-cross" is applied in an advantageous manner while the load 2 is being manipulated between the transport device 36a; 36b (86a; 86b) and the provisioning devices 43, 44 arranged on both sides of the load-lifting device 34a; 34b (84a; 84b) in those rack levels 16 where there are no conveying devices 106a, 106b, 107a, 107b. It is also possible that a "double-cross" is advantageously applied when the load 2 is being manipulated between the transport device 36a; 36b (86a; 86b) and the provisioning devices 44, 110 (FIG. 31) disposed on both sides of the load-lifting device 34a (84a) in those rack levels 16 where the conveying device 106a is arranged in, and/or the provisioning devices 43, 108 (FIG. 33) disposed on both sides of the load-lifting device 34b (84b) in that rack level 16 where the conveying device 107b is arranged in.

It should also be noted that the load-lifting device 34a; 34b; 86a; 86b can exhibit more than one liftable and lowerable transport device 36a; 36b; 86a; 86b for one or more pieces of load 2 each, provided that several conveying system planes each having one conveyor system for transporting load 2 to the load-lifting device 34a; 34b; 86a; 86b and for transporting load 2 from the load-lifting device 34a; 34b; 86a; 86b are provided.

Finally, it should also be noted that according to the embodiments incorporating a first load-lifting device 34a (84a), a first buffer device 35a (85a) for temporarily storing load 2, a second load-lifting device 34b (84b) and a second buffer device 35b (85b) for temporarily storing load 2, such as e.g. explained on the basis of FIG. 6, the conveying directions 48a, 48b, 52a, 52b for the load 2 at the provisioning devices 43, 44 can be identical in all rack levels 16 and per rack level 16.

Consequently, the provisioning devices 43, 44 in the buffer path sections 41b, 42a of the buffer devices 35a, 35b each form a respective removing path for the load 2 in each rack level 16 where they are arranged in, whereas the provisioning devices 43, 44 in the buffer path sections 41a, 42b of the buffer devices 35a, 35b each form a storing path for the load 2 in all rack levels 16 where they are arranged in. The conveying device 55a, 55b directly follows the load-lifting device 34a, 34b and the load 2 is conveyed to the provisioning devices 43, 44 in the buffer path sections 41b, 42a of the transport device 36a, 36b as well as the conveying device 55a, 55b in one single conveying direction. As a result, the control sequences for sequencing load 2 to be retrieved, originating from different rack levels 16 and required for completing a picking request are essentially simplified. It is also possible to optimize the efficiency in terms of retrieving and/or picking.

It should also be noted that the conveying system planes 56, 57 according to embodiments in FIGS. 1 to 29 may be situated in any height level. It is therefore not required that the conveying system planes 56, 57 and the rack levels 16 are situated in the same height level. It is e.g. possible that the conveying system plane 56 and/or the conveying system plane 57 are situated in a height level between the rack levels 16.

The embodiments illustrated as examples represent possible design variants of the rack storage and it should be pointed out at this stage that the invention is not specifically limited to the design variants specifically illustrated, and instead the individual design variants may be used in different combinations with one another and these possible variations lie within the reach of the person skilled in this technical field given the disclosed technical teaching. Accordingly, all conceivable design variants which can be obtained by combining individual details of the design variants described and illustrated are possible and fall within the scope of the invention.

For the sake of good order, finally, it should be pointed out that, in order to provide a clearer understanding of the rack storage system, it and its constituent parts are illustrated to a certain extent out of scale and/or on an enlarged scale and/or on a reduced scale.

The individual embodiments shown in FIGS. 1 to 33 can in particular form the objective of individual solutions according to the invention.

| List of reference numerals | |
|---|---|
| 1 | Rack storage |
| 2 | Load |
| 3 | Conveyor vehicle |
| 4 | Load manipulation unit |
| 5 | Conveyor vehicle-lifting device |
| 6 | Base frame |
| 7 | Carrying wheel |
| 8 | Drive motor |
| 9 | Guide device |
| 10 | Guide wheel |
| 11 | Load receiving device |
| 12 | Storage rack |
| 13 | Telescopic arm |
| 14 | Drive element |
| 15 | Rack aisle |
| 16 | Rack level |
| 17 | Storage place |
| 18 | Rack storage side |
| 19 | Rack storage side |
| 20 | Front horizontal beam |
| 21 | Rear horizontal beam |
| 22 | Cross member |
| 23 | Tie bar |
| 24 | Upper profile flange |
| 25 | Lower profile flange |
| 26 | Guiding web |
| 27 | Energy supply system |
| 28 | Conductor line |

| List of reference numerals | |
|---|---|
| 29 | Current collector |
| 30 | Guide frame |
| 31 | Lift drive |
| 32 | Receiving device |
| 33 | Horizontal beam |
| 34 | Load-lifting device |
| 35 | Buffer device |
| 36 | Transport device |
| 37 | Lift drive |
| 38 | Mast |
| 39 | Drive motor |
| 40 | Conveying direction |
| 41 | Buffer path section |
| 42 | Buffer path section |
| 43 | Transport conveying device |
| 44 | Transport conveying device |
| 45 | Pick-up section |
| 46 | Transfer section |
| 47 | Buffer section |
| 48 | Conveying device |
| 49 | Pick-up section |
| 50 | Transfer section |
| 51 | Buffer section |
| 52 | Conveying direction |
| 53 | Switching region |
| 54 | Conveying device |
| 55 | Conveying device |
| 56 | Conveying system plane |
| 57 | Conveying system plane |
| 58 | Conveying section |
| 59 | Conveying Section |
| 60 | Transfer lifter |
| 61 | Transport device |
| 62 | Mast |
| 63 | Drive motor |
| 64 | Transmission roller |
| 65 | Processing track |
| 66 | Conveying direction |
| 67 | Delivery device |
| 68 | Conveying direction |
| 69 | Conveying device |
| 70 | Conveying direction |
| 71 | Conveying device |
| 72 | Conveying direction |
| 73 | Conveying system plane |
| 74 | Distribution system |
| 75 | Conveying section |
| 76 | Conveying section |
| 77 | Conveying section |
| 78 | Conveying section |
| 79 | Aisle |
| 80 | Transfer and pick-up device |
| 81 | Transfer and pick-up area |
| 82 | Conveying device |
| 83 | Drive motor |
| 84 | Load-lifting device |
| 85 | Buffer device |
| 86 | Transport device |
| 87 | Aufnahmeplattform |
| 88 | Conveying device |
| 89 | Conveying device |
| 90 | Gripping device |
| 91 | Gripping device |
| 92 | Longitudinal guide |
| 93 | Longitudinal guide |
| 94 | Drive motor |
| 95 | Drive motor |
| 96 | Disc drive |
| 97 | Push rod |
| 98 | Drive motor |
| 99 | Drive motor |
| 100 | Transmission means |
| 101 | Transmission means |
| 102 | Drive motor |
| 103 | Drive motor |
| 104 | Longitudinal side |
| 105 | |
| 106 | Conveying system |
| 107 | Conveying system |
| 108 | Provisioning device |
| 109 | Pick-up section |
| 110 | Provisioning device |
| 111 | Transfer section |

The invention claimed is:

1. Rack storage system comprising
a rack storage with storage racks, each storage rack comprising storage places in rack levels situated one above the other and for storing loads, and
a load manipulation unit, comprising at least one first load-lifting device with a liftable and lowerable transport device for storing and retrieving loads as well as a first buffer device with provisioning devices for temporarily storing one or more loads, and
at least one rack aisle extending between adjacent storage racks and along the first load-lifting device as well as the first buffer device, and
guide tracks running in at least some of the rack levels along the rack aisle, and
one or more autonomous conveyor vehicles displaceable along the guide tracks for transporting the loads between the storage places of the storage racks and the provisioning devices of the load manipulation unit, and
a conveying system connected to the first load-lifting device for transporting loads to and from the first load-lifting device,
the conveying system comprising a first conveying device for transporting loads to the first load-lifting device and a second conveying device for transporting loads from the first load-lifting device, and
in at least some of the rack levels, the buffer device comprises a fixed first buffer path section and fixed second buffer path section, where the provisioning devices are arranged,
wherein the provisioning devices of the fixed first buffer path section each are arranged in front of the first load-lifting device and the provisioning devices of the fixed second buffer path section each are arranged behind the first load-lifting device relative to a lengthwise direction of the rack aisle such that the provisioning devices of the fixed second buffer path section are oppositely situated with respect to the provisioning devices of the fixed first buffer path section, and
the first load-lifting device is arranged between the first and second buffer path sections in such a way that the transport device for storing and retrieving a load can be vertically positioned relative to the rack levels between the two oppositely situated provisioning devices, so that at least one load of the loads may be conveyed between the transport device and one of the provisioning devices,
wherein
in those rack levels where the provisioning devices are arranged, the guide tracks extend continuously along the rack aisle, and along the first load-lifting device, as well as along the provisioning devices of the fixed first buffer path section and the provisioning devices of the fixed second buffer path section, and
the first buffer path section with the provisioning devices and the second buffer path section with the provisioning devices as well as the first load-lifting device are provided sideways next to the rack aisle along the guide tracks so that in the respective rack level, either the provisioning device in the first buffer path section in front of the first load-lifting device or the provisioning device in the second buffer path section behind the first load-lifting device can be approached by the conveyor vehicle via the guide tracks for retrieving and storing a load and wherein the provisioning devices of the first buffer path section each form a removing path for at least one load of the loads in each rack level where they are arranged, and the provisioning devices of the second buffer path section each form a storing path for at least one load of the loads in all rack levels where they are arranged.

2. Rack storage system according to claim 1, wherein, the first and second conveying devices are essentially arranged one above the other on a level with the corresponding rack levels and extend in the extension of a storage rack, and the first load-lifting device is arranged such that its transport device for storing and retrieving loads can be vertically positioned relative to the rack levels in front of the front side of one of the conveying devices, so that at least one load of the loads may be conveyed between the transport device and one of the first and second conveying devices, in a conveying section adjacent to the first load-lifting device at least one of the conveying devices also comprises a provisioning device for temporarily storing one or more loads, the provisioning devices situated opposite each other on both sides of the load-lifting device, and the guide tracks in at least one of the rack levels, where the conveying devices are disposed in, extend continuously along the rack aisle, along the first load-lifting device, as well as along the provisioning devices, so that in at least one of the rack levels, where the conveying devices are arranged in, either the provisioning device of the buffer path section or the provisioning device of the conveying device can be approached by the conveyor vehicle (3) via the guide tracks for retrieving or storing loads (2).

3. Rack storage system according to claim 1, wherein the first conveying device for transporting load to the first load-lifting device and the second conveying device for transporting load from the first load-lifting device of several rack aisles are connected to an automated distribution system, the distribution system is adopted for transporting load to and from the conveying devices.

4. Rack storage system according to claim 1, wherein the rack storage comprises at least one rack aisle unit which comprises adjacent storage racks and a rack aisle extending between the latter as well as the load manipulation unit, the load manipulation unit having a second load-lifting device with a liftable and lowerable transport device for storing and retrieving loads as well as a second buffer device with provisioning devices for temporarily storing one or more loads, the at least one rack aisle extending between the adjacent storage racks and along the first load-lifting device as well as the first and second buffer devices, and the conveying system further comprises a first conveying device for transporting loads to the second load-lifting device and a second conveying device for transporting loads from the second load-lifting device, and in at least some of the rack levels, the second buffer device comprises a fixed first buffer path section and a fixed second buffer path section, where the provisioning devices are arranged, and the second load-lifting device is arranged between the first and second buffer path sections and the conveying devices in such a way that the transport device for storing and retrieving loads can be vertically positioned relative to the rack levels between two oppositely situated provisioning devices, so that a load of the loads may be conveyed between the transport device and one of the provisioning devices, and wherein the provisioning devices of the fixed first buffer path section each are arranged in front of the second load-lifting device and the provisioning devices of the fixed second buffer path section each are arranged behind the second load-lifting device relative to the lengthwise direction of the rack aisle.

5. Rack storage system according to claim 4, wherein the first and second load-lifting devices are positioned at a distance at least corresponding to the width of an aisle and are arranged to be laterally reversed.

6. Rack storage system according to claim 4, wherein the first and second load-lifting devices are positioned at a distance at least corresponding to the width of an aisle and are arranged to be axially offset.

7. Rack storage system according to claim 4, wherein the first conveying device for transporting loads to the first load-lifting device and the second conveying device for transporting loads from the first load-lifting device are connected to a first workstation, and wherein the first conveying device for transporting loads to the second load-lifting device and the second conveying device for transporting loads from the second load-lifting device are connected to a second workstation.

8. Rack storage system according to claim 4, wherein the first conveying device and the second conveying device are arranged one above the other, the liftable and lowerable transport device for storing and retrieving loads can be vertically positioned relative to the first conveying device or the second conveying device, so that at least one load of the loads may be conveyed between the transport device and one of the first and second conveying devices.

9. Rack storage system according to claim 4, wherein the first conveying device and the second conveying device each have a first conveying section and are arranged opposite each other, the liftable and lowerable transport device for storing and retrieving loads can be vertically positioned between the first conveying sections, so that at least one load of the loads may be conveyed between the transport device and one of the first and second conveying devices.

10. Rack storage system according to claim 1, wherein the conveying system for transporting loads to and from the first load-lifting device comprises at least one transfer and pick-up device for one or more loads, the transfer and pick-up device directly following the first conveying device and/or second conveying device of the conveying system and wherein the guide tracks in that rack level, where the conveying system for transporting load to and from the first load-lifting device is arranged in, extends along the transfer and pick-up device, and the transfer and pick-up device can be approached by the conveyor vehicle via the guide track, so that loads to be retrieved or stored can be conveyed between the conveyor vehicle and the transfer and pick-up device.

11. Rack storage system according to claim 1, wherein
the first conveying device and the second conveying device are arranged opposite each other, and
the transport device of the first load-lifting device can be such positioned between the conveying devices and such driven that at least a first load of the loads is conveyed from the first conveying device onto the transport device and at least a second load of the loads is conveyed from the transport device onto the second conveying device, wherein the first load of the loads and the second load of the loads are moved simultaneously.

12. Rack storage system according to claim 1, wherein the first conveying device for transporting at least one load to the first load-lifting device comprises conveying sections which extend in conveying system planes arranged one above the other and parallel with the rack aisle, and which are connected to one another via a transfer lifter.

13. Rack storage system according to claim 1, wherein the conveying system further comprises a processing track running in the rack aisle, as well as a delivery device for connecting the processing track with the first conveying device in order to transport at least one load from the processing track onto the first conveying device.

14. Rack storage system according to claim 1, wherein the load manipulation unit is arranged at the front ends of the storage racks.

15. Rack storage system according to claim 1, wherein the load manipulation unit is integrated in the storage racks.

16. Rack storage system according to claim 1, wherein
the first conveying device and the second conveying device are arranged one above the other,
the liftable and lowerable transport device for storing and retrieving loads can be vertically positioned relative to the first conveying device or the second conveying device, so that at least one load of the loads may be conveyed between the transport device and one of the first and second conveying devices.

17. Rack storage system according to claim 1, wherein
the first conveying device and the second conveying device each have a first conveying section and are arranged opposite each other,
the liftable and lowerable transport device for storing and retrieving loads can be vertically positioned between the first conveying sections, so that at least one load of the loads may be conveyed between the transport device and one of the first and second conveying devices.

18. Rack storage system according to claim 17, wherein
the first conveying device and the second conveying device each have the first conveying section running parallel with the rack aisle and aligned facing each other, and
one of the conveying devices has a second conveying section and a third conveying section running parallel with the rack aisle, and
the first and the third conveying section are offset to each other within a conveying system plane, or
the first and the third conveying section are arranged in conveying system planes positioned one above the other, the first and the third conveying section being connected via the second conveying section.

19. Rack storage system according to claim 18, wherein the rack storage comprises at least two rack aisle units, each rack aisle unit of which being provided in the form of adjacent storage racks and a rack aisle extending between the latter as well as comprising the load manipulation unit, and wherein the first conveying sections of the conveying devices extend in the extension of a storage rack of the first rack aisle unit and the third conveying section of the conveying device extends in the extension of a storage rack of the second rack aisle unit.

20. Rack storage system according to claim 18, wherein the rack storage comprises at least two rack aisle units, each rack aisle unit of which being provided in the form of adjacent storage racks and a rack aisle extending between the latter as well as comprising the load manipulation unit, the rack aisle units being arranged at a mutual distance, so that an aisle is formed between the adjacent storage racks of the rack aisle units, in the extension of which aisle or within which aisle a part of the third conveying section extends.

21. Rack storage system according to claim 18, wherein the rack storage comprises at least one rack aisle unit, which is provided in the form of adjacent storage racks and a rack aisle extending between the latter as well as comprises the load manipulation unit, and wherein the first conveying sections of the conveying devices extend in the extension of a storage rack of the rack aisle unit and the third conveying section of the conveying device extends in the extension of the rack aisle.

22. Rack storage system according to claim 1, wherein
the provisioning devices in the first buffer path section each have
a stationary bearing table for one or more loads, and
a transfer section, and
the provisioning devices in the second buffer path section each have
a stationary bearing table for one or more loads, and
a pick up section.

23. Rack storage system according to claim 22, wherein the liftable and lowerable transport device comprises
a carrying platform for one or more pieces of load and
at least one gripping unit for relocating the loads between the conveying devices and the transport device.

24. Rack storage system according to claim 23, wherein the liftable and lowerable transport device for one or more loads additionally comprises one or more conveying devices arranged one behind the other in conveying direction.

25. Rack storage system according to claim 22, wherein the liftable and lowerable transport device comprises
a first gripping unit and
a second gripping unit, each gripping unit comprising gripping devices which are configured for relocating loads and are arranged on opposite longitudinal sides of the carrying platform and can be adjusted relative with respect to the carrying platform in both a first direction parallel with the longitudinal sides and a second direction essentially perpendicular to the longitudinal sides,
and at least a first load of the loads can be moved by the first gripping unit either from one of the transfer sections in the first buffer path section or from the first conveying device for transporting loads to the transport device and
at least a second load of the loads can be moved by the second gripping unit from the transport device either onto one of the pick-up sections in the second buffer path section or onto the second conveying device for retrieving loads, wherein the first load of the loads and the second load of the loads are moved simultaneously.

26. Rack storage system according to claim 1, wherein
the provisioning devices in the first buffer path section
each have a transport conveying device for one or more
loads, and the provisioning devices in the second buffer path section
each have a transport conveying device for one or more
loads.

27. Rack storage system according to claim 26, wherein
the transport device of the first load-lifting device can be
vertically positioned between the transport conveying
devices and is driven in such a manner that at least a first
load of the loads is being conveyed from the first buffer path
section onto the transport device and at the same time at least
a second load of the loads is being conveyed from the
transport device onto the second buffer path section.

28. Rack storage system according to claim 27, wherein
the first conveying device and the second conveying
device each have the first conveying section extending
in the extension of the storage racks and aligned facing
each other, and a common third conveying section in
the extension of the rack aisle, and one of the first and
second conveying devices has a second conveying
section, and the first conveying sections of the first conveying device
or the second conveying device are connected with the
third conveying section via the second conveying section.

29. Rack storage system according to claim 26, wherein
the transport conveying devices in the first buffer path
section are provided in the form of accumulating tracks
conveying at least one load of the loads from a pick-up
section remote from the first load-lifting device to a transfer
section adjacent to the first load-lifting device in one single
conveying direction, and the pick-up section can be
approached by the single-level rack serving device and at
least one load of the loads can be relocated from the
single-level rack serving device to the pick-up section.

30. Rack storage system according to claim 29, wherein
the accumulating tracks each form at least one buffer section
positioned between the pick-up section and the transfer
section.

31. Rack storage system according to claim 26, wherein
the transport conveying devices in the second buffer path
section are provided in the form of accumulating tracks
conveying at least one load of the loads from a pick-up
section adjacent to the first load-lifting device to a transfer
section remote from the first load-lifting device in one single
conveying direction, and the transfer section can be
approached by the single-level rack serving device and at
least one load of the loads can be relocated from the transfer
section to the single-level rack serving device.

32. Rack storage system according to claim 26, wherein
the accumulating tracks form at least one buffer section each
positioned between the pick-up section and the transfer
section.

33. Method for operating a rack storage system comprising a rack storage with storage racks, each storage rack
comprising storage places in rack levels situated one
above the other and for storing loads, and a load manipulation unit, comprising at least one first
load-lifting device with a liftable and lowerable transport device for storing and retrieving loads as well as a
first buffer device with provisioning devices for temporarily storing one or more loads, and in at least some of the rack levels, the first buffer device
comprises a fixed first buffer path section and fixed
second buffer path section, where the provisioning
devices are arranged, the first load-lifting device is arranged between the first
and second buffer path sections and can be vertically
positioned relative to the rack levels between two
oppositely situated provisioning devices in order to
convey at least one of the loads between the transport
device and one of the provisioning devices, wherein the provisioning devices of the fixed first buffer
path section each are arranged in front of the first
load-lifting device and the provisioning devices of the
fixed second buffer path section each are arranged
behind the first load-lifting device relative to a lengthwise direction of the rack aisle, and the provisioning devices of the first buffer path section
each form a removing path for at least one load of the
loads in each rack level where they are arranged, in
order to transport the loads on each of the provisioning
devices in the first buffer path section in the same
conveying direction and one after another from the
provisioning devices onto the transport device, and the provisioning devices of the second buffer path section
each form a storing path for at least one load of the
loads in all rack levels where they are arranged, in order
to transport the loads on each of the provisioning
devices in the second buffer path section in the same
conveying direction and one after another from the
transport device on to the provisioning devices, and wherein the conveying direction of the loads on each of
the provisioning devices in the first buffer path section
and the conveying direction of the loads on each of the
provisioning devices in the second buffer path section
are the same direction, and a conveying system connected to the first load-lifting
device for transporting loads to and from the first
load-lifting device, and guide tracks running in at least some of the rack levels
extend continuously along the rack aisle, along the first
load-lifting device, as well as along the provisioning
devices of the fixed first buffer path section and the
provisioning devices of the fixed second buffer path
section, one or more autonomous conveyor vehicles displaceable
along the guide tracks for transporting the loads, wherein the method comprises:

displacing the autonomous conveyor vehicle along the
guide tracks for transporting the loads between the
storage places of the storage racks and the provisioning
devices of the load manipulation unit, the displacing
comprises the steps of first displacing the autonomous conveyor vehicle to the
provisioning device in the first buffer path section in
front of the first load-lifting device in order to retrieve
a first load of the loads, and second displacing the autonomous conveyor vehicle to the
provisioning device in the second buffer path section
behind the first load-lifting device in order to store a
second load of the loads.

34. Method according to claim 33, wherein at least in
some of the rack levels, the transport device of the first
load-lifting device is such positioned between the first buffer
path section and the second buffer path section that the
conveying of the first load from the first buffer path section onto the transport device and of the second load from the transport device onto the second buffer path section is carried out simultaneously.

35. Method according to claim 33, wherein
the provisioning devices in the first buffer path section each have
   a transport conveying device for one or more loads,
   a pick-up section remote from the first load-lifting device, and
   a transfer section adjacent to the first load-lifting device,
wherein the method comprises
conveying the first load by the autonomous conveyor vehicle from a storage place to the pick-up section and afterwards by the transport conveying device from the pick-up section in a conveying direction to the transfer section.

36. Method according to claim 33, wherein
the provisioning devices in the second buffer path section each have
   a transport conveying device for one or more loads,
   a pick-up section adjacent to the first load-lifting device, and
   a transfer section remote from the first load-lifting device on the transport conveying device,
wherein the method comprises
conveying the second load by the transport device to the pick-up section and afterwards by the transport conveying device from the pick-up section in a conveying direction to the transfer section, and
afterwards picking up the second load from the transfer section by the autonomous conveyor vehicle and conveying the second load to a storage place.

* * * * *